United States Patent
McIntosh et al.

(10) Patent No.: US 8,365,018 B2
(45) Date of Patent: Jan. 29, 2013

(54) SYSTEMS, DEVICES, AGENTS AND METHODS FOR MONITORING AND AUTOMATIC REBOOT AND RESTORATION OF COMPUTERS, LOCAL AREA NETWORKS, WIRELESS ACCESS POINTS, MODEMS AND OTHER HARDWARE

(75) Inventors: P. Stuckey McIntosh, Atlanta, GA (US); David Lamar James, Acworth, GA (US); Li-Quan Tan, Sunnyvale, CA (US)

(73) Assignee: Sand Holdings, LLC, Atlanta, GA (US)

( * ) Notice: Subject to any disclaimer, the term of this patent is extended or adjusted under 35 U.S.C. 154(b) by 928 days.

(21) Appl. No.: 12/214,313

(22) Filed: Jun. 18, 2008

(65) Prior Publication Data
US 2009/0013210 A1    Jan. 8, 2009

Related U.S. Application Data

(60) Provisional application No. 60/936,502, filed on Jun. 19, 2007.

(51) Int. Cl.
*G06F 11/00* (2006.01)
(52) U.S. Cl. .............. 714/23; 714/25; 714/4.3; 709/224
(58) Field of Classification Search .................... 713/300
See application file for complete search history.

(56) References Cited

U.S. PATENT DOCUMENTS

| | | | |
|---|---|---|---|
| 5,379,341 A | 1/1995 | Wan | |
| 6,038,689 A | 3/2000 | Schmidt et al. | |
| 6,145,101 A | 11/2000 | Pike | |
| 6,169,669 B1 * | 1/2001 | Choudhury | 363/37 |
| 6,330,690 B1 | 12/2001 | Nouri et al. | |
| 6,442,694 B1 | 8/2002 | Bergman et al. | |
| 6,701,449 B1 | 3/2004 | Davis et al. | |
| 6,976,071 B1 * | 12/2005 | Donzis et al. | 709/224 |
| 7,080,141 B1 | 7/2006 | Baeckelmans et al. | |
| 7,111,205 B1 | 9/2006 | Jahn et al. | |
| 7,143,153 B1 * | 11/2006 | Black et al. | 709/223 |
| 7,203,742 B1 | 4/2007 | Luft et al. | |
| 7,296,069 B2 | 11/2007 | Nguyen | |
| 7,299,278 B2 | 11/2007 | Ch'ng | |
| 2001/0047407 A1 * | 11/2001 | Moore et al. | 709/223 |
| 2003/0065767 A1 | 4/2003 | Pardhy et al. | |

(Continued)

FOREIGN PATENT DOCUMENTS

CN 1925518 3/2007
WO WO-2008156782 A2 12/2008

OTHER PUBLICATIONS

Dataprobe Inc. iBootBar Installation and Operations manual, pp. 1-22 (2006).

(Continued)

*Primary Examiner* — Scott Baderman
*Assistant Examiner* — Jason Bryan
(74) *Attorney, Agent, or Firm* — Kilpatrick Townsend & Stockton LLP

(57) ABSTRACT

An embodiment of the invention is a client on a local area network that periodically and automatically evaluates its physical connectivity with the local area network, exercises local-network services such as DHCP, and verifies Internet connectivity and function by pinging one or more numerically specified IP addresses and by pinging one or more IP addresses specified by an FQDN (Fully Qualified Domain Name) known to the assigned DNS servers. An embodiment of the invention may include a plurality of client elements monitoring one or more networks. Functionality according to embodiments of the invention can send notices, automatically initiate action, and otherwise assist in, among other things, remote monitoring and administration of networks, and particularly wireless networks.

13 Claims, 43 Drawing Sheets

Network Probe Restore
Functional Block Diagram

U.S. PATENT DOCUMENTS

| | | |
|---|---|---|
| 2003/0233450 A1 | 12/2003 | Carley |
| 2004/0006614 A1 | 1/2004 | DiFalco |
| 2004/0088403 A1 | 5/2004 | Aggarwal |
| 2004/0088404 A1 | 5/2004 | Aggarwal |
| 2004/0133689 A1* | 7/2004 | Vasisht .................. 709/228 |
| 2005/0219079 A1* | 10/2005 | Moran et al. .................. 341/51 |
| 2006/0031454 A1* | 2/2006 | Ewing et al. .................. 709/223 |
| 2006/0036729 A1 | 2/2006 | Sakaguchi et al. |
| 2006/0129666 A1 | 6/2006 | Bohm et al. |
| 2006/0155846 A1 | 7/2006 | Motoyama et al. |
| 2007/0001908 A1* | 1/2007 | Fager et al. ............ 343/700 MS |
| 2007/0168505 A1 | 7/2007 | Devadoss et al. |
| 2007/0298841 A1 | 12/2007 | Liao |
| 2008/0025223 A1* | 1/2008 | Karacali-Akyamac et al. .................. 370/241 |
| 2008/0091819 A1* | 4/2008 | Yang .................. 709/224 |

OTHER PUBLICATIONS http://www.networkcomputing.com/showitem.jhtml?articleID=537003188&pgno=7 (Nov. 25, 2004).

Watchdog White Paper, 09 pages (undated).

Annex to Form PCT/ISA/206 in related Application No. PCT/US2008/007591 dated Jan. 13, 2009.

International Search Report and Written Opinion dated Apr. 24, 2009 in related Application No. PCT/US2008/007591.

* cited by examiner

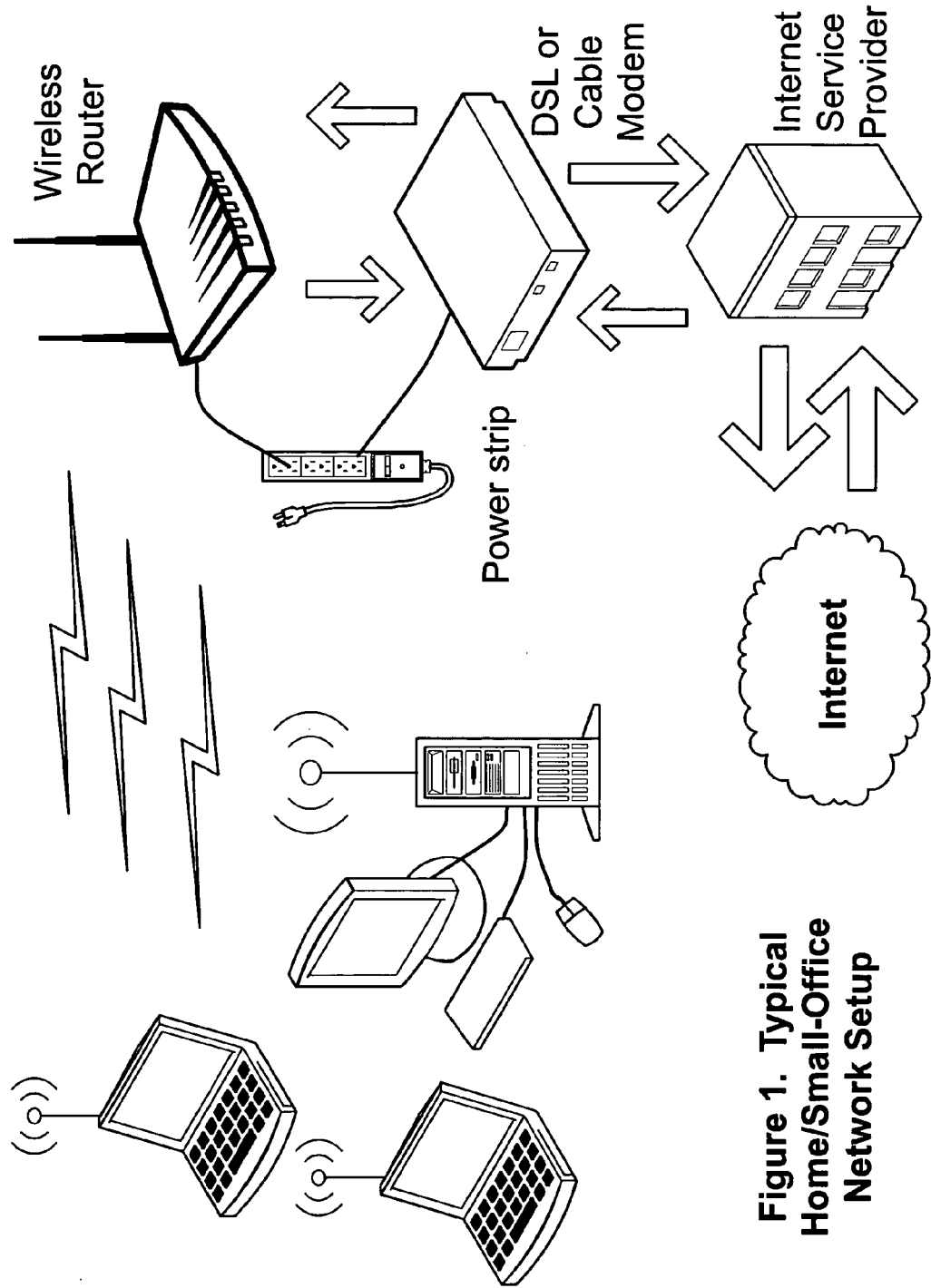
Figure 1. Typical Home/Small-Office Network Setup

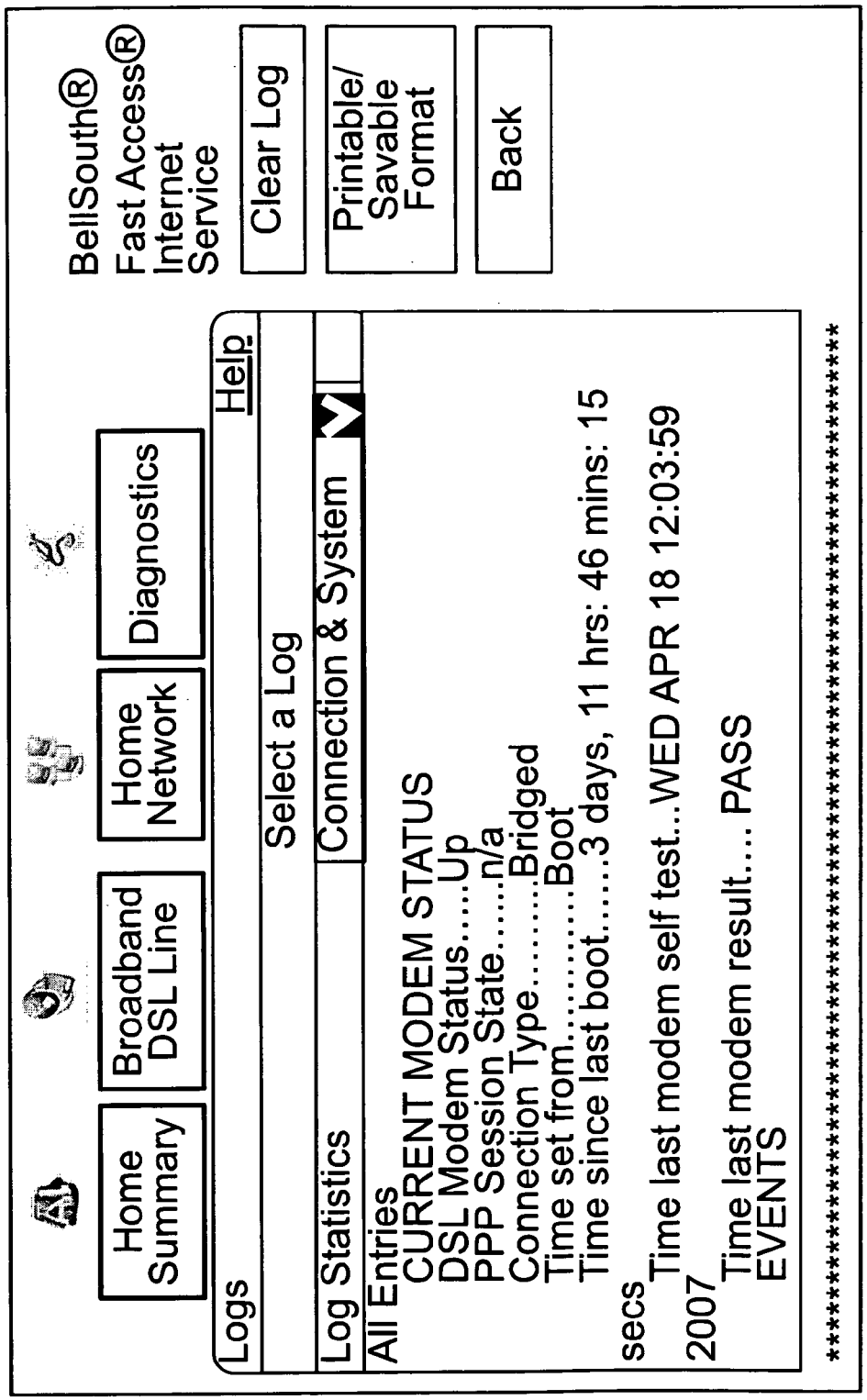
Figure 2A. DSL Modem Web GUI Example

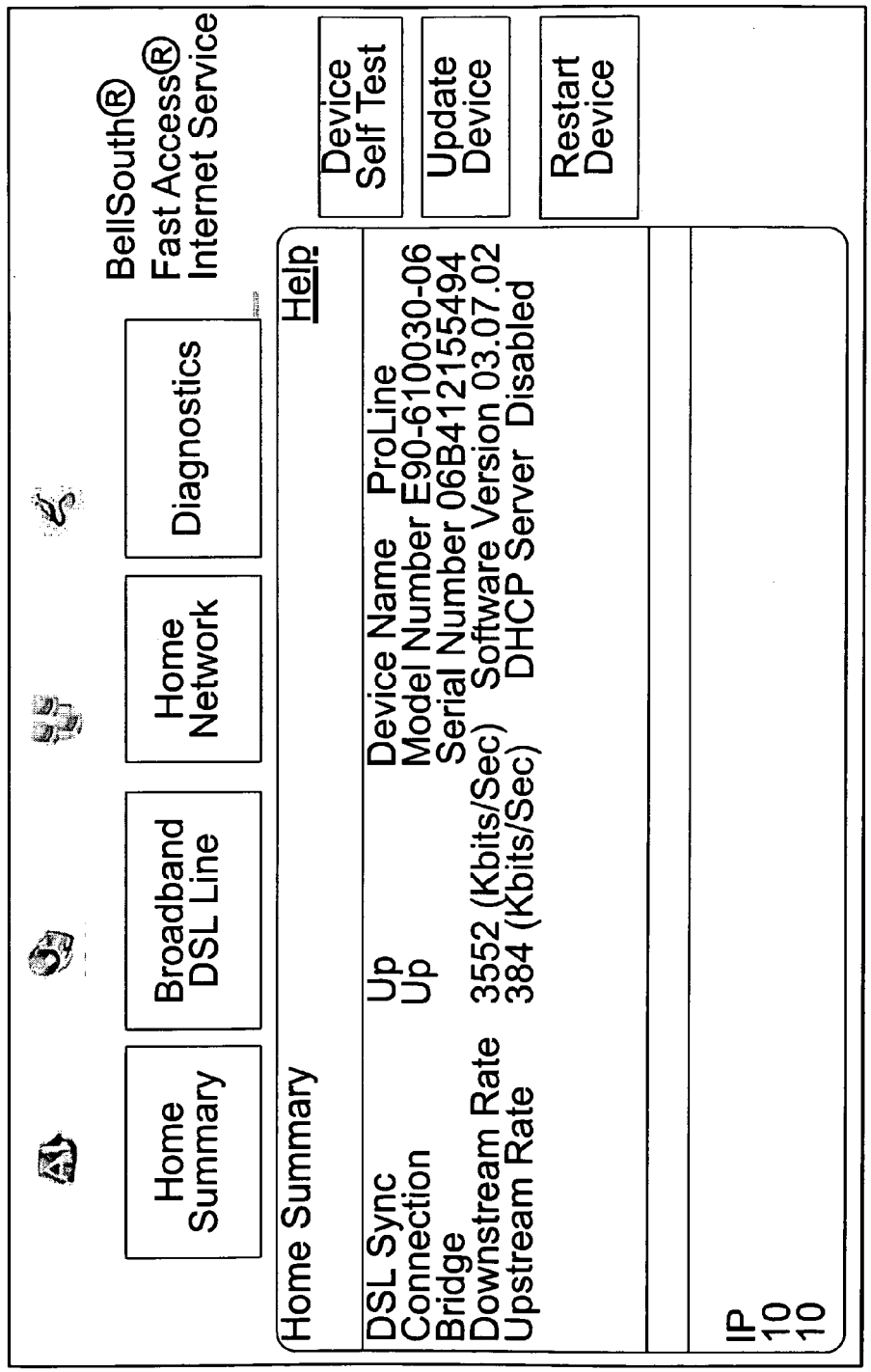
Figure 2B. DSL Modem Web GUI Example

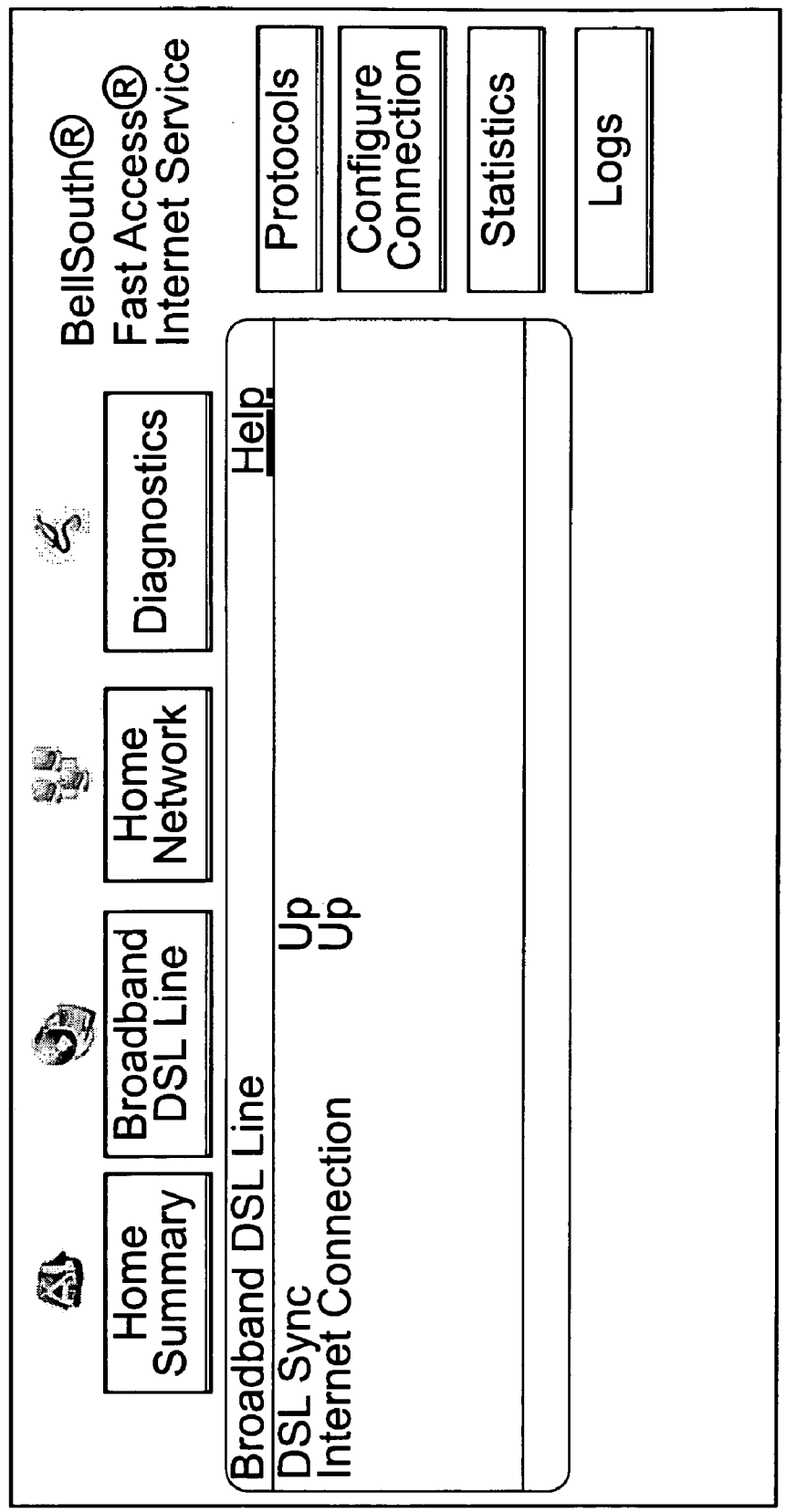
Figure 2c. DSL Modem Web GUI Example

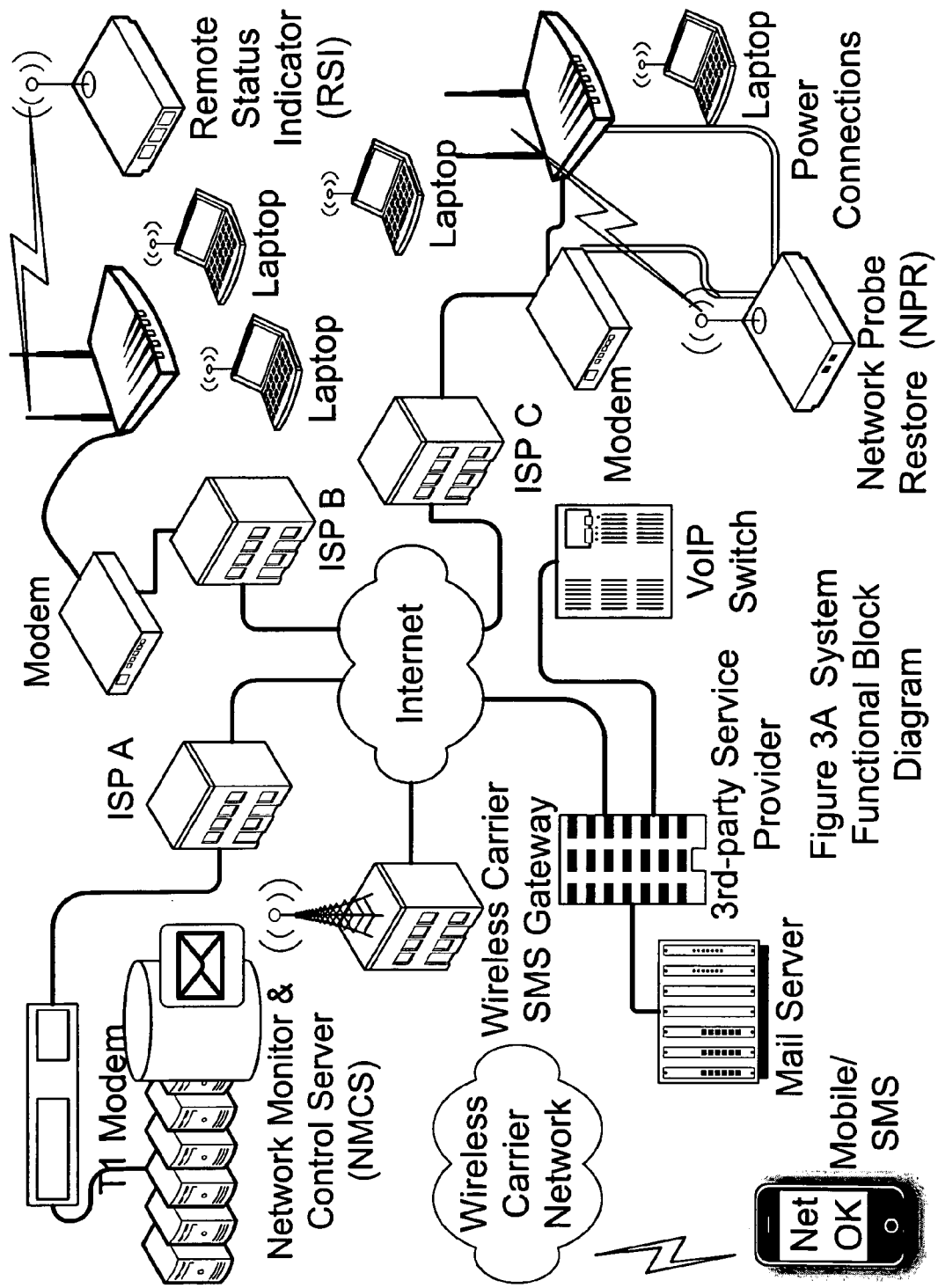

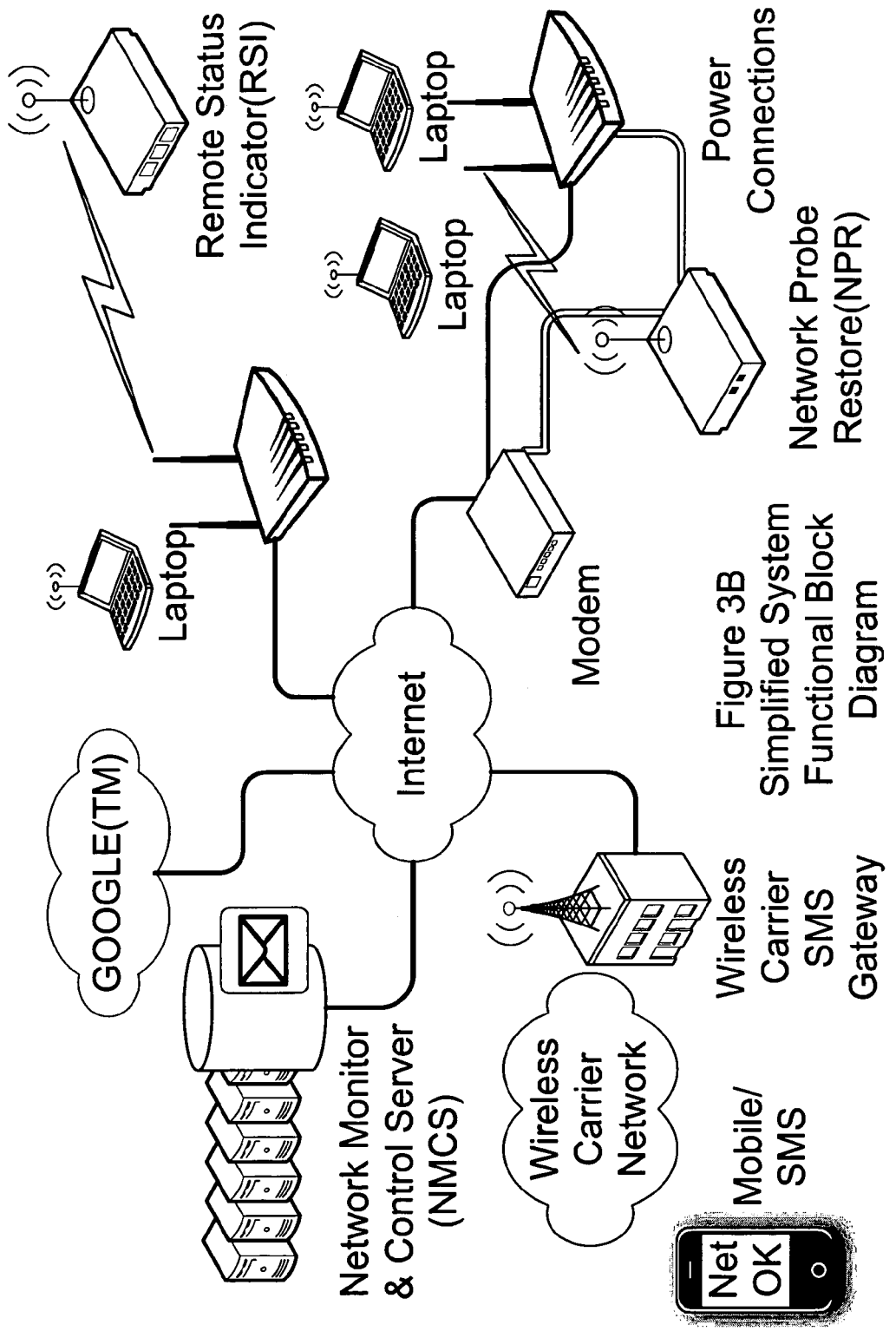
Figure 3B Simplified System Functional Block Diagram

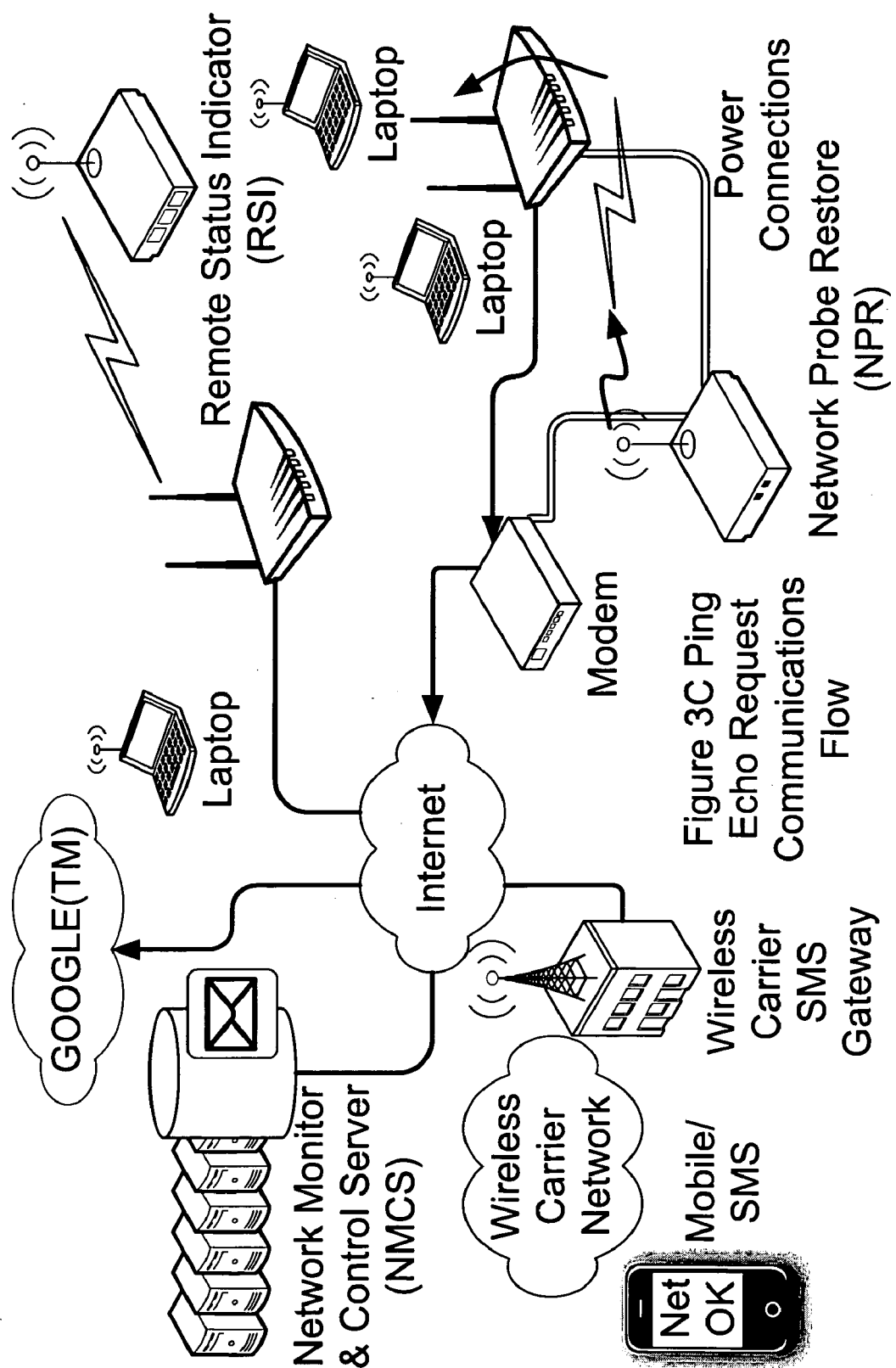

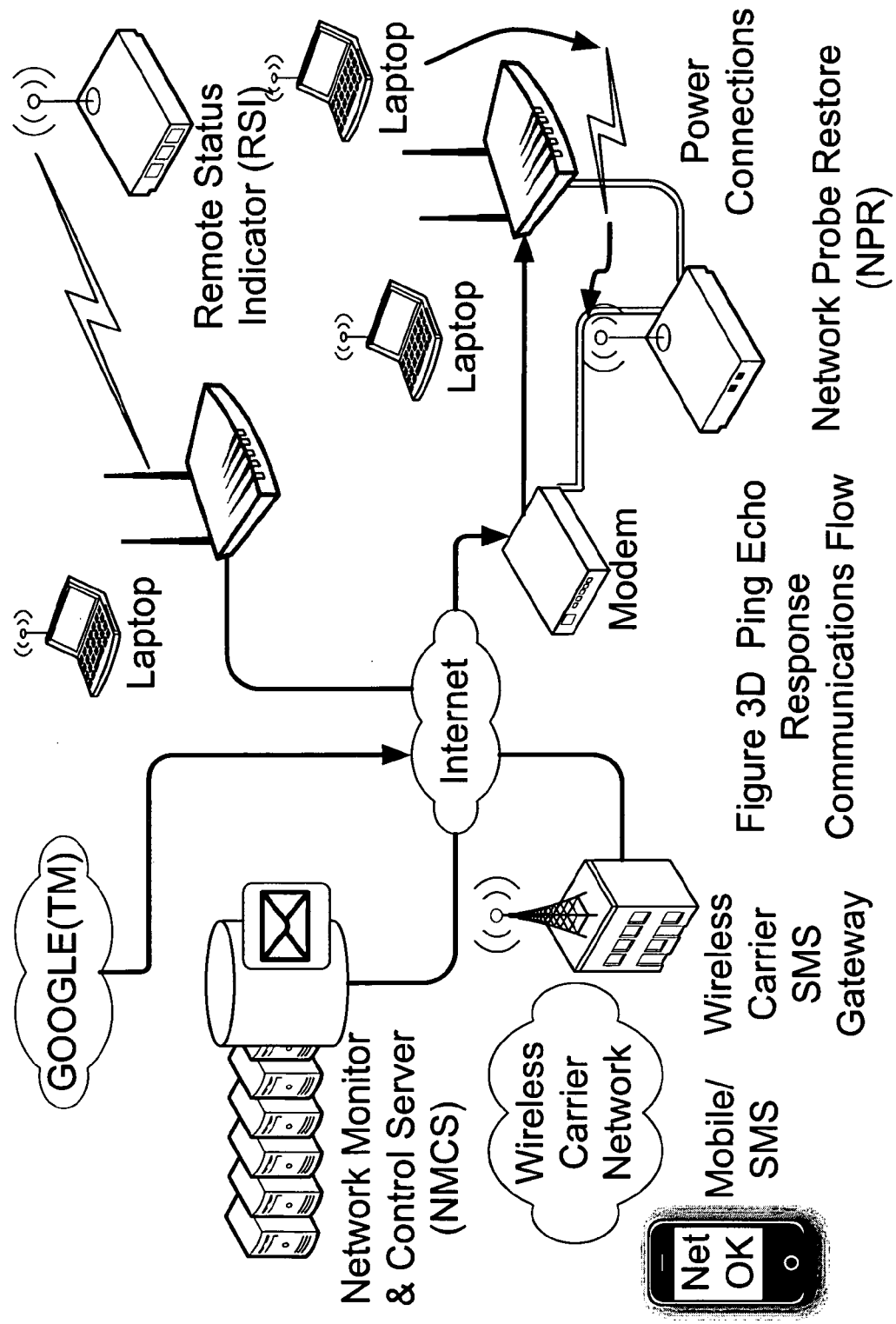

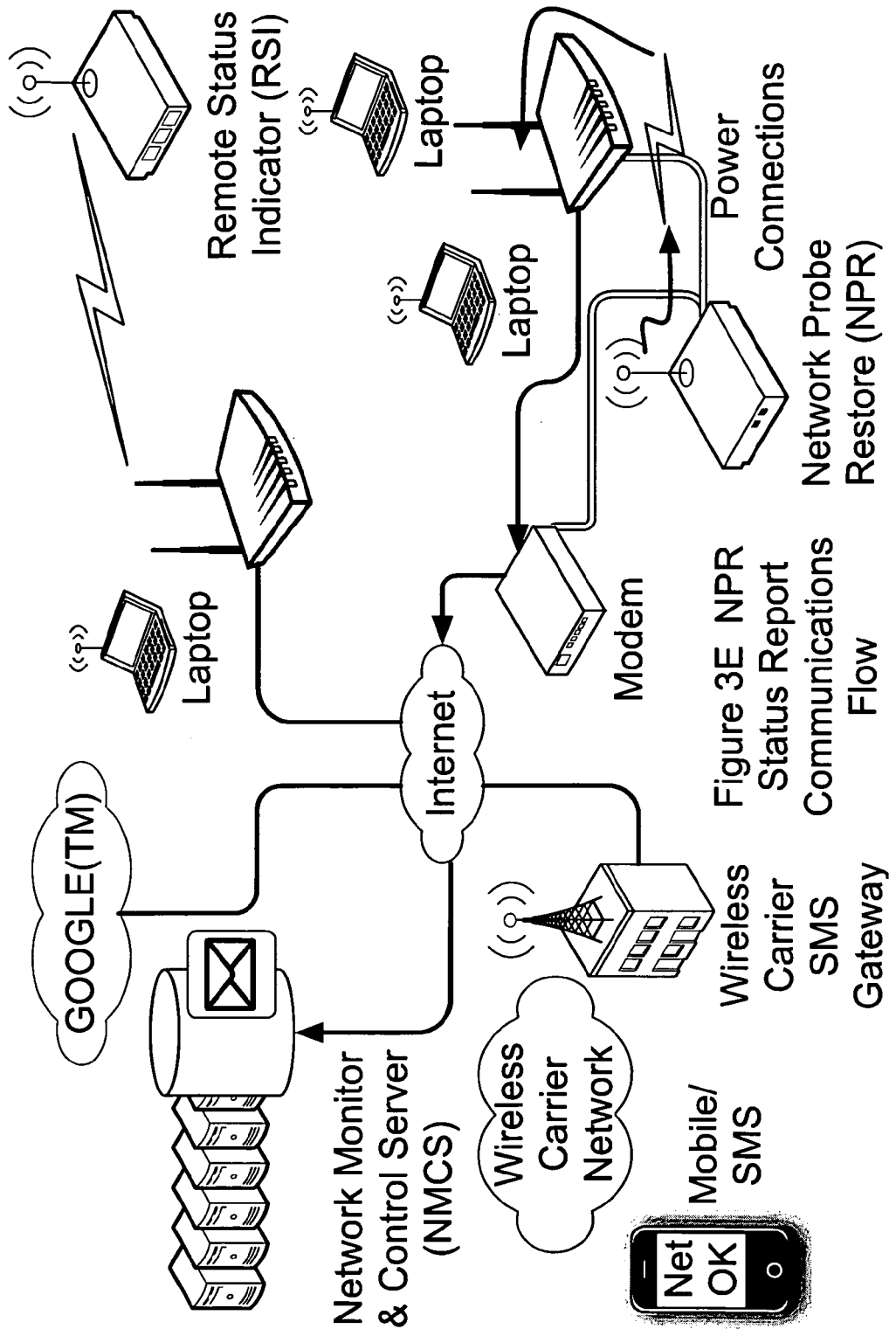
Figure 3E NPR Status Report Communications Flow

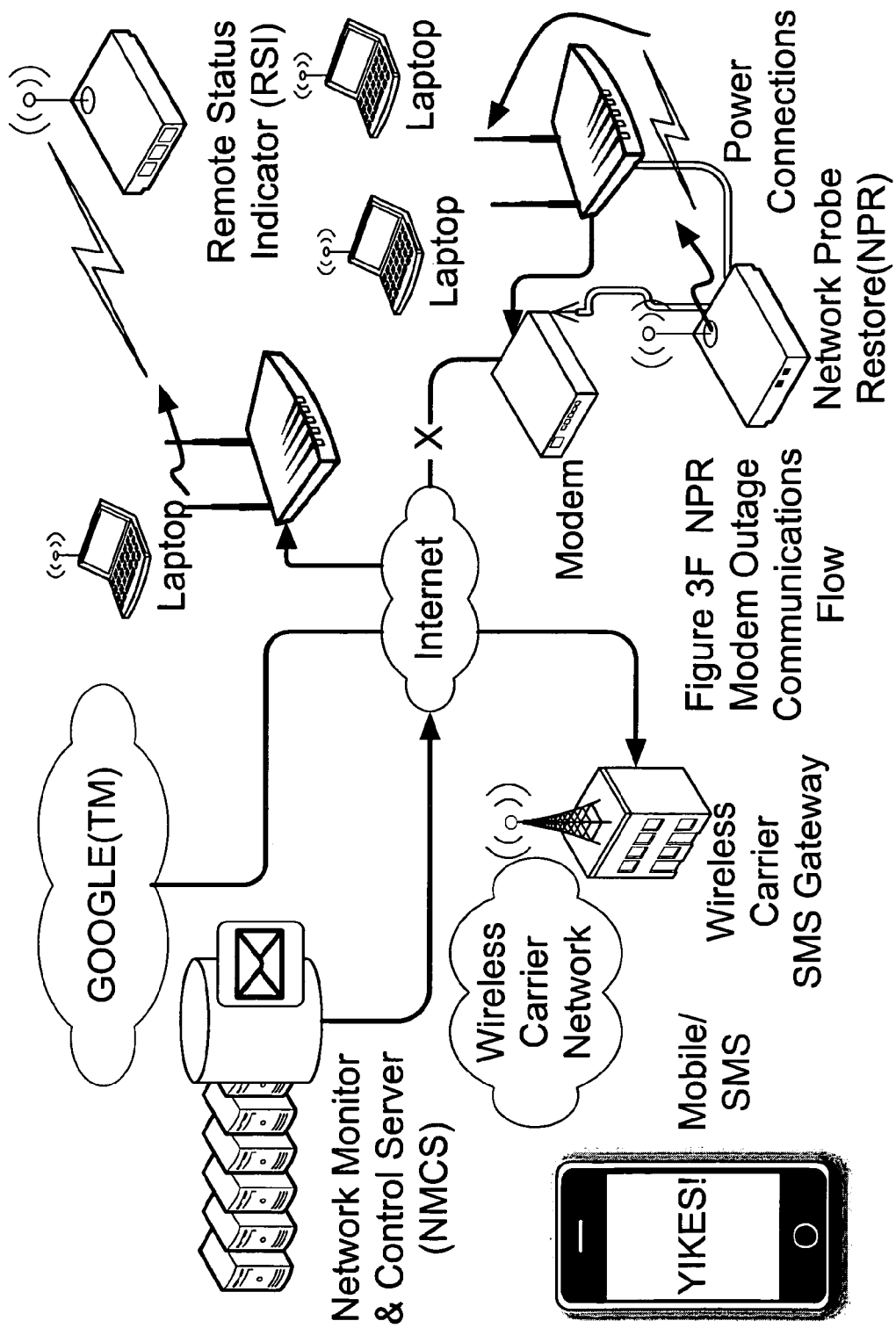
Figure 3F NPR Modem Outage Communications Flow

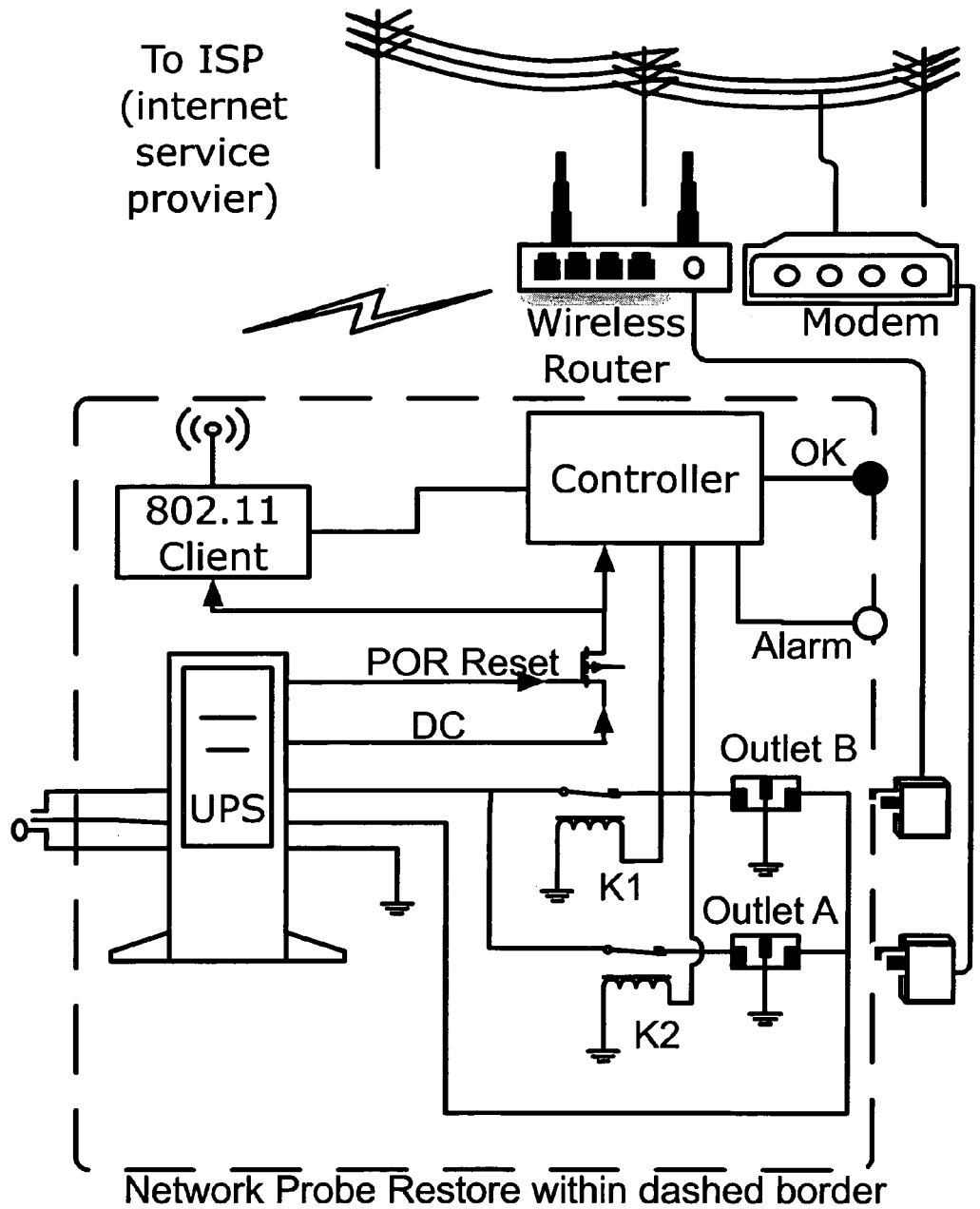
Figure 4A Network Probe Restore Functional Block Diagram

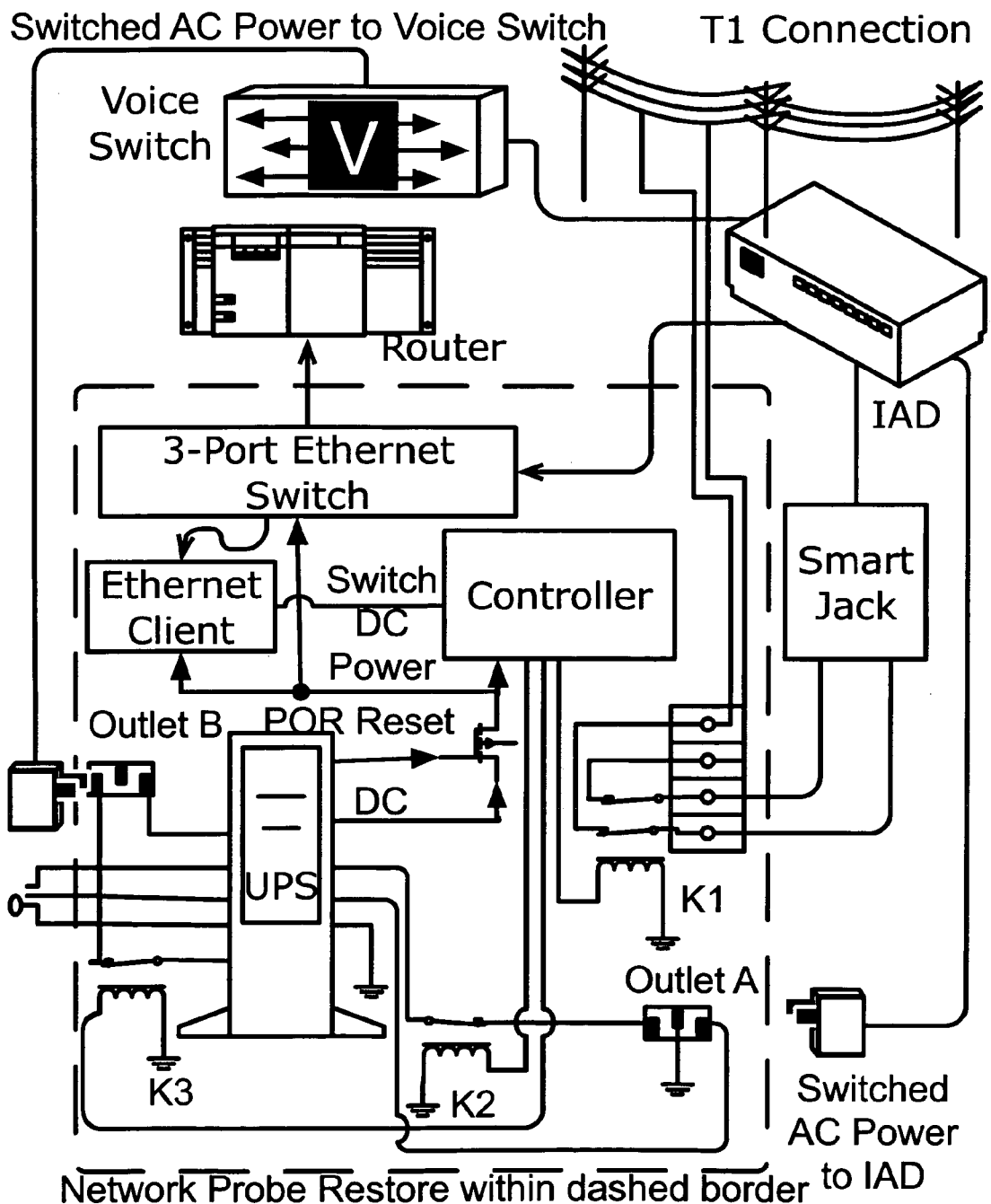
Figure 4B. Network Probe Restore for IAD,
Wired Ethernet Functional Block Diagram

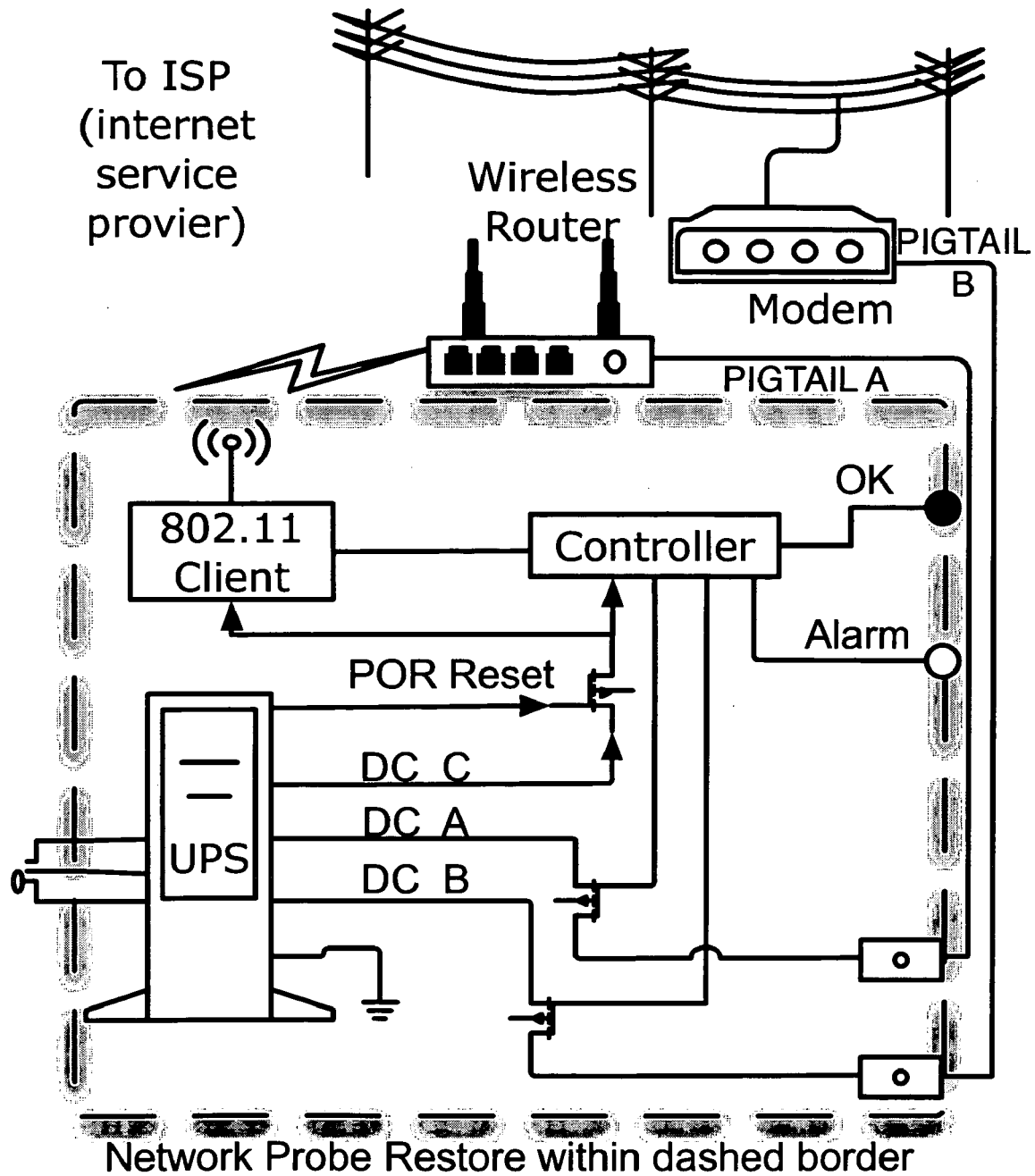
**Figure 4C Network Probe Restore
with Switched DC Power
Functional Block Diagram**

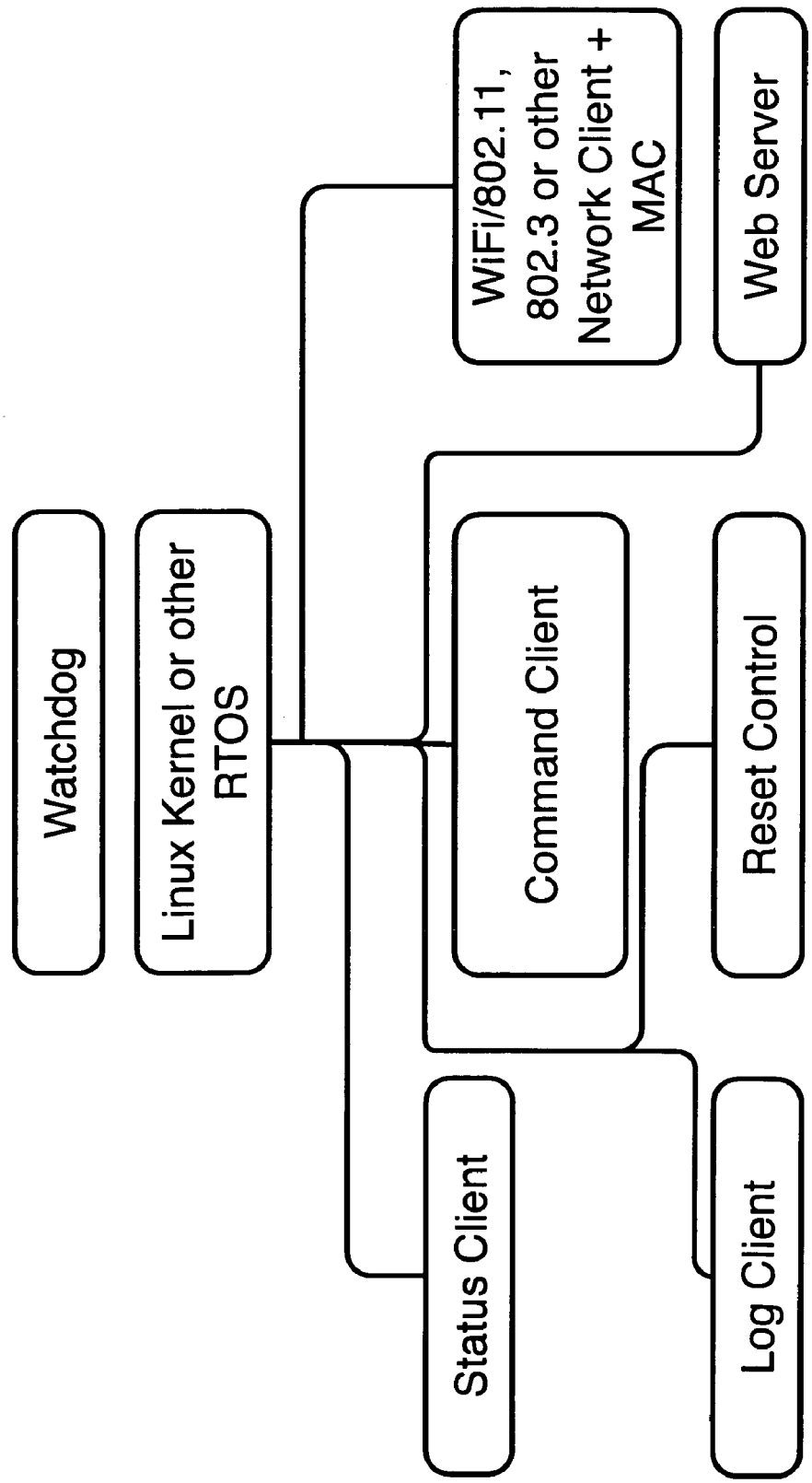
Figure 4D NPR Internal Software Structure

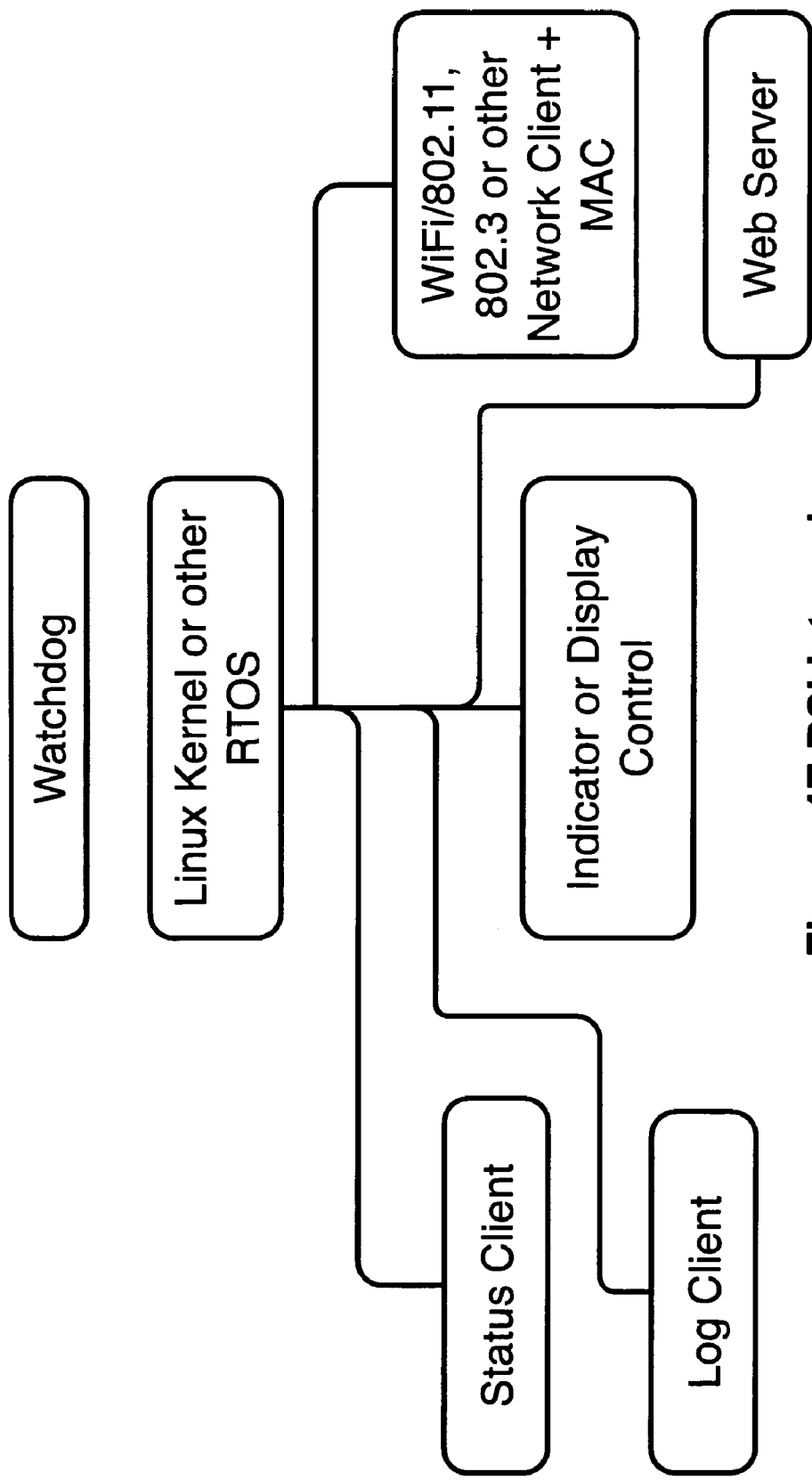
Figure 4E RSI Internal Software Structure

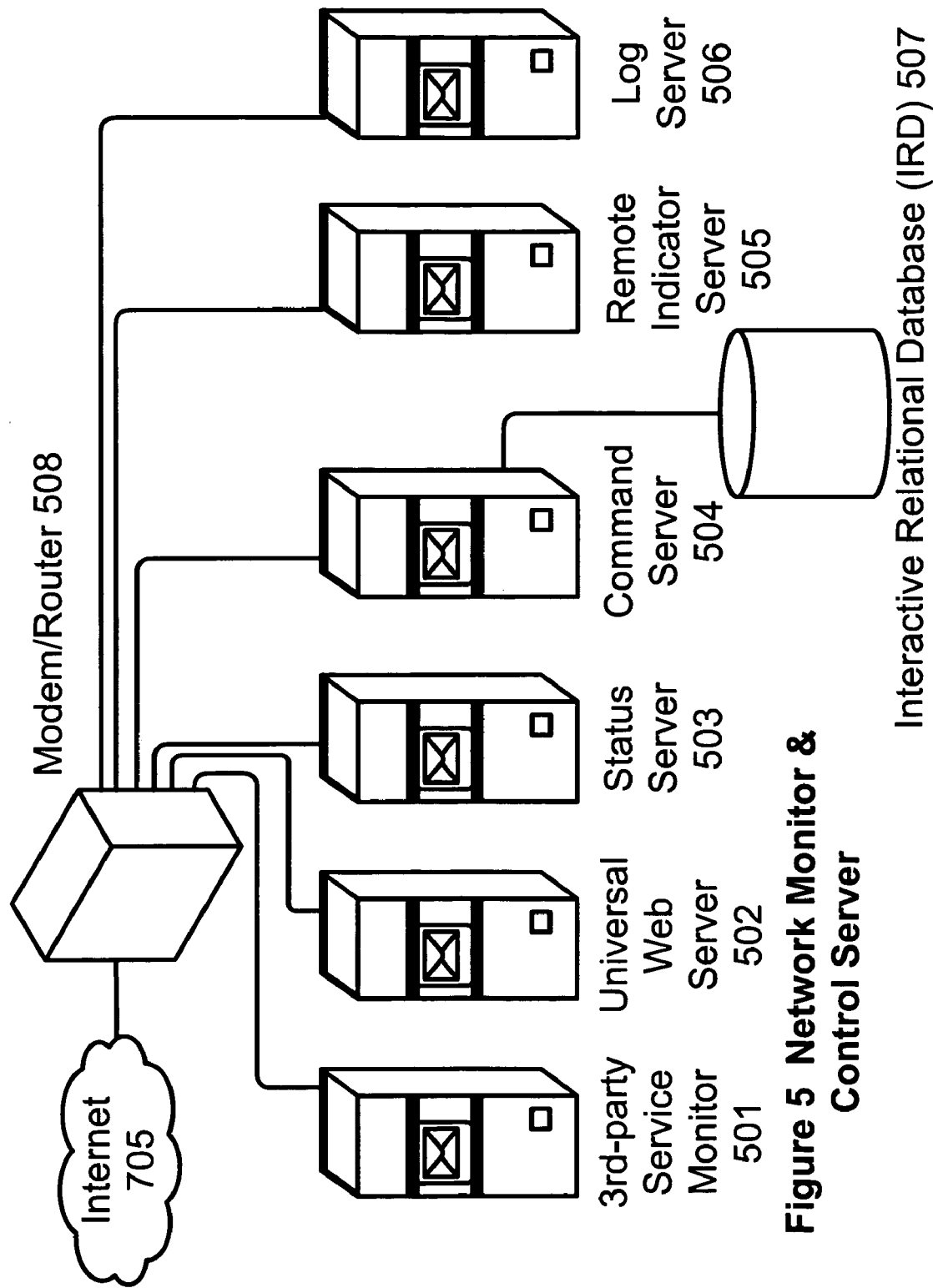
Figure 5 Network Monitor & Control Server

WEB FORM1 - WINDOWS INTERNET EXPLORER

HTTP://64.105.4.130:88/netdefib/default.aspx

Bookmarks: BSAcctMgt Eton DDHome Westell NDFA NDF Web fPBX DK Mcp Ddg Wiki PTO Speed Wacho wds

NetDefib Login

User Name: 
Password: 
(Logon)

Commands For Unit 00:18:39:EC:D2:D8

| Submit Time | Processed Time | Status | Outlet A | Outlet B | |
|---|---|---|---|---|---|
| 5/6/2007 7:23:18 PM | 5/6/2007 7:23:41 PM | Processed | ☑ | ☐ | Cancel |
| 5/22/2007 7:46:47 PM | 5/22/2007 7:47:45 PM | Processed | ☐ | ☐ | Cancel |
| 4/30/2007 10:34:41 PM | 4/30/2007 10:35:52 PM | Processed | ☑ | ☑ | Cancel |
| 4/30/2007 10:20:10 PM | 4/30/2007 10:21:07 PM | Processed | ☐ | ☐ | Cancel |
| 4/30/2007 2:33:00 PM | 4/30/2007 2:34:26 PM | Processed | ☑ | ☑ | Cancel |
| 4/28/2007 6:40:32 PM | 4/28/2007 6:42:00 PM | Processed | ☐ | ☐ | Cancel |
| 2/3/2007 10:30:00 PM | 2/3/2007 10:34:12 PM | Processed | ☑ | ☑ | Cancel |
| 2/1/2007 1:43:17 PM | | Timeout | | | Cancel |
| 1/28/2007 10:04:32 PM | | Timeout | | | Cancel |

(Refresh)

Schedule Reboot

Schedule Reboot ⊙ Enabled ○ Disable
Interval (in seconds) ○ 3600
At a set Time ⊙ 04 ⌄ 44 ⌄ Everyday ⌄
☐ Reset Outlet A ☐ Reset NPR ☐ Reset Outlet B

Send Command To Unit
☐ Reset Outlet A
☐ Reset Outlet B
☐ Reset Both (Send)

Figure 6A Control Server Web GUI

| Commands For Unit 00:18:39:EC:D2:D8 | | | | | |
|---|---|---|---|---|---|
| Submit Time | Processed Time | Status | Outlet A | Outlet B | |
| 5/6/2007 7:23:18 PM | 5/6/2007 7:23:41 PM | Processed | ☑ | ☐ | Cancel |
| 5/22/2007 7:46:47 PM | 5/22/2007 7:47:45 PM | Processed | ☐ | ☑ | Cancel |
| 4/30/2007 10:34:41 PM | 4/30/2007 10:35:52 PM | Processed | ☑ | ☐ | Cancel |
| 4/30/2007 10:20:10 PM | 4/30/2007 10:21:07 PM | Processed | ☐ | ☑ | Cancel |
| 4/30/2007 2:33:00 PM | 4/30/2007 2:34:26 PM | Processed | ☐ | ☑ | Cancel |
| 4/28/2007 6:40:32 PM | 4/28/2007 6:42:00 PM | Processed | ☑ | ☐ | Cancel |
| 2/3/2007 10:30:00 PM | 2/3/2007 10:34:12 PM | Processed | ☐ | ☑ | Cancel |
| 2/1/2007 1:43:17 PM | | Timeout | ☐ | ☑ | Cancel |
| 1/28/2007 10:04:32 PM | | Timeout | | | |

Refresh

Send Command To Unit
☑ Reset Outlet A       ☐ Reset Outlet A
☐ Reset Outlet B       ☐ Reset NPR
Send                              ☐ Reset Outlet B Schedule Reboot
Schedule Reboot      ⦿ Enabled  ◯ Disable
Interval (in seconds)  ◯ 3600
At a set Time             ⦿ 04 : 44   Everyday ▾

Figure 6B, Command
Server Web GUI

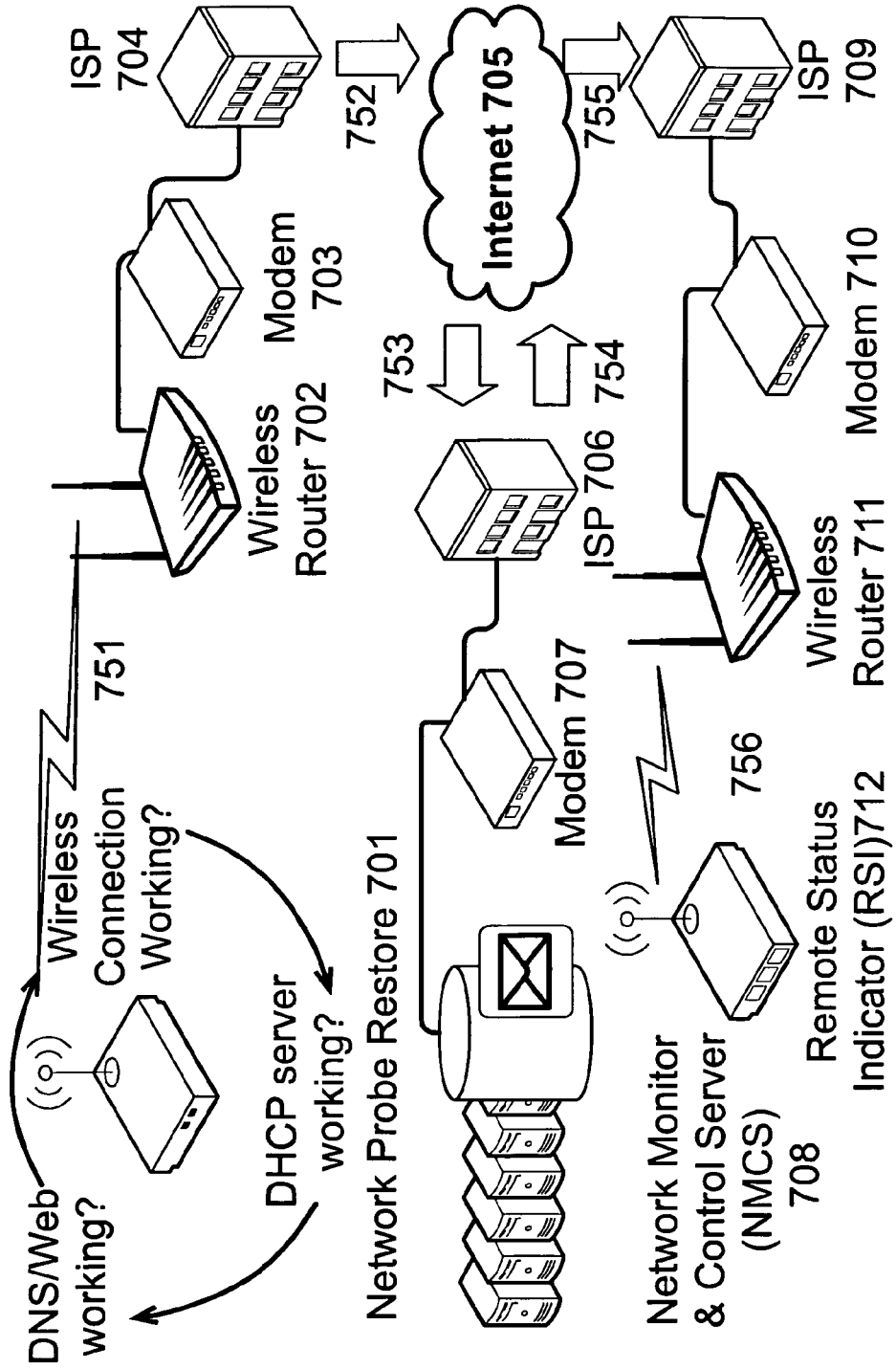

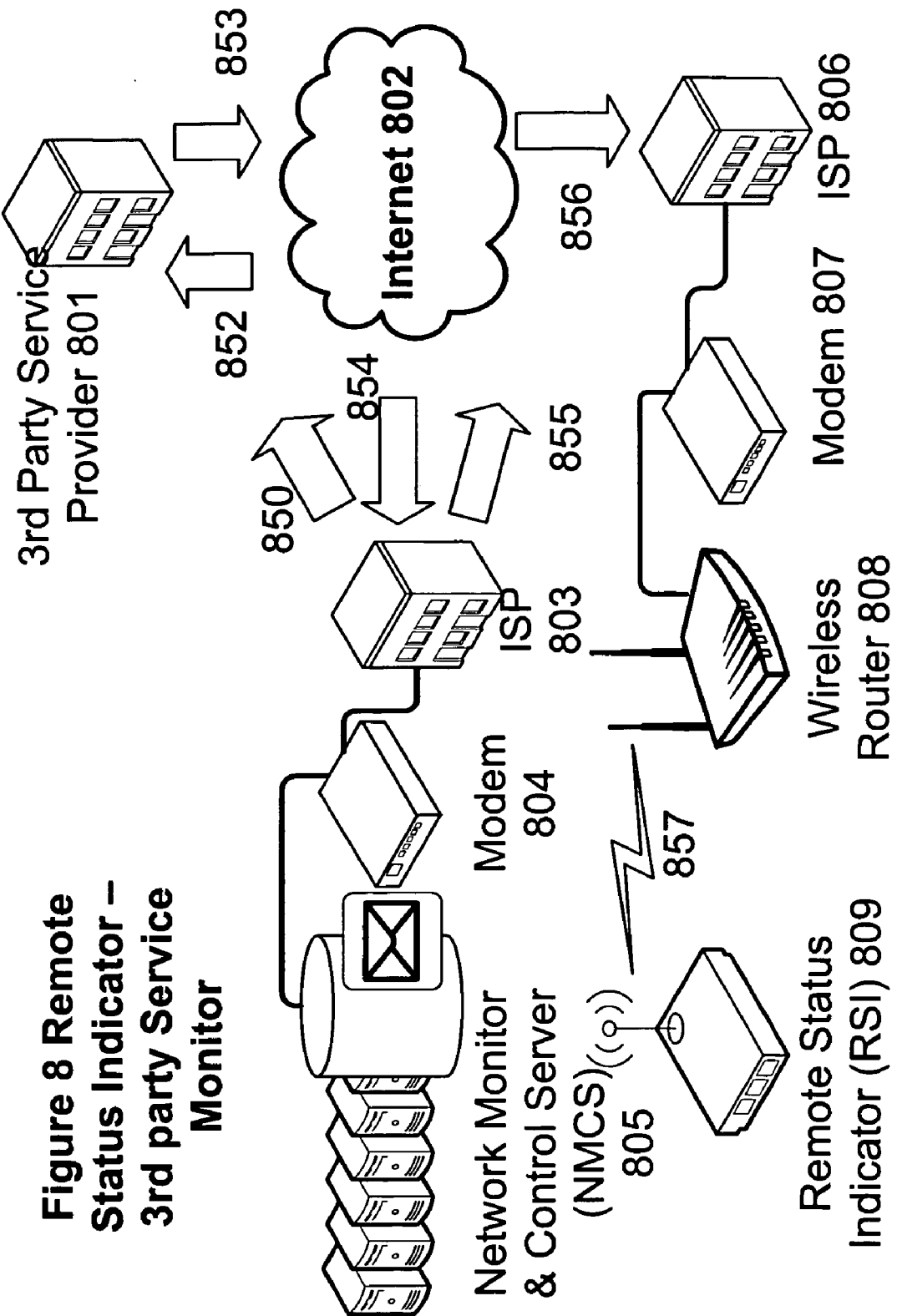

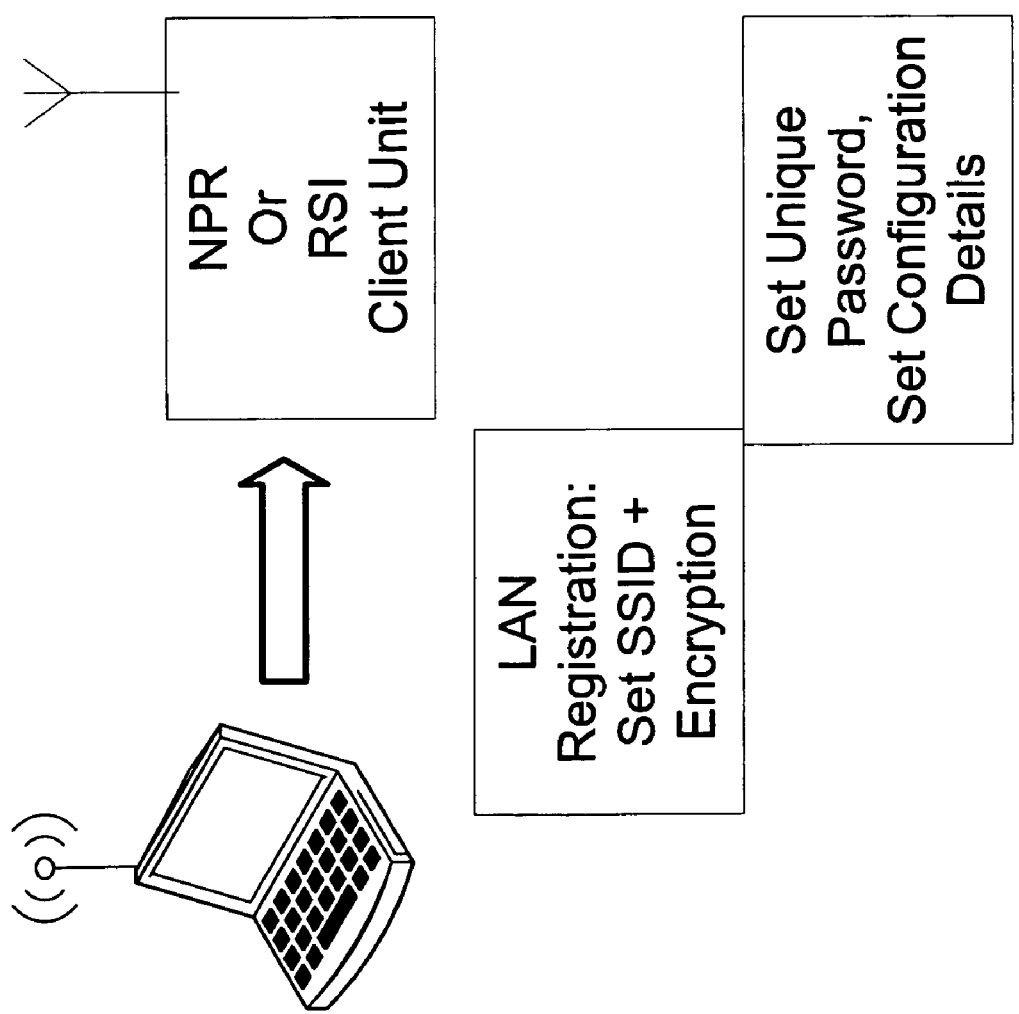
Figure 9. NPR & RSI Client Configuration Communications Flow Diagram

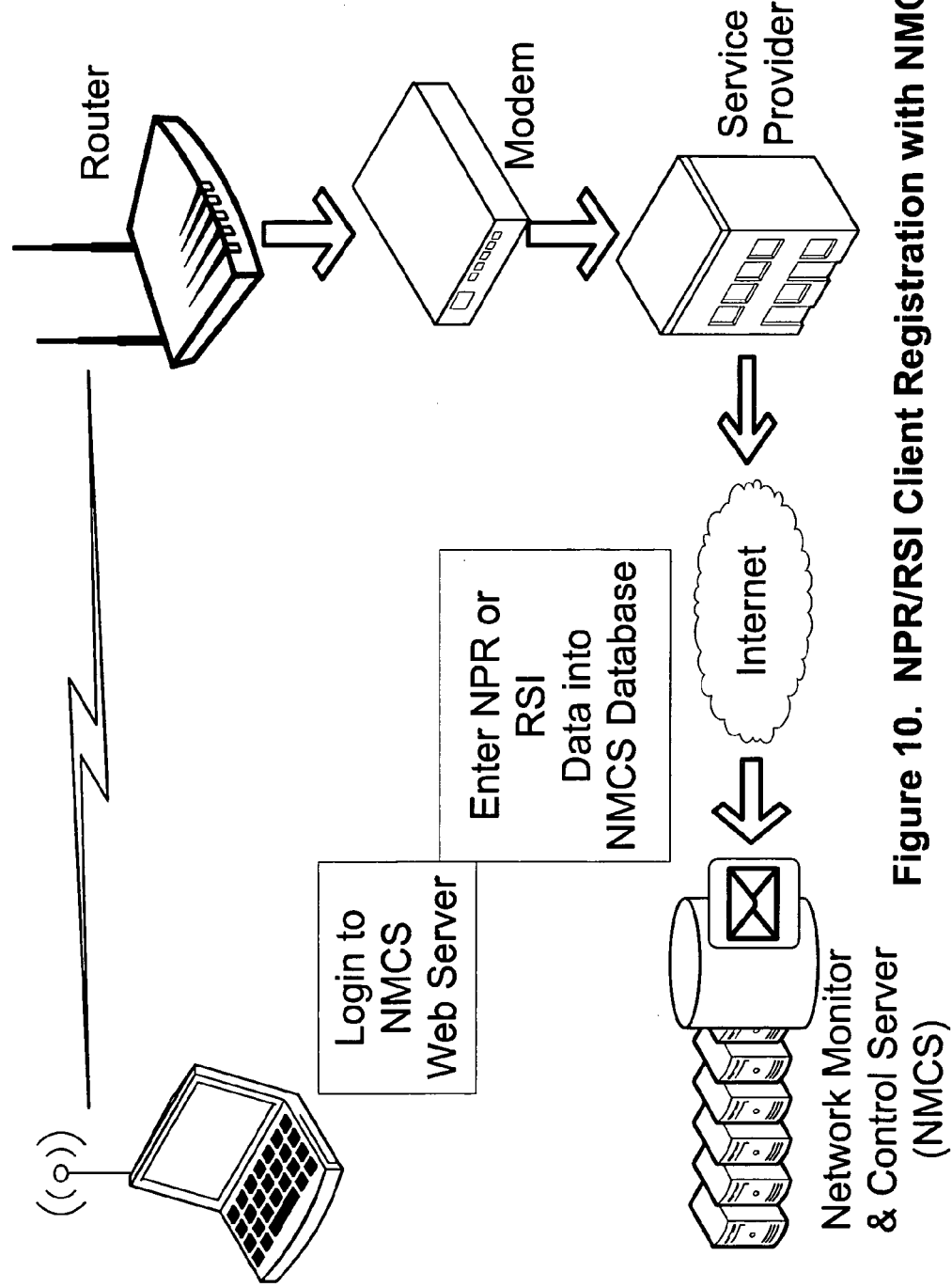
Figure 10. NPR/RSI Client Registration with NMCS

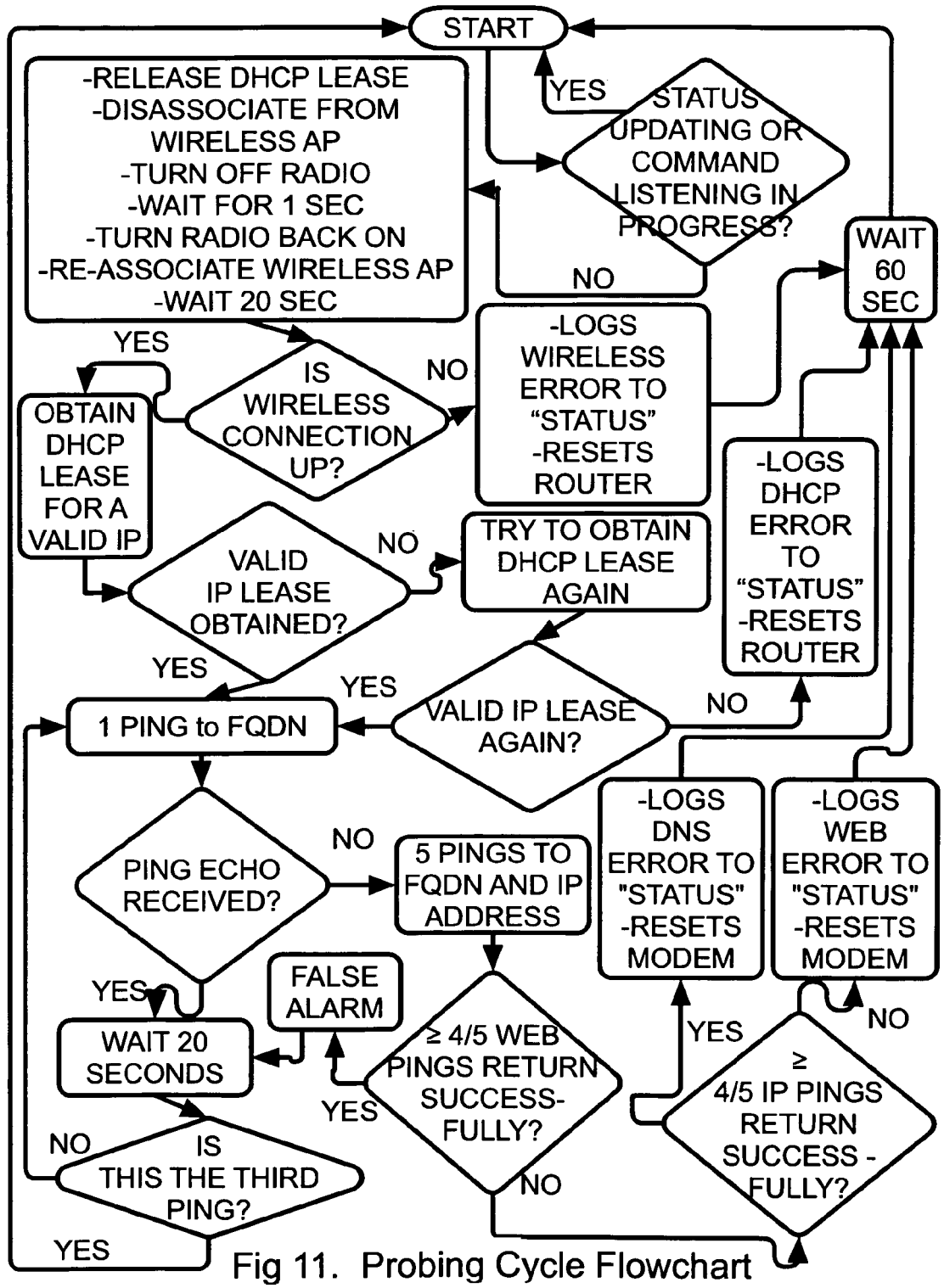
Fig 11. Probing Cycle Flowchart

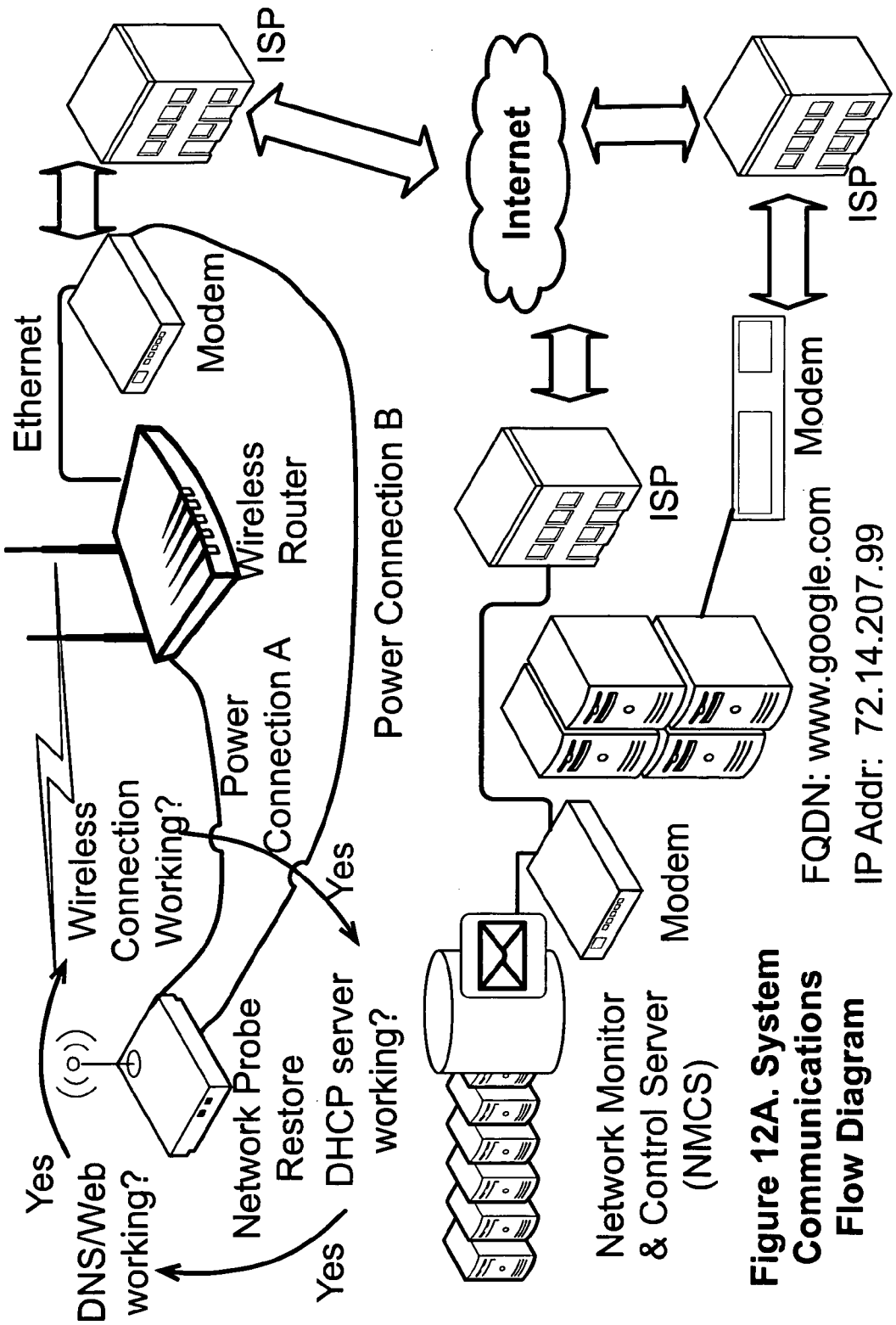

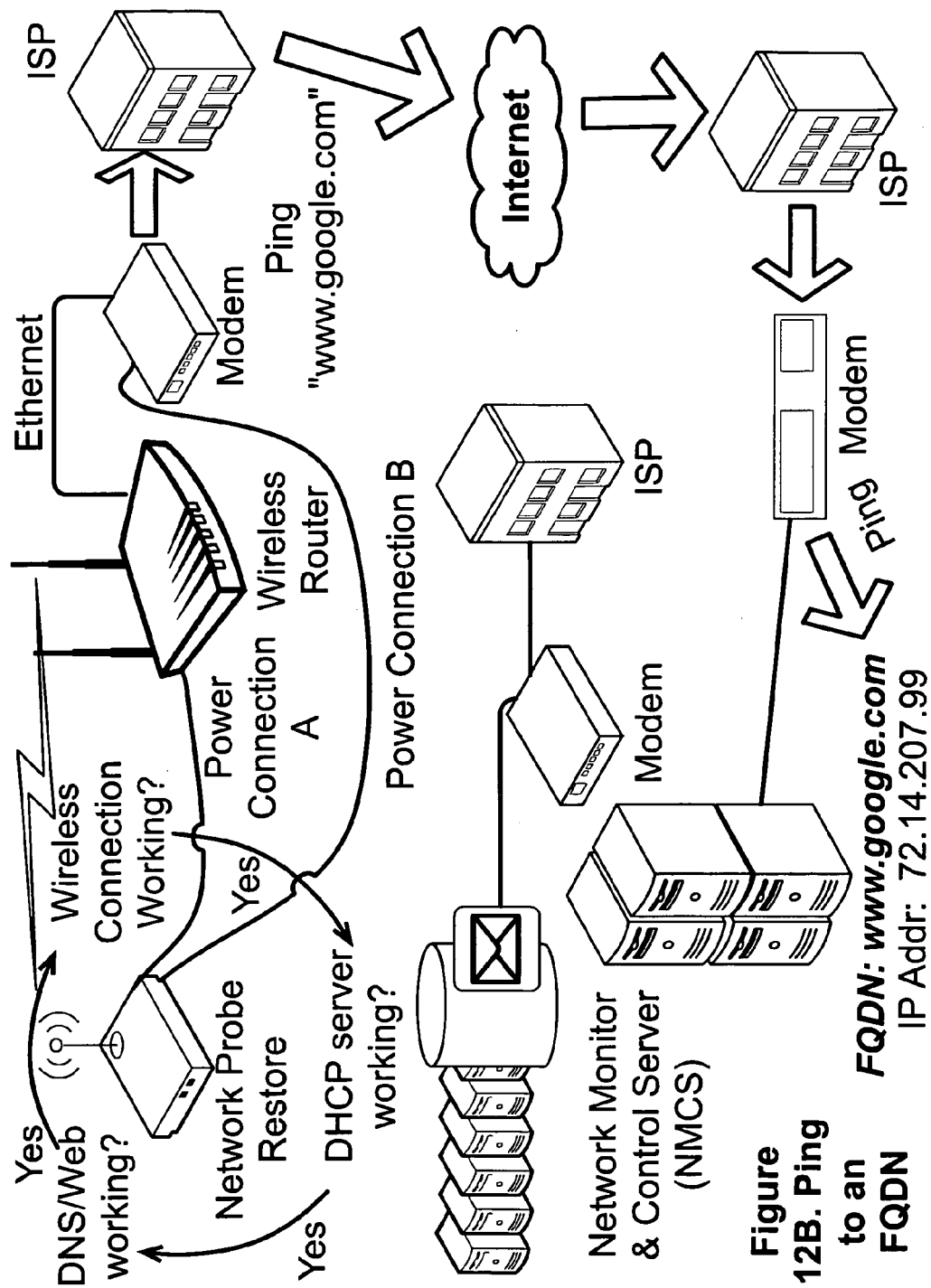
Figure 12B. Ping to an FQDN

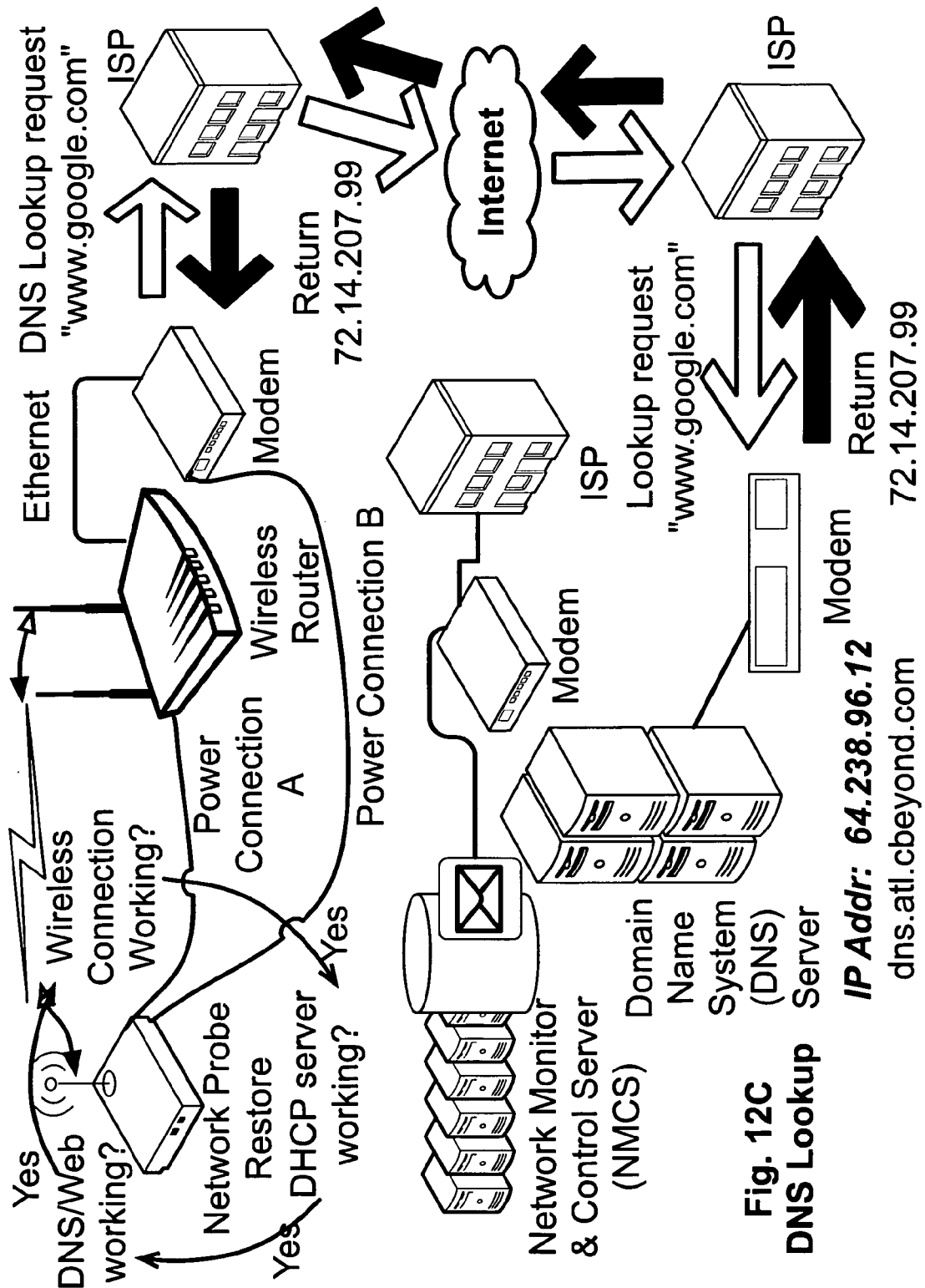
Fig. 12C DNS Lookup

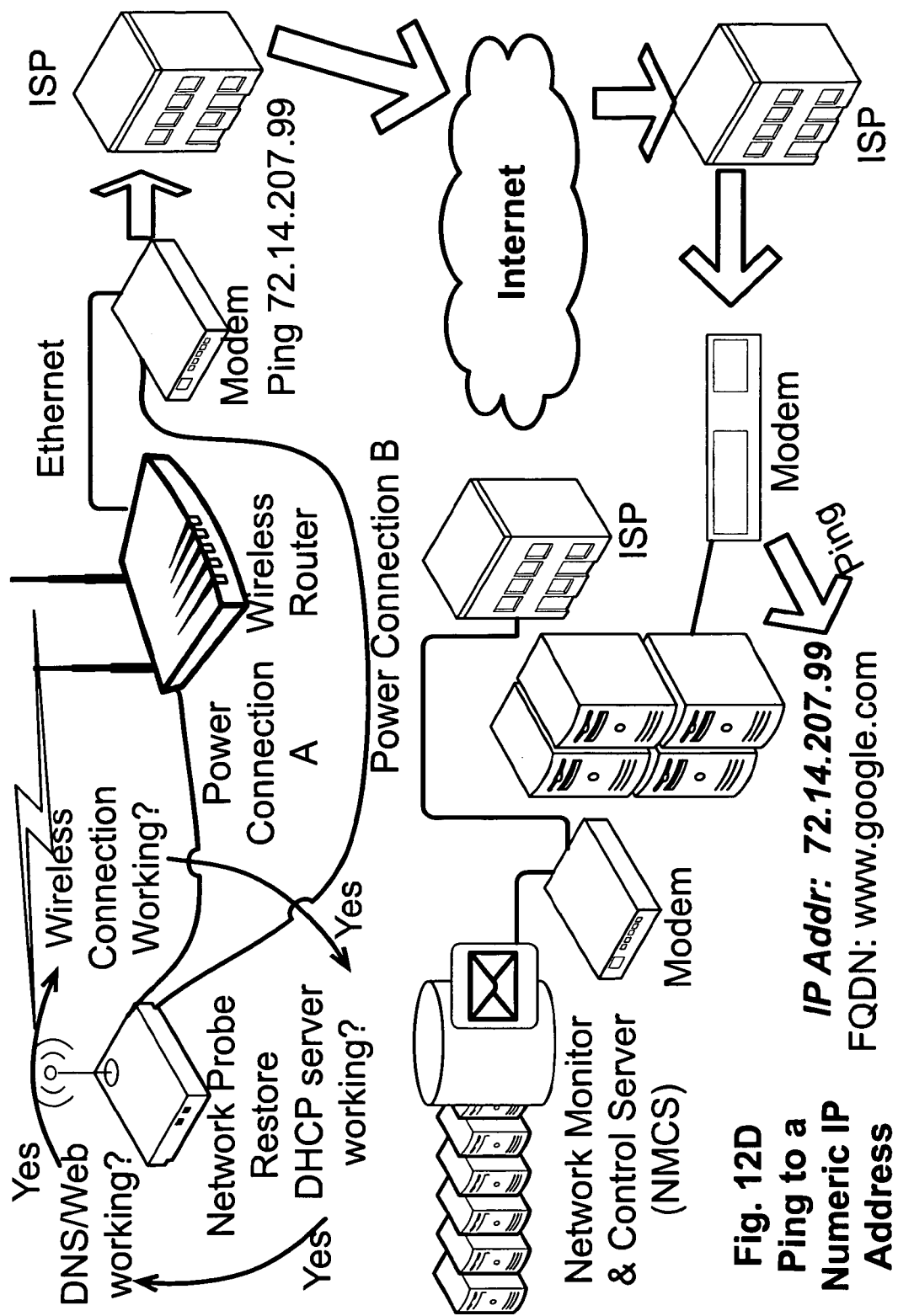

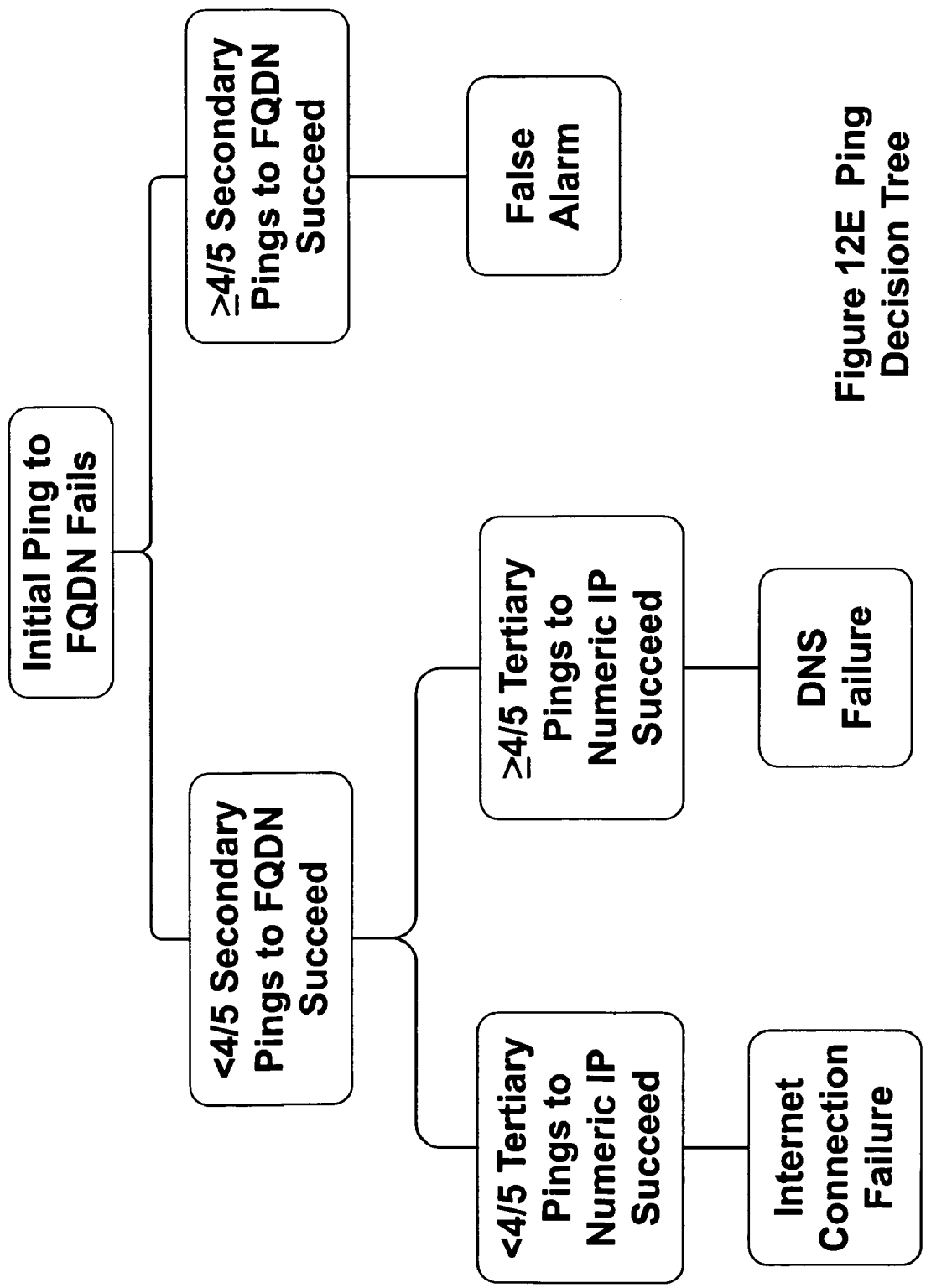
Figure 12E Ping Decision Tree

Ping Echo

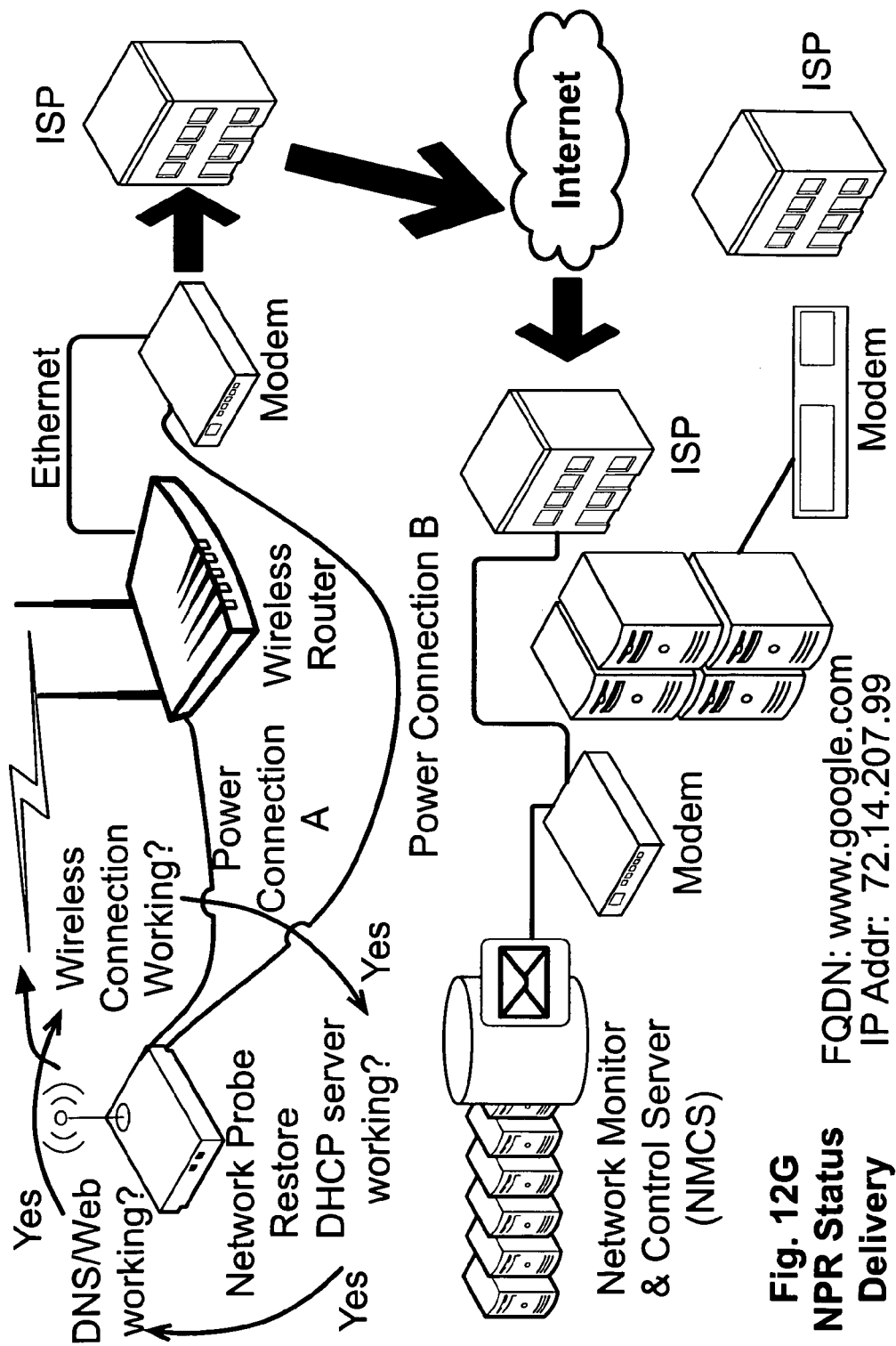

Modem Failure

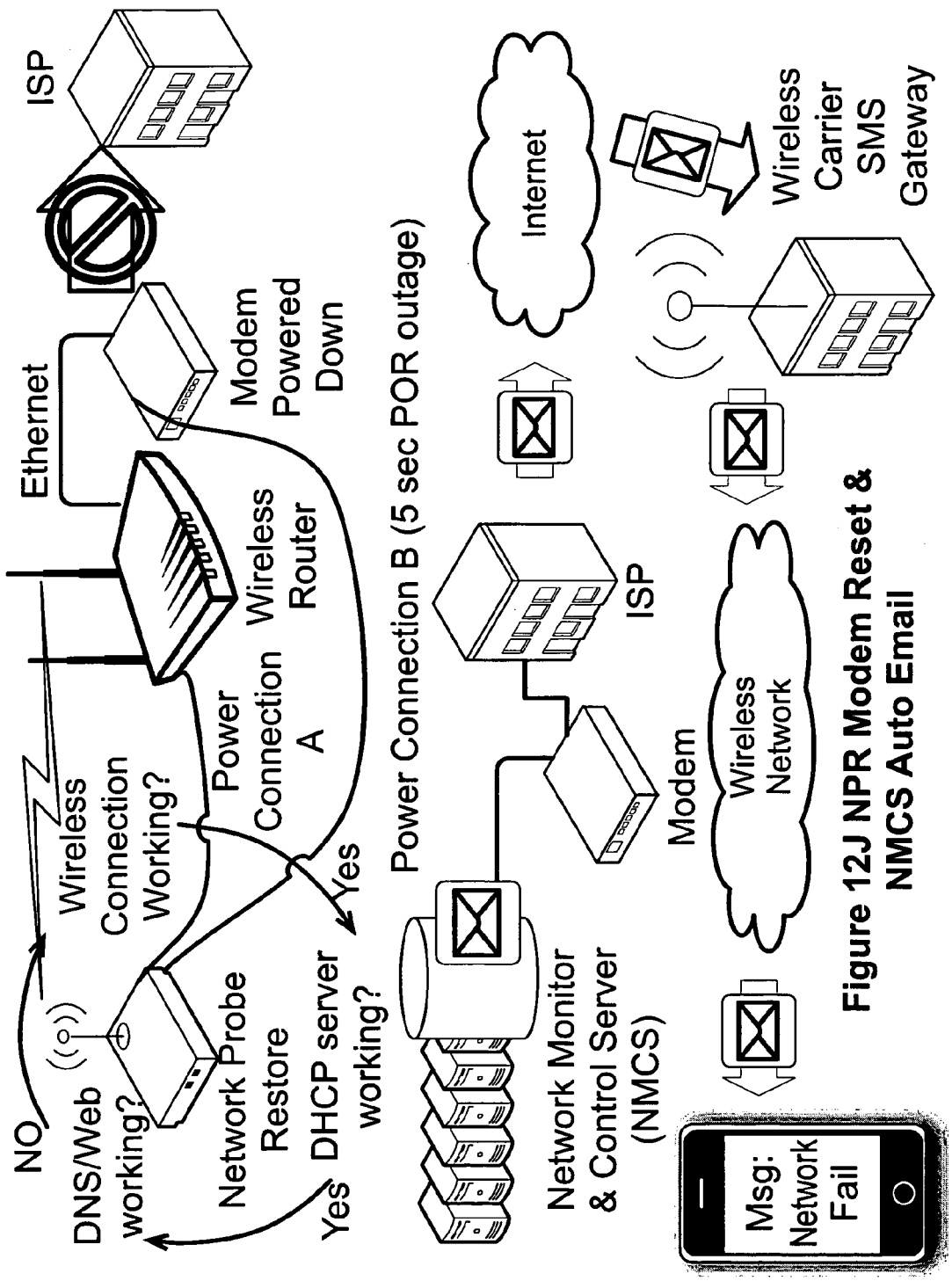
Figure 12J NPR Modem Reset & NMCS Auto Email

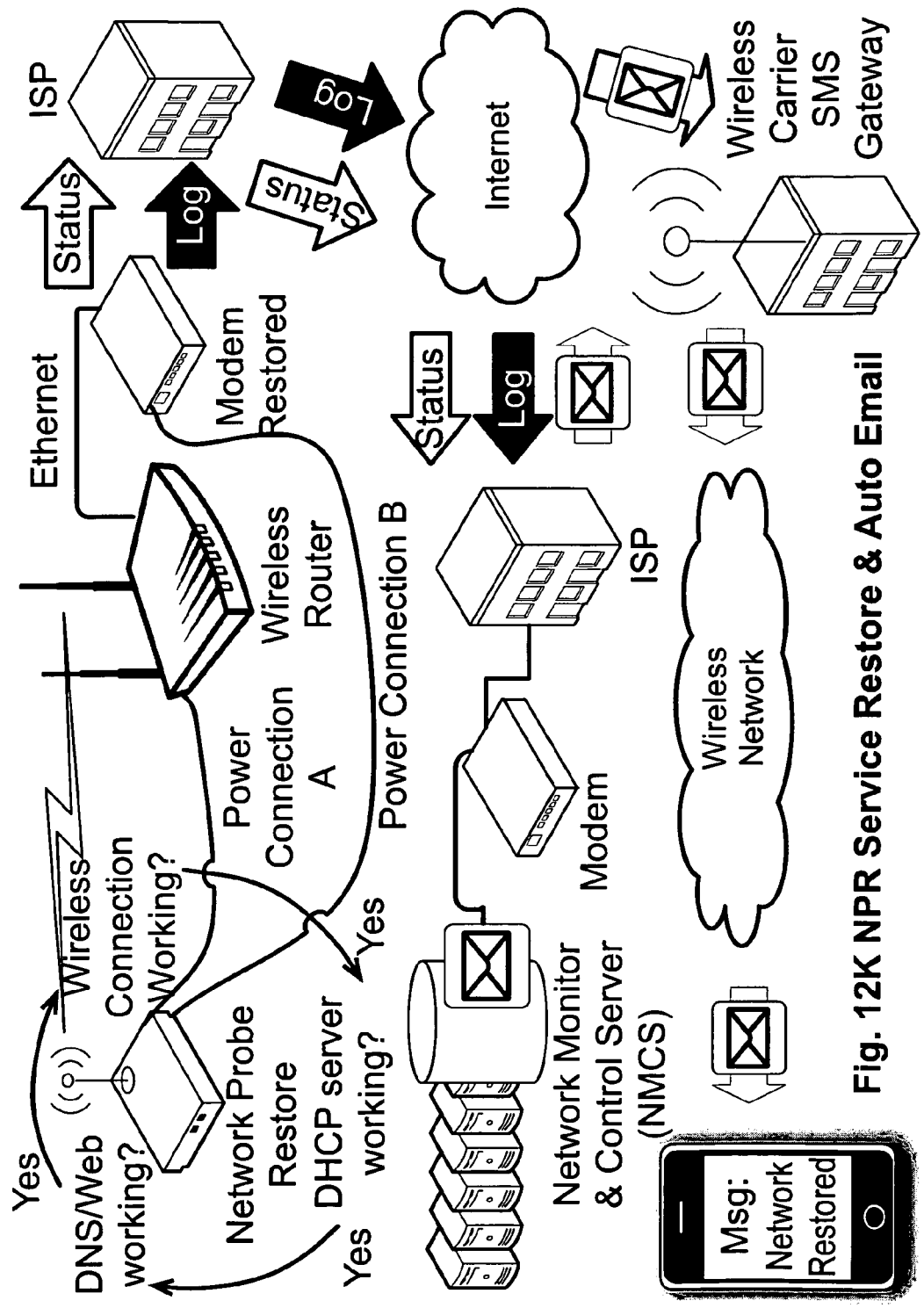
Fig. 12K NPR Service Restore & Auto Email

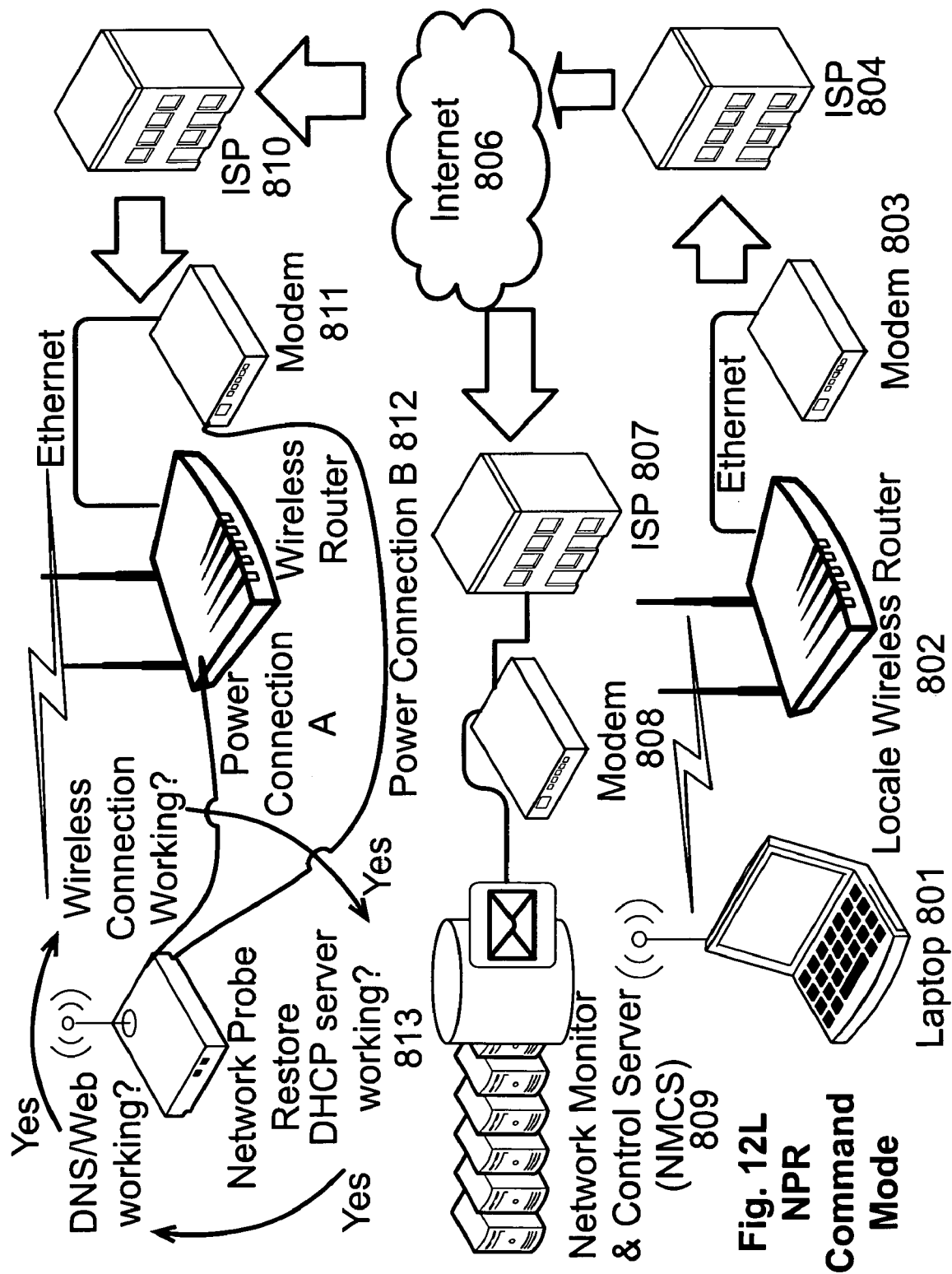
Fig. 12L NPR Command Mode

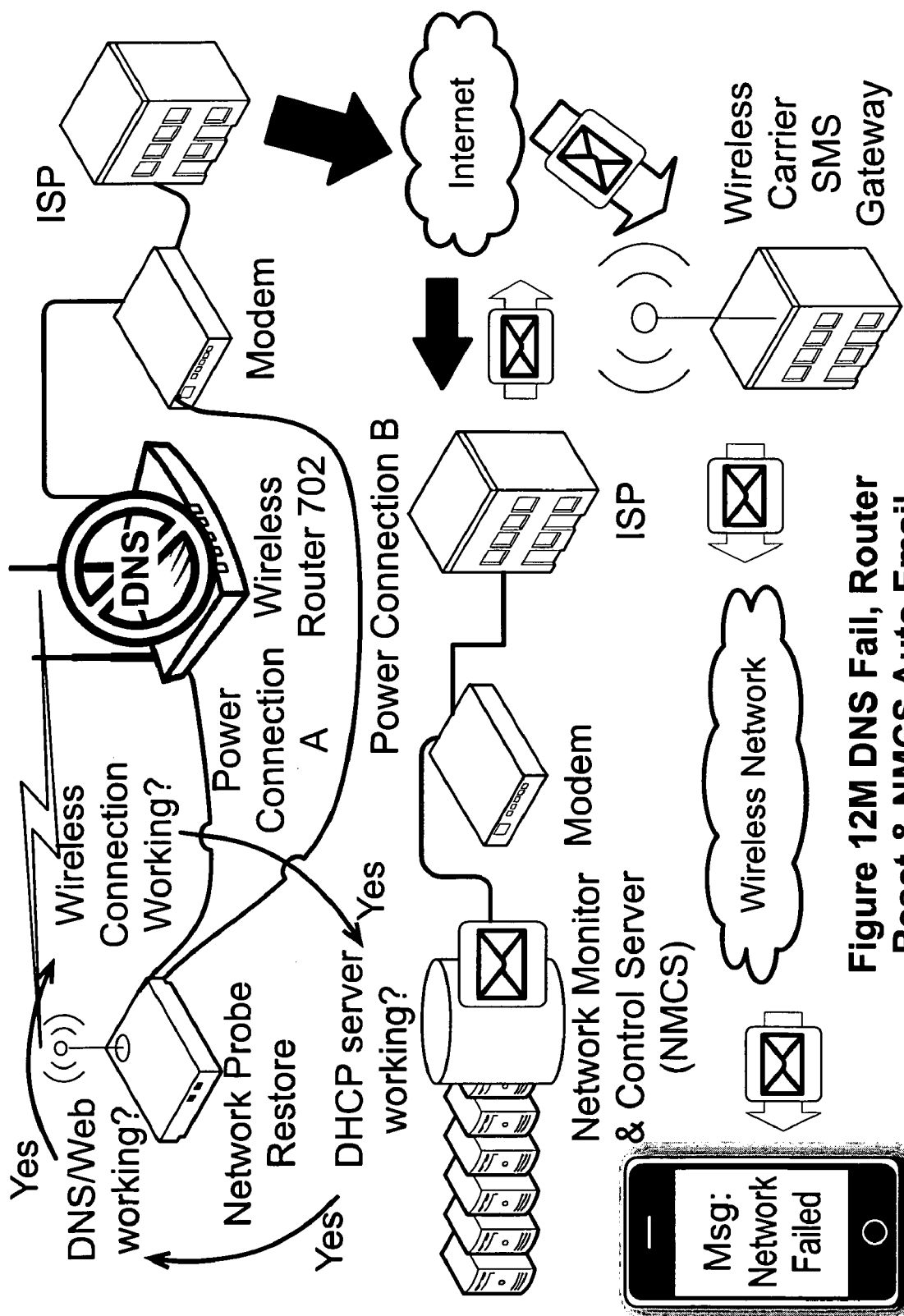
Figure 12M DNS Fail, Router Reset & NMCS Auto Email

| Commands For Unit 00:18:39:EC:D2:D8 | | | | |
|---|---|---|---|---|
| Submit Time | Processed Time | Status | Outlet A | Outlet B |
| 5/6/2007 7:23:18 PM | 5/6/2007 7:23:41 PM | Processed | ☑ | ☐ | Cancel
| 5/2/2007 7:46:47 PM | 5/2/2007 7:47:45 PM | Processed | ☑ | ☐ | Cancel
| 4/30/2007 10:34:41 PM | 4/30/2007 10:35:52 PM | Processed | ☐ | ☑ | Cancel
| 4/30/2007 10:20:10 PM | 4/30/2007 10:21:07 PM | Processed | ☐ | ☑ | Cancel
| 4/30/2007 2:33:00 PM | 4/30/2007 2:34:26 PM | Processed | ☑ | ☐ | Cancel
| 4/28/2007 6:40:32 PM | 4/28/2007 6:42:00 PM | Processed | ☐ | ☑ | Cancel
| 2/3/2007 10:30:00 PM | 2/3/2007 10:34:12 PM | Processed | ☑ | ☐ | Cancel
| 2/1/2007 1:43:17 PM | | | | | Cancel
| 1/28/2007 10:04:32 PM | | Timeout | ☐ | ☑ | Cancel Refresh Send Command To Unit
☐ Reset Outlet A        ☐ Reset Outlet A
☐ Reset Outlet B        ☐ Reset NPR
Send                    ☐ Reset Outlet B Schedule Reboot
Schedule Reboot     ⦿ Enabled   ○ Disable
Interval (in seconds)  ○ 3600
At a set Time       ⦿ 04 : 44  Everyday ▾

Figure 13, Command Mode &
Scheduled Reboot Web GUI

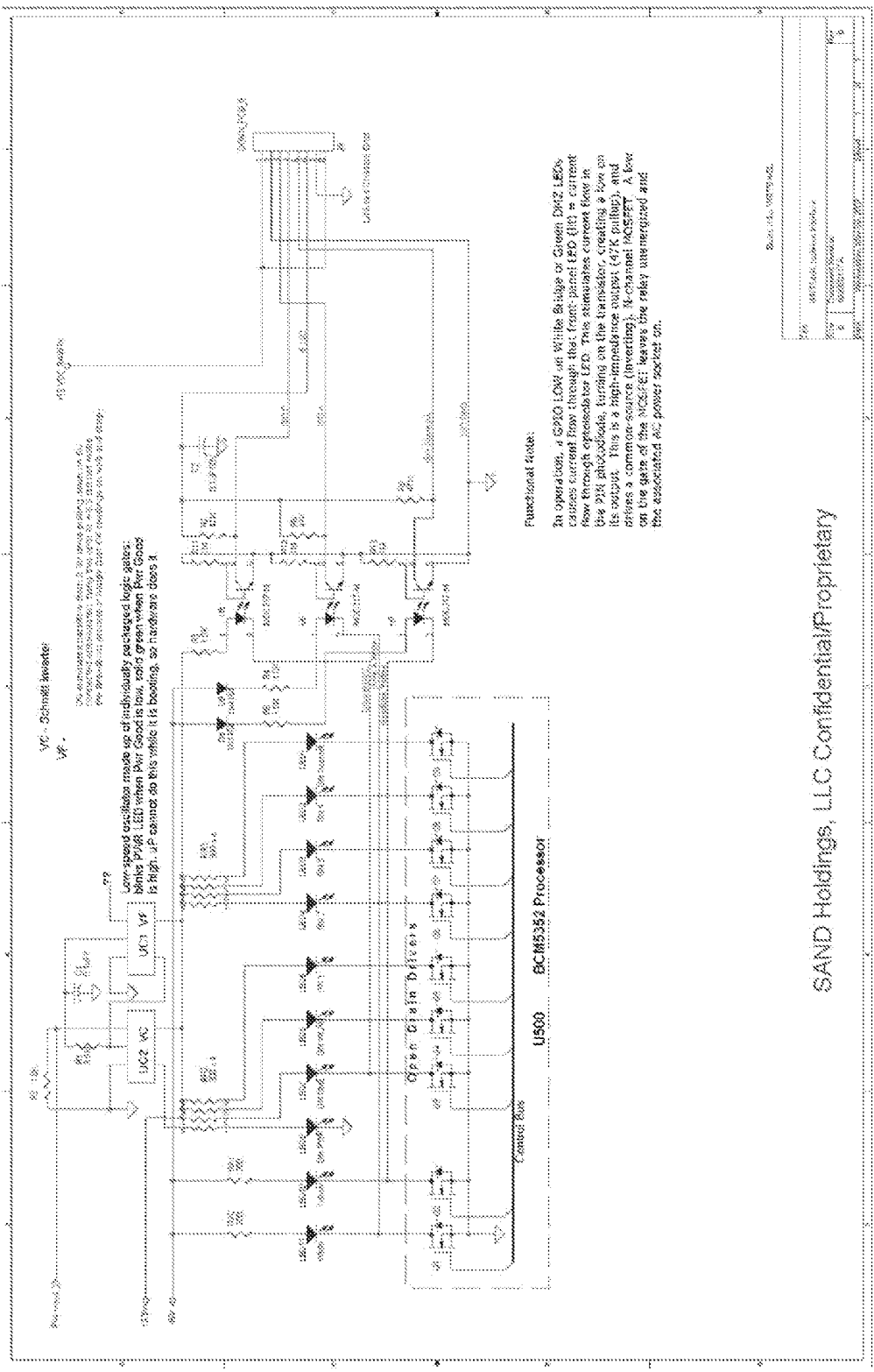
Figure 14A. Isolation Interface Schematic Diagram

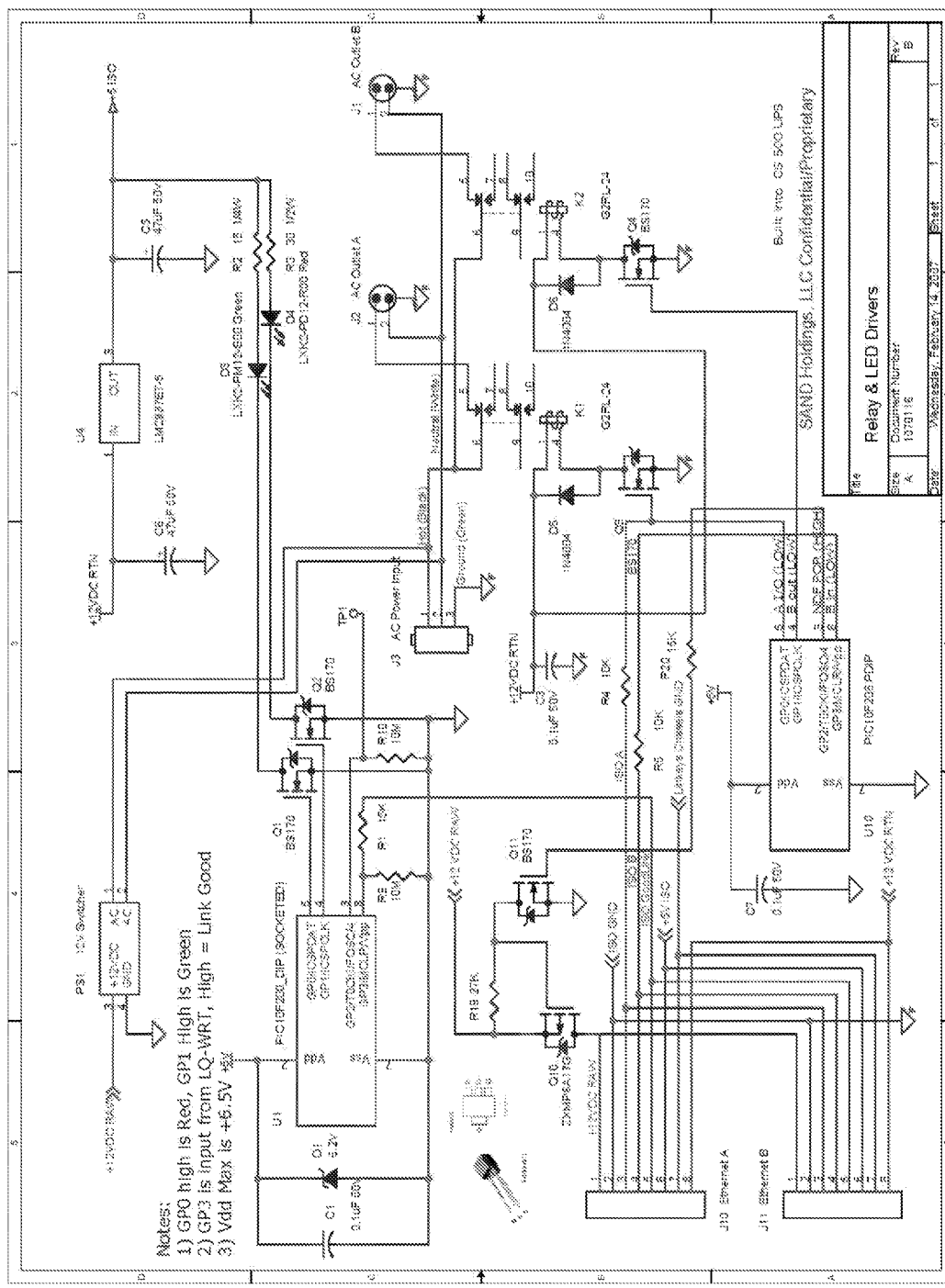
Figure 14B. Relay & LED Driver Schematic Diagram

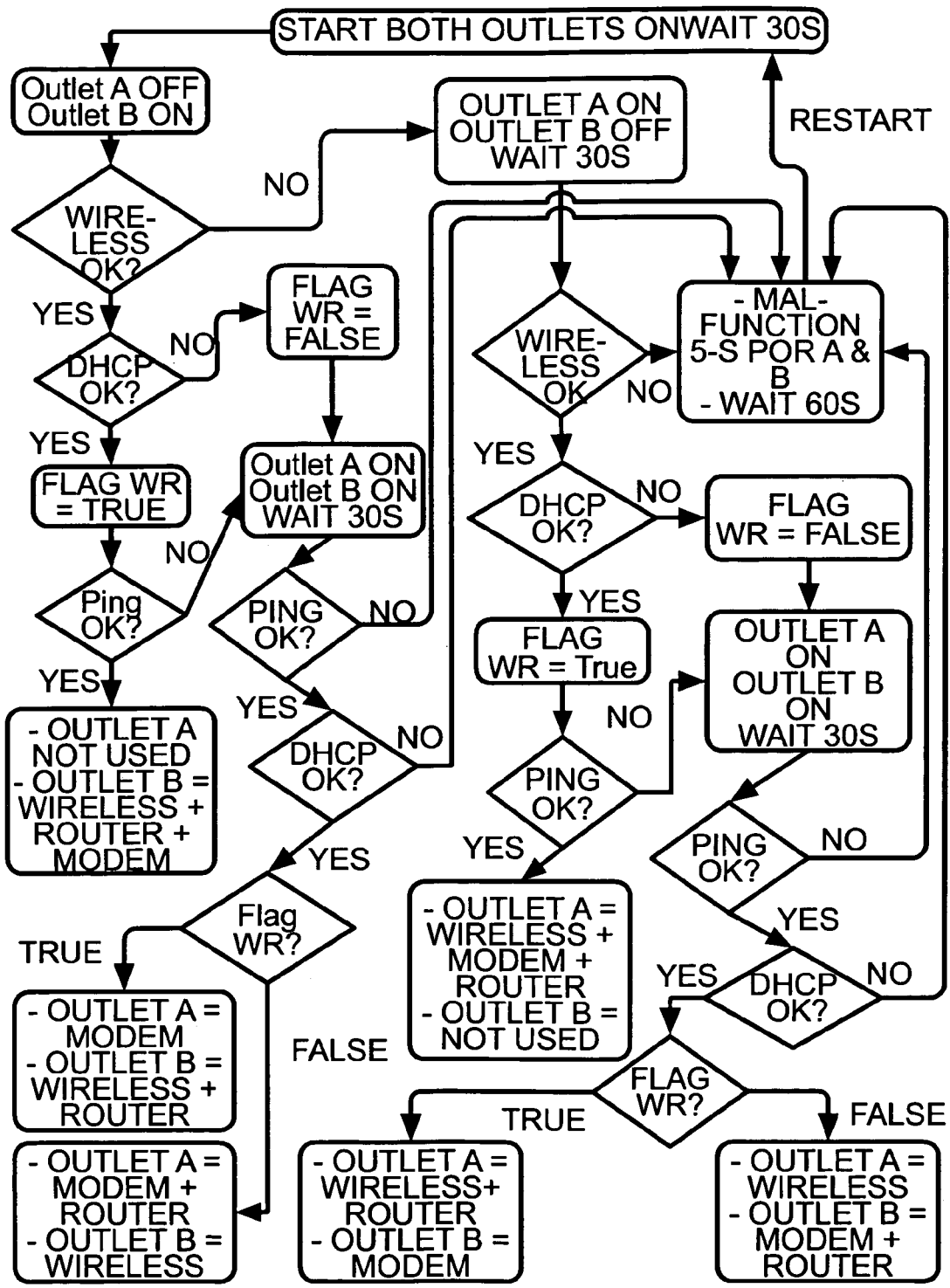
Figure 15. NPR Outlet AutoConfigure Flowchart

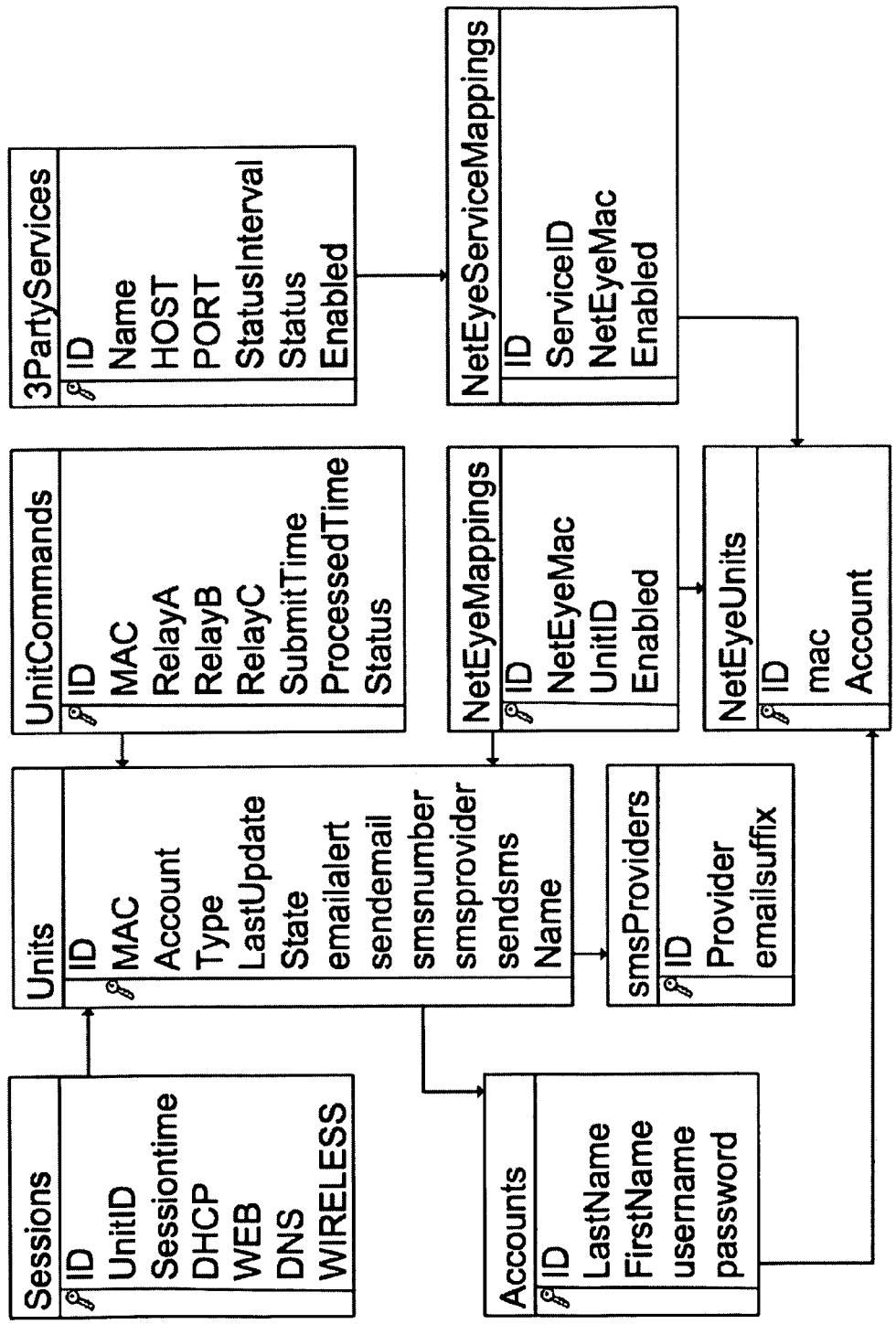
Figure 16. IRD Database Diagram

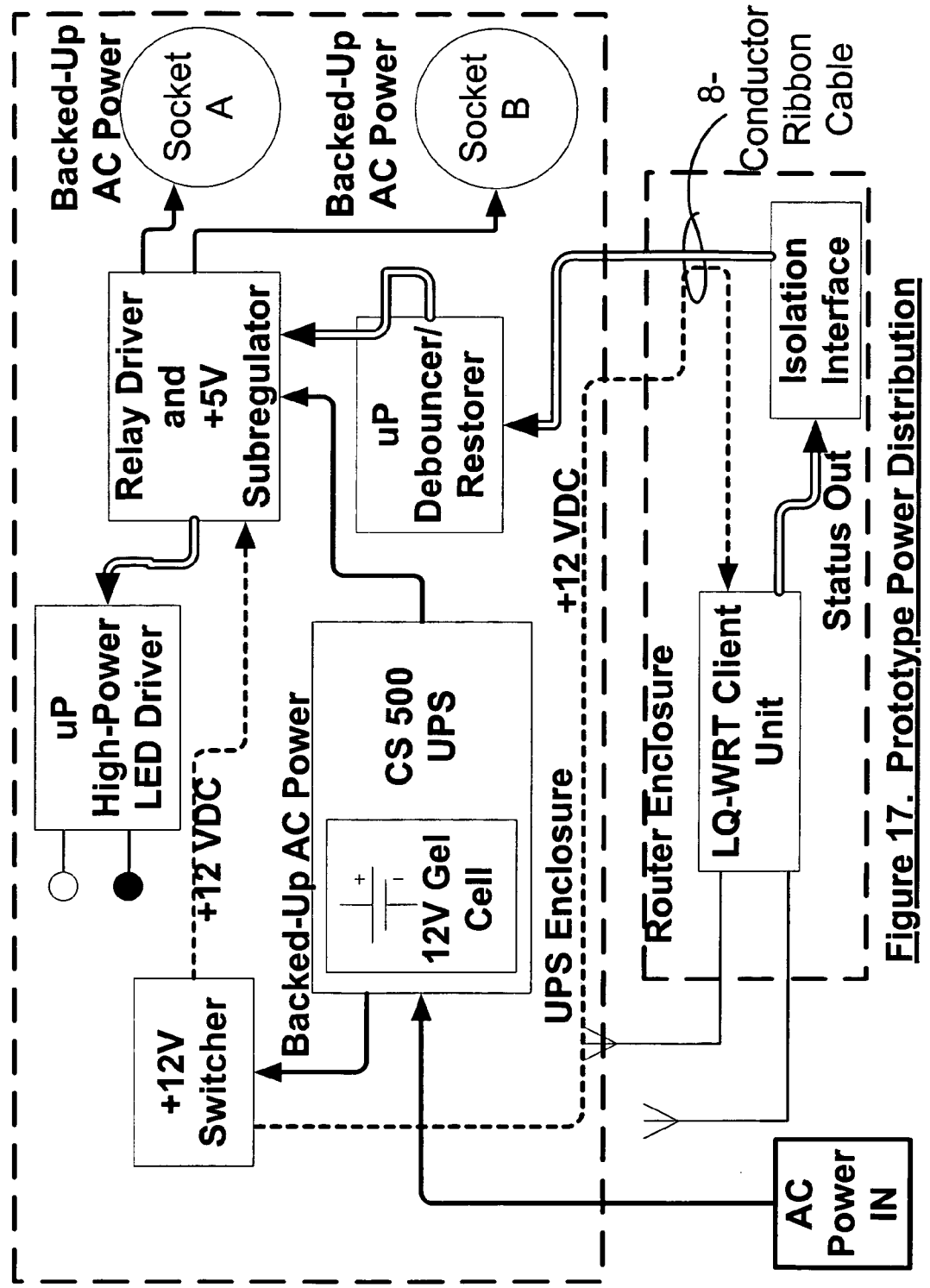
Figure 17. Prototype Power Distribution

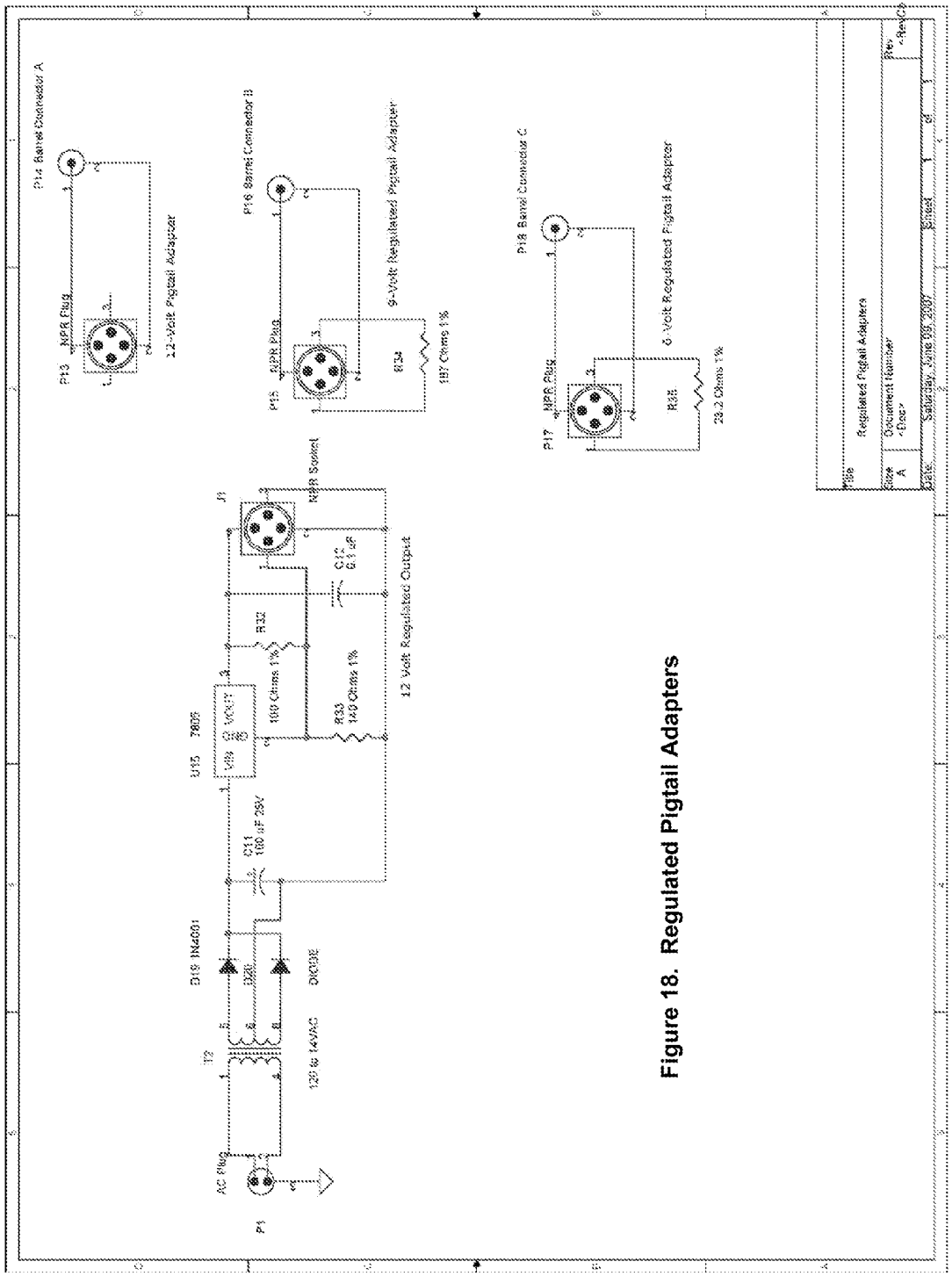
Figure 18. Regulated Pigtail Adapters

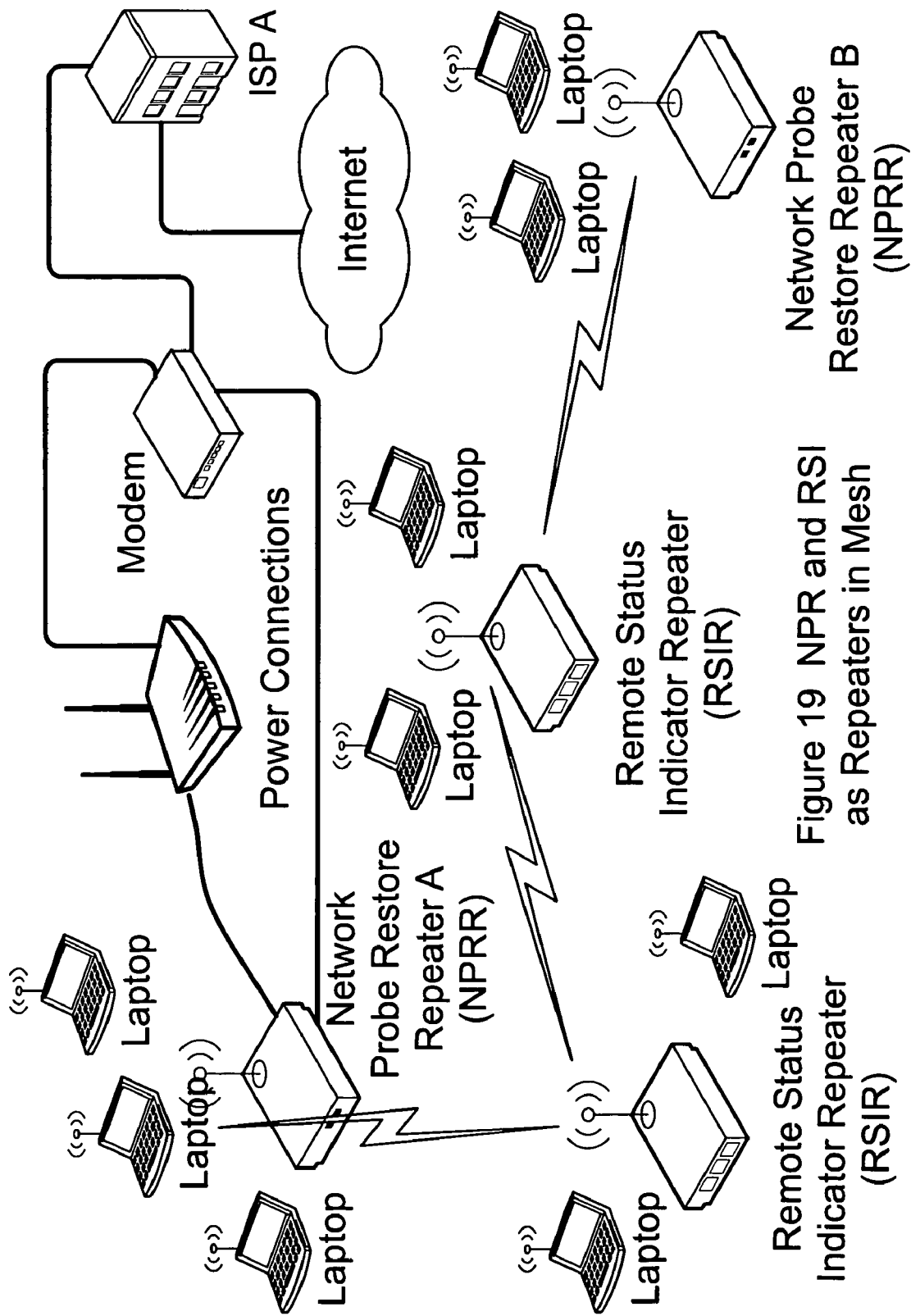

SYSTEMS, DEVICES, AGENTS AND METHODS FOR MONITORING AND AUTOMATIC REBOOT AND RESTORATION OF COMPUTERS, LOCAL AREA NETWORKS, WIRELESS ACCESS POINTS, MODEMS AND OTHER HARDWARE

This application claims the priority of the U.S. Provisional Ser. No. 60/936,502 filed Jun. 19, 2007 titled "Systems, Devices, Agents and Methods for Monitoring and Automatic Reboot and Restoration of computers, Local Area Networks, Wireless Access Points, Modems and other Hardware," the entire contents of which are hereby incorporated herein by reference.

FIELD OF THE INVENTION

The invention relates to systems, devices and methods for automatic detection of network faults, verification of connectivity among network elements, automatic rebooting of hardware and software, periodic, automatic appraisal of network performance, logging conspicuous events or performance changes, analyzing logs for trends and patterns, and automatically informing an end user, network administrator, service provider or others of select events.

BACKGROUND

Wireless local area networks (WLANs) and broadband Internet connections have become commonplace in homes and small businesses. The network setup generally consists of a DSL or Cable modem and a wireless router, as illustrated in FIG. 1, Typical Home/Small Office Network Setup. A surge-protector power strip or uninterruptible power supply (UPS) may be included to reduce the likelihood of faults induced by line-voltage dropouts, brownouts, spikes and other phenomena.

High-speed Internet service is typically brought to the home via a modem, such as DSL (Digital Subscriber Line), DOCSIS (Data Over Cable Service Interface Specification), FTTH, PON, GPON or FiOS (fiber to the home, passive optical network, gigabit passive optical network, and Fiber Optic Service) or a wireless technology such as WiMax, EV-DO or HSDPA. These connection methods are also found in small businesses, which may employ T1 or T3 data service and an Integrated Access Device (IAD) for combined high-speed Internet access and multi-line telephone service. One DSLAM rack, CMTS or multiplexer will typically serve dozens to hundreds of customer-premise modems.

The customer-premise modem has grown in complexity and capability. The broadband modem was originally a simple, single-purpose device: a modulator/demodulator. It included only enough hardware and software to negotiate a connection with the service provider and translate a network-connection format such as ATM (asynchronous transfer mode) or PPP ((point to point protocol) to a computer-connection standard such as Ethernet or less commonly now, USB (universal serial bus). With increases in processing speed, reductions in power consumption, higher density RAM (generally synchronous dynamic random access memory or SDRAM) and ROM (read-only memory, generally nonvolatile "flash" memory), declining costs and growing production volume, features and functions have been added layer by layer to the modem.

A web server with multiple html or JavaScript web pages is frequently included in the modem to facilitate setup. FIG. 2, DSL Modem Web GUI Example shows web pages from the built-in web server of a typical DSL modem. The modem includes a gateway, router, DHCP server and PPPoE login and authentication. An internal clock/calendar synced via NTP (network time protocol) keeps perfect time, and automatic, scheduled checks for firmware updates occur via the Internet. To coordinate these disparate software tasks, a real-time operating system (RTOS) such as a small Linux kernel or Wind River VxWorks is typically employed. These additions have eclipsed the complexity the modem's original, acronymous functions of modulation and demodulation, and yet modem costs are so low that they are given away as incentives in service agreements and regarded as expendable by many service providers. Some cable modems include one or two full-function VoIP or voice-over-DOCSIS analog telephone adapters (ATAs) that provide the traditional BORSCHT analog telephony functions: battery feed, overvoltage protection, ringing, supervision, codec, hybrid & testing.

This broadband modem is attached to a router, typically a wireless router. The router combines the functions of Internet gateway, router, Ethernet switch, and wireless access point. The router's principal function is the distribution and sharing of a single broadband Internet connection, but it also permits sharing of files and hardware resources such as printers, mass storage and media servers. Linksys, the consumer/small-business products arm of Cisco, reports selling upwards of 100,000 wireless routers per month. WiFi access is now provided as a free service in many retail locations, and a modem and router is becoming standard fare in hotels, coffee shops, bars and restaurants.

The router has also grown in complexity: It typically includes a web server for configuration, setup and checking status, a DHCP server, an Ethernet switch, a router with port forwarding, port triggering, MAC filtering, remote management and other features. The router typically serves as the Internet gateway, and handles PPPoE or other login, functions that are frequently duplicated in the attached modem. These multiple software threads or tasks in routers generally run under a small RTOS, such as VxWorks or a kernel of Linux. Complex features that were once included in routers selling for upwards of $1,000 have migrated into $50 units. The wireless router and broadband modem are in some instances combined into a single unit.

Modems and routers have gained speed and have become user friendly as their hardware has grown complex and their software convoluted. Dozens of hardware and software engineers work together to design them. Huge blocks of RAM and ROM are included to support rapidly developed, inefficient code. Software QA managers and large groups of testers balance thoroughness against a relentless pressure to ship. Software bugs and unhandled exceptions are often discovered after a product has begun shipping, and are managed through web downloads. ESD or EMI can derail even the best of hardware and software, sometimes temporarily, sometimes permanently, depending on its intensity. The modems and routers comprising our networks mirror the complexity and reliability of the personal computers they serve: They become partially nonfunctional in ways that are most peculiar, or they become completely inoperative. Either way, they must be rebooted, typically by a Power-On Reset (POR), that is, removing power for 5 seconds or so, then restoring power. Most modems and routers also have a recessed reset button on the back that can accomplish this, but it must be used with care: pressing it for more than five seconds or so will reset the unit, but also restore all settings entered by the user to their factory defaults.

As home and small-office networks have grown in complexity, sophistication and number of users, providing their IT (information technology) support is no longer a minor responsibility. The home and small-office networks that served well with one or two users running email and surfing the web are now routing virtual private networking (VPN) traffic, Voice over Internet Protocol (VoIP) service, streaming media distribution and other applications. Network loading is higher than ever. Once a lone bookend on the shelf, the present-day home or small-office network may be distributed: part may be at home, another at the office, and third, fourth or fifth elements nestled in the air-conditioned racks of service and application providers. These small networks rival the features, functions and complexity of large-enterprise networks of five years ago. These networks comprised of multiple servers, clients, switches and routers have become more essential than the telephone. They are intricate and can be inscrutable. Troubleshooting and clearing a fault in a home or small-office network can be quite time consuming, and may require travel to two or three locations and multiple calls to tech-support lines.

Large, enterprise-level networks generally have hired handlers—trained, 24/7 IT-support professionals working full time to keep networks up and running. They monitor these networks closely, and will often fix a network glitch before its impact is widely felt. They have access to sophisticated administrative, monitoring and troubleshooting software and equipment. For remote reset and restoration, they have Ethernet-controlled, switched rack power distribution units (PDUs): power strips with individually switched, remote-controlled AC outlets. For remote access and remote reset/restore during a network outage, an independent, secondary connection such as dialup may be employed. Many homes and small offices have only as-needed or de facto IT support. Remote access and diagnostics are generally of little value or interest to the home/small-office user and are seldom used. Secondary remote access is impractical and uneconomical in homes and small offices, and is of no value when there is no one outside to use it.

SUMMARY OF THE INVENTION

An objective of one embodiment of the invention is to automate the monitoring, fault analysis, reset and restoration of networks and network connections so that this takes place automatically, without human participation or intervention, without resort to independent, secondary Internet connections and often without user awareness. An embodiment of the invention is illustrated in FIG. 3A, System Functional Block Diagram and consists of at least one or a plurality of Network Probe Restore (NPR) clients. Another embodiment consists of one or a plurality of NPRs in communication with one or a plurality of Network Monitor & Control Servers. Another embodiment consists of one or a plurality of NPRs in communication with one a plurality of Remote Status Indicators (RSIs). Another embodiment consists of one or a plurality of NPRs in communication with one or a plurality of NMCSs, and one or a plurality of RSIs in communication with one or a plurality of NMCSs. The NPR and RSI are network clients: As stand-alone units, they include a control processor, the physical-layer and MAC (medium access control) hardware, an RTOS and the software or firmware appropriate to the network medium, e.g. an 802.11/WiFi radio transceiver, an 802.3 Ethernet 10/100/1000BaseT interface, 100BaseFX, ZigBee, or an EDGE, 3G, EV-DO, UMTS, HSDPA, FOMA or WiMax radio transceiver for direct connection with a wireless carrier. The NPR and RSI may also be implemented as software running on a platform that has another principal purpose, such as a personal computer, PDA, phone or other appliance. The Network Monitor & Control Server consists of custom NMCS software running on one or more standard server platforms or other purpose-built hardware.

BRIEF DESCRIPTION

FIG. 1 shows a Home/Small Office Network Setup such as may be used with certain embodiments of the invention.

FIG. 2 shows a DSL Web GUI Example such as applicable to certain embodiments of the invention.

FIG. 3A shows a System Functional Block Diagram according to one embodiment of the invention.

FIG. 3B shows a Simplified System Functional Block Diagram according to one embodiment of the invention.

FIG. 3C shows Ping Echo Request Communications Flow according to one embodiment of the invention.

FIG. 3D shows a Ping Echo Response Communications Flow according to one embodiment of the invention.

FIG. 3E shows an NPR Status Report Communications Flow according to one embodiment of the invention.

FIG. 3F shows an NPR Modem Outage Communications Flow according to one embodiment of the invention.

FIG. 4A shows a Network Probe Restore Functional Block Diagram according to one embodiment of the invention.

FIG. 4B shows a Network Probe Restore for IAD, Wired Ethernet Functional Block diagram according to one embodiment of the invention.

FIG. 4C shows a Network Probe Restore with Switched DC Power Functional Block Diagram according to one embodiment of the invention.

FIG. 4D shows an NPR Internal Software Structure according to one embodiment of the invention.

FIG. 4E shows an RSI Internal Software Structure according to one embodiment of the invention.

FIG. 5 shows a Network Monitor and Control Server according to one embodiment of the invention.

FIG. 6A shows a Network Monitor & Control Server Web GUI according to one embodiment of the invention.

FIG. 6B shows a Command Server Web GUI according to one embodiment of the invention.

FIG. 7 shows a Remote Status Indicator Communications Flow Diagram—Monitoring Network Probe Restore Client flow according to one embodiment of the invention.

FIG. 8 shows a Remote Status Indicator—3d Party Service Monitor according to one embodiment of the invention.

FIG. 9 shows an NPR and RSI Client Configuration Communications Flow Diagram according to one embodiment of the invention.

FIG. 10 shows an NPR/RSI Client Registration with NMCS according to one embodiment of the invention.

FIG. 11 shows a Probing Cycle Flowchart according to one embodiment of the invention.

FIG. 12A shows a System Communications Flow Diagram according to one embodiment of the invention.

FIG. 12B shows Ping to an FQDN according to one embodiment of the invention.

FIG. 12C shows DNS Lookup according to one embodiment of the invention.

FIG. 12D shows Ping to a Numeric IP Address according to one embodiment of the invention.

FIG. 12E shows a Ping Decision Tree according to one embodiment of the invention.

FIG. 12G shows an NPR Status Delivery flow according to one embodiment of the invention.

FIG. 12J (there is no FIG. 12I) shows an NPR Modem Reset & NMCS Auto Email flow according to one embodiment of the invention.

FIG. 12K shows an NPR Service Restore and Auto Email flow according to one embodiment of the invention.

FIG. 12L shows an NPR Command Mode flow according to one embodiment of the invention.

FIG. 12M shows a DNS Fail, Router Reset and NMCS Auto Email flow according to one embodiment of the invention.

FIG. 13 shows a Command Mode and Scheduled Reboot Web GUI flow according to one embodiment of the invention.

FIG. 14A shows an Isolation Interface Schematic Diagram according to one embodiment of the invention.

FIG. 14B shows a Relay and LED Driver Schematic Diagram according to one embodiment of the invention.

FIG. 14C shows an Interface Cable Schematic Diagram according to one embodiment of the invention.

FIG. 15 shows an NPR Outlet AutoConfigure Flowchart according to one embodiment of the invention.

FIG. 16 shows a Database Diagram according to one embodiment of the invention.

FIG. 17 shows a Prototype Power Distribution functional block diagram according to one embodiment of the invention.

FIG. 18 shows a schematic for Regulated Pigtail Adapters according to one embodiment of the invention.

FIG. 19 shows NPR and RSI as Repeaters in Mesh according to one embodiment of the invention.

DETAILED DESCRIPTION

NPR

Figure 12F:
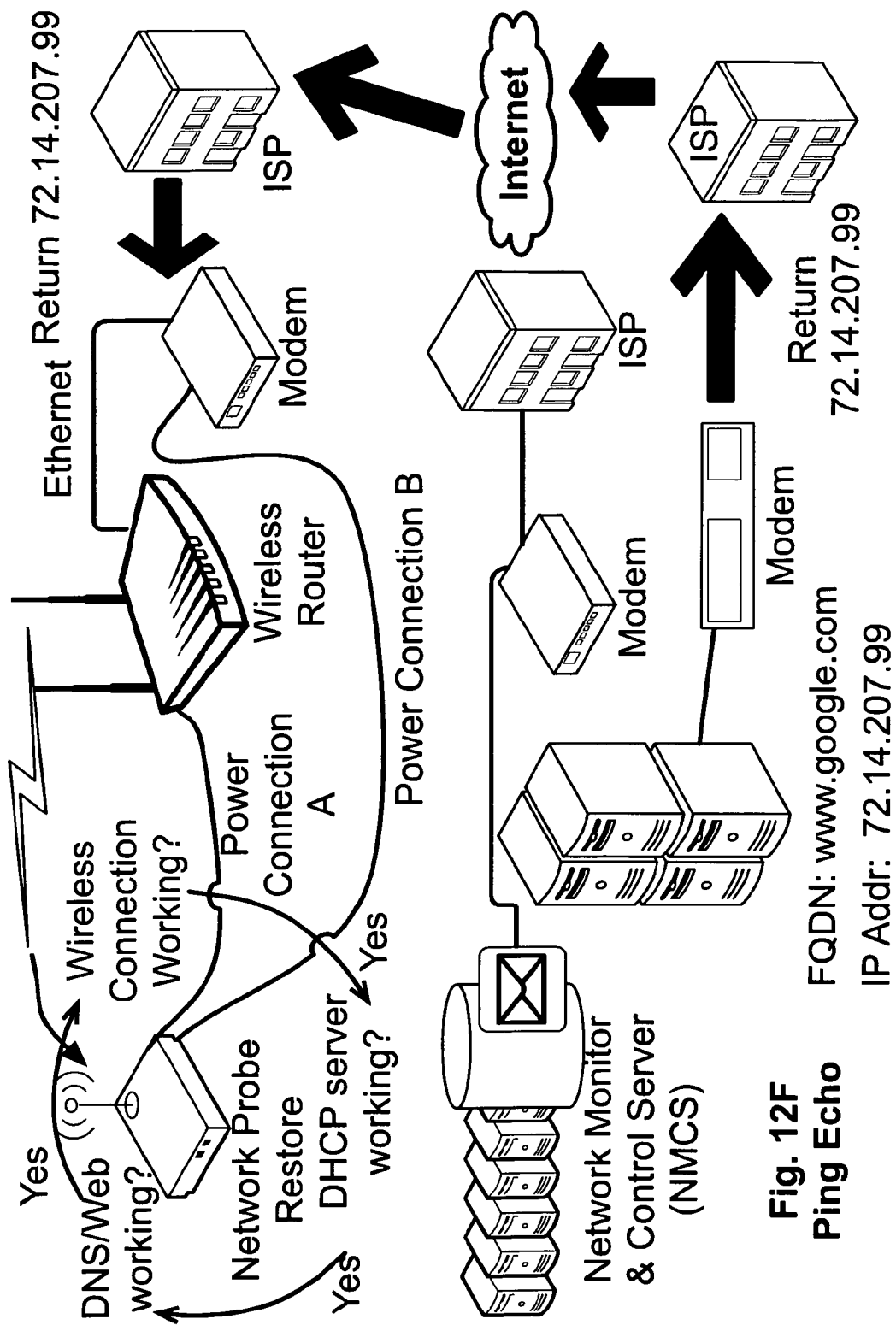
FIG. 12F shows a Ping Echo Response according to one embodiment of the invention.

The Network Probe Restore client or NPR regularly probes or tests the network to which it is attached. If such tests indicate, it may automatically reset attached network components such as routers or modems with the intention of restoring normal network functionality. It may operate autonomously, or it may be in regular communication with a Status Server, part of a dedicated Network Monitor and Control Server (NMCS). It may maintain an internal, time-stamped log of network failures, of Internet-connection failures, of autonomous resets and other conspicuous data, which it may periodically upload to a Log Server within the Network Monitor & Control Server. The NPR may perform commanded resets whenever so instructed by a Command Server within the NMCS. The NPR may include a conspicuous network status indicator of its own, which may be locally controlled by settings and logic within the NPR. Alternatively, the local status indicator in an NPR may be remotely controlled by the NMCS with which it is registered, or may be controlled by aggregating its status with the status indications of any or all NPRs with which it is in communication.

A plurality of NPRs on one or more networks typically report status to one NMCS in one embodiment of the invention. In a simple embodiment of the invention, the NPR functions as a stand-alone unit, i.e. without an association with any NMCS, performing automated network resets and providing a local status indication. In another embodiment of the invention, the NPR performs its probe and reset functions, but also serves as a wireless network repeater, retransmitting received packets in order to extend the range of the monitored wireless network, creating a mesh network. An NPR may instead or in addition provide one or more local Ethernet hard-line ports (RJ45 10/100/1000BaseT sockets, 100BaseFX fiber ports or similar network connections) for local attachment of PCs, thin clients, printers and other networked hardware. The internal detail of an embodiment of the NPR is illustrated in FIG. 4A, Network Probe Restore Functional Block Diagram, and FIG. 4D, Network Probe Restore Internal Software Structure. The NPR may include an SMTP client, and may transmit periodic or critical status messages directly to a user or designated administrator. An embodiment of the NPR includes an automatic, temporary disablement means so that, whenever the NPR's firmware is being upgraded, its network-reset and self-reset mechanisms are automatically disabled. An embodiment of the NPR includes a manual temporary disablement means so that when the firmware in an attached modem or router must be upgraded or reflashed, NPR's auto-reset mechanism is temporarily disabled. An embodiment of the NPR provides an appropriate delay from the time a network fault is recognized to the time that the NPR embodiment first attempts to reset attached devices so that, if a temporary network fault is due to a modem or router that it being reflashed, the NPR-reset will not occur until after the reflash has been completed, or, if normal network operation resumes after the reflash, the NPR-reset may not be performed at all. By these mechanisms, permanent damage to routers and modems due to interrupted reprogramming of flash memory is avoided.

NMCS

The Network Monitor & Control Server (NMCS) according to one embodiment of the invention includes seven integrated functions: five server functions, a $3^{rd}$-party Service Monitor (3SM), and an Interactive Relational Database (IRD) used by and common to the six other functions. The five servers are: 1) a Universal Web Server; 2) a Status Server; 3) a Command Server; 4) a Remote Indicator Server; and 5) a Log Server. This NMCS is illustrated in FIG. 5, Network Monitor & Control Server Functional Block Diagram. Each of the five servers and the $3^{rd}$-party Service Monitor contains an integrated SMTP client so that any of these may automatically generate and transmit email. Email triggering will occur whenever predefined conditions exist, such as a fault on a monitored network, as determined by flags, masks, filters and configuration settings in the IRD.

The Universal Web Server (UWS) is the primary user interface and performs multiple functions: 1) Authentication of multiple, independent users for user access; 2) Registration of NPR and RSI client units and creation, modification or deletion of NPR and RSI records; 3) Checking status, logs and connectivity of NPR or RSI units; 4) Manual command entry; 5) Subscription entry and renewal for integrated e-commerce; and 6) Other user access as may be dictated by the networks, client units, users and applications served. FIG. 6A, Network Monitor & Control Server Web GUI, shows three representative Universal Web Server menus. All entries and button presses made via the UWS become entries into the Interactive Relational Database, or IRD.

The Status Server collects status information from all registered NPR units and enters this into the IRD. The Status Server also calculates a separate, running time-since-last-status-report ($T_{SLR}$) for each registered NPR and stores this in the IRD. At the instant a status report is received from a given NPR, its $T_{SLR}$ is set to 0. Should $T_{SLR}$ for a particular NPR exceed the preset limit established in the IRD for that NPR, typically two reporting intervals plus 20 percent (a total of 12 minutes in one embodiment), that NPR is declared "Lost" by the Status Server and is marked Lost in the IRD. The SMTP client in the Status Server may then be triggered to generate and transmit email or sms messages to all addresses associated with the "Lost" NPR in the IRD, and to notify any Remote Status Indicators whose monitor pool includes that NPR.

The Command Server processes manual commands entered via the web server and sends them out to the NPRs. The Command Server also processes reset commands which may be generated automatically within the server. The Command Server may generate and transmit automated emails or sms messages whenever commanded resets occur, and these emails may include the results or changes in status that have occurred in an NPR since it was reset.

The Remote Indicator Server drives the Remote Status Indicators (RSIs), commanding their status indicators, displays, alarms and annunciators in accordance with configuration, priority settings, filter settings and monitor-pool entries (association tables) within the IRD. Any number of NPRs may be included in the monitor pool of a given RSI, as may any number of monitored $3^{rd}$-party servers. The status flags of NPRs in the IRD and the status flags within the IRD of $3^{rd}$-party Service Monitor reports are may be logically linked into monitor pools by the user or designated administrator. When they are entered into an RSI's monitor pool, that RSI's output is the logical AND of all those signals; in other words, the RSI will indicate status: good when all NPR units and all $3^{rd}$-party service monitors assigned to the pool are indicating status: good. Any NPR or $3^{rd}$-party server status report may be temporarily or permanently excluded from an RSI indicator's aggregate status indication via mask and filter settings entered by the user or designated administrator into the IRD. The Remote Indicator Server of the NMCS may also track an instance of $T_{SLR}$ (time since last status report) for each registered RSI, and may generate and transmit email or sms messages whenever $T_{SLR}$ exceeds a default or user-supplied limit value in the IRD. One RSI may monitor other RSIs via the NMCS, and an NPR with an NMCS-driven status indicator may monitor an RSI, including an RSI that is monitoring that NPR.

The Log Server communicates with NPRs and RSIs, and picks up any conspicuous data that may have been logged by the Log Client in an NPR or RSI during those intervals when, by virtue of its host network, its Internet connection, or the NMCS being inoperative, the NPR or RSI was out of communication with the NMCS. Local NPR or RSI log data is typically uploaded as soon as connectivity is reestablished with the NMCS. The Log Server may also trigger the sending of SMTP email messages, as may any of the other servers.

The $3^{rd}$-party Service Monitor (3SM) client performs periodic checks of various $3^{rd}$-party servers, such as mail servers and VoIP servers according to a $3^{rd}$-party-server watchlist built of tables and entries in the IRD. The 3SM includes an SMTP client. Should the 3SM be unable to contact a $3^{rd}$-party server on its watchlist in the IRD, the 3SM will review that server's association tables in the IRD, and may automatically generate email or text messages to all subscribers or customers of record having an affiliation with that $3^{rd}$-party server, i.e. entries in the IRD. If an affected $3^{rd}$-party service is included in the monitor pool of a Remote Status Indicator, the Remote Indicator Server will cause the state of that Remote Status Indicator to change accordingly.

The servers, clients and database may be separate applications running under a common operating system on the same server platform, or on independent servers linked together. It will be understood by a person skilled in the art that these five server functions may be condensed so that there are fewer, or expanded so that there are more server functions. An NMCS may be comprised of all elements, or only of some. The servers and clients within the NMCS may use different ports on a common IP address or a common port on different IP addresses. They may be running on a common server chassis, multiple redundant chassis, or independent networked chassis.

RSI

The Remote Status Indicator is another aspect of the invention. Its function is to remotely indicate the aggregate status of NPRs and $3^{rd}$-party servers in its monitor pool, which is a table in the IRD. The principal software elements in the RSI are shown in FIG. 4E, RSI Internal Software Structure. An RSI may also report status of other RSIs, and NPRs may report status of RSIs. NPRs will typically be located near the modems and routers of the networks they monitor, and so necessarily placed in closets or under desks where their integral status indicators may not be conspicuous, visible or audible. An RSI may be placed anywhere that a network connection is available, but it will generally be placed in a conspicuous location. An RSI may be connected via a network being monitored by NPRs, or it may be external to the NPR-monitored network, remote and connected via the Internet with an NMCS in most instances. Each RSI is typically linked to the Remote Indicator Server running on the Network Monitor & Control Server, and obtains its indicator commands from that server, as shown in FIG. 3A, System Functional Block Diagram, FIG. 7, Remote Status Indicator/Network Probes Communications Flow Diagram and FIG. 8, Remote Status Indicator/$3^{rd}$-party Service Provider Communications Flow Diagram. One Remote Indicator Server may service a plurality of Remote Status Indicators.

Details of the communications flow diagrams are discussed in later sections, but briefly: Status reports from Network Probe Restore clients flow in typically via the Internet to the Network Monitor & Control Server (NMCS). The NMCS polls various $3^{rd}$-party service providers, and all status data and poll results flow into the Interactive Relational Database, the IRD. NPRs and $3^{rd}$-party service providers are aggregated in the database according to user-defined tables, masks and filters, and a resultant status/state message is derived from flags, tables and settings in the IRD. That status/state message is sent over the local network or the Internet to the appropriate Remote Status Indicator. The Remote Status Indicator is in regular communication with its host Network Monitor & Control Server, and failure of its link to the NMCS is quickly detected and displayed, generally within seconds.

In this way, an all-clear indication on a Remote Status Indicator—steady green, for instance—indicates that: 1) the Network Monitor & Control Server is in contact with all Network Probe Restore clients in its monitor pool, i.e. none are Lost; 2) all monitored networks and their Internet connections are functioning properly, i.e. no NPR is reporting a fault; 3) all $3^{rd}$-party servers and service providers included in the RSI's monitor pool are connected and operating normally; 4) the Network Monitor & Control Server and its Internet connection are up; 5) the link between the Network Monitor & Control Server and Remote Status Indicator is operational; and 6) the Remote Status Indicator itself is operational. Failure at any point will produce an alarm, a flashing red light for instance. A user or subscriber could then log onto the Web Server of the Network Monitor & Control Server, glance at the Status Page, and quickly identify the failure. If the failure does not quickly clear itself, he/she could then take appropriate action. An alternative embodiment of the RSI includes a display so that text may be displayed.

In another embodiment of the invention, the RSI performs its remote status indication function, but also serves as a wireless network repeater, retransmitting received packets in order to extend the range of the network to which it is attached. A RSI may instead or in addition provide one or more local Ethernet hard-line ports (RJ45 10/100/1000BaseT sockets, 100BaseFX fiber ports or similar network connections), thus providing one or more network connections for nearby PCs, thin clients, printers or other networked hardware. An embodiment of the RSI may include the testing and network-evaluation capabilities of the NPR, in addition to its remote-status indication function, so that it regularly probes and evaluates the network to which it is attached, and is capable. The RSI also includes an automatic, temporary disablement means so that, whenever the RSI's firmware is being upgraded, its self-reset mechanism is disabled.

Separation of Functions

The NPRs and NMCS are interactive and synergistic. They will typically be situated at different physical locations. The NPR is typically customer-premise equipment (CPE), a client on the network that it monitors. The NMCS is a server, typically a Windows, Linux, UNIX or Solaris platform with extensive memory and hard-drive or flash-memory resources. The NMCS will typically be connected to the Internet via a symmetrical high-speed connection, such as a T1, T3 or OC3. The Remote Status Indicator (RSI) client, generally placed at a third location, provides remote, automatic status monitoring of one or a plurality of networks and service providers within its monitor pool. Partial system functionality may be achieved with an NPR alone; additional functionality is delivered when one or more NPRs are connected via the Internet or other network with an NMCS. Any number of RSIs may be included to augment the NPRs and NMCSs.

The rationale for this separation of functions is as follows. The Network Probe Restore unit is a client on the home or small-office network that it monitors, and will typically be located near the router and modem. Should the local, customer-premise modem or router cease operating properly or should the Internet connection be lost, only an autonomous, attached unit can power-on reset local hardware elements, such as modems, routers, PCs, and servers as shown in FIG. 4A. Likewise, should the local network or connection fail, only an external, independently connected unit such as the Network Monitor & Control Server can generate and transmit an email or text message during such outage.

The Network Probe Restore client and Remote Status Indicator client are small, inexpensive and easily mass produced. These may have limited RAM, ROM and other resources. The NPR or RSI may be implemented as a software application running on a PC, telephone, PDA, or other platform or appliance. The most important qualities of an NPR or RSI are high reliability, simplicity, low cost and small size or, in a software implementation, reliability and a small footprint (low memory requirements). There may be multiple NPRs of different forms and types on a given network. A large number of NPRs, perhaps millions, could associate with a single Network Monitor & Control Server. RSIs could number into the tens or hundreds of thousands per Network Monitor & Control Server, with each RSI monitoring a pool of dozens to hundreds of NPRs and/or $3^{rd}$-party service providers.

The connections between and among NPRs, NMCSs and RSIs may be entirely hardwired or may include interconnected segments employing wireless, copper twisted-pair, coaxial cable, optical-fiber or any other digital communications transport medium. These media may employ packet-based communications utilizing TCP/IP, ATM, Ethernet 802.xx or other packet-communications standards or methodologies, they may be dedicated digital connections, they may be circuit-switched, or may be a combination or concatenation of these methods.

A Network Probe Restore (NPR) or Remote Status Indicator (RSI) initiates communication with a Network Monitor and Control Server NMCS. Client initiation, i.e. NPR- or RSI-initiated communication with the NMCS, and TCP/IP are used for three principal reasons: First, the servers in the NMCS will listen via one or more software "sockets" for connections that are initiated by their clients, the NPRs and RSIs. Secondly, home and small-office networks may use leased IP addresses, and so may not be found at the same IP address from one day to the next. Current IP can be tracked by DDNS, but the two other issues remain. Thirdly, the NPRs and RSIs are typically clients on a router or private subnet. As a security measure, many routers and firewalls will reject traffic that originates from public IP addresses such as that belonging to an NMCS located outside the local network. Thus the only way to establish a successful TCP/IP connection between an NPR and NMCS or between an RSI and an NMCS is for the client element, i.e. the NPR or RSI, to initiate it. This client-initiation principle is well established and has been widely and successfully used by server-based applications such as email, Skype and SIP-based VoIP for many years. All embodiments of the invention are dependent upon this client-initiation principal for their ease of use, that is, the simplicity and straightforwardness of connecting them to conventionally configured local area networks without resort to DMZ (demilitarized zone, generally opening a single, designated private IP address to the gateway port, i.e. the Internet), proxy, port forwarding, custom routes and other specialized, network-configuration exotica. Such settings and their proper use are beyond the comprehension and capabilities of most home/small-office users. Many home/small-office routers do not have these capabilities, have only a limited subset, or those functions they do include may not function properly or at all.

The NPR may perform a multiplicity of functions, but its primary functions are probing or testing network services, resetting the network when faults are indicated, and in certain embodiments communicating the results of these tests to one or more NMCSs. By monitoring communications from one or more NPRs and looking for interruptions in scheduled communications from them, an NMCS is independently able to draw important conclusions about connectivity between it and a given NPR. For example, should a private subnet hosting a given NPR go down so that the NPR is no longer able to report, the NMCS will soon become aware of this, because it missed one or more critical, scheduled communications from the NPR. The NMCS is generally at an independent location and connected to the Internet or other network independently or redundantly. The NMCS can then generate and transmit a lost-connectivity report regarding that NPR and transmit it via SMTP or other media. This is a function that the NPR, being disconnected, would be unable to do. Via the lost-communication report, the PSN is able to alert a network administrator or summon other outside assistance.

Reciprocally, an NPR on an inoperative network or a network that has lost its connection to the Internet can accomplish things that the NMCS would be unable to do. The NPR can independently force a reset of local equipment, reboot software, or take any other such action as is dictated by its programming, connections and capabilities. The NMCS-independent reset capabilities of the NPR and the NPR-independent reporting capabilities of the NMCS are individually important elements of the invention that function synergistically in those embodiments of the invention that include both.

Each Network Probe Restore will routinely and continuously test its connection to the Internet. This network testing may qualitative, simply verifying connectivity between the NPR and a single NMCS. Network testing may be quantitative and extensive, independently registering the upstream and downstream values for data rate, bit error rate, packet error rate, latency, and jitter. A Network Probe Restore may exist as actual hardware, i.e. a physical unit with processor, memory resources, dedicated firmware and a network connection, or the NPR may exist as a software application running on hardware that has another principle function. An NPR may function as a software application on a platform that may take many forms, such as a personal computer, personal digital assistant, mobile telephone, a cordless home telephone, a wired or wireless telephone system or network, wired or wireless IP phone, an electronic or video game or gaming adaptor; computer networking equipment such as an Ethernet switch, a router or wireless access point; an uninterruptible power supply (UPS); a multifunctional unit including networking functions along with a UPS; a switched rack power distribution unit (PDU) or a device adapting a PDU for client-initiated operation over a local area network; a networked appliance such as a refrigerator, freezer, microwave oven, washer, dryer; a networked-home system, such as a security system, HVAC system, automatic lawn sprinkler system or other permanently installed system; a networked home theater system, stereo or multimedia playback system or server; a numerically controlled industrial machine, such as a mill or robotic welder; a vehicle, such as an aircraft, an automobile or other public or private conveyance; a military weapons system such as an unmanned aerial vehicle (UAV), guided missile or guided bomb unit (GBU).

Detailed Operation

The general operation of an embodiment of the invention as a system is discussed here followed by individual, detailed sections on each of the three principal elements. Functional block diagrams, flowcharts and communications flow diagrams augment the descriptions. This embodiment of the invention performs some or all of the following tasks automatically and continuously: 1) Audits network connectivity and functionality using multiple independent and dependent tests; 2) Performs selective, autonomous reset and restoration of attached equipment any time equipment becomes non-functional, inconsistent or its performance falls outside of user-defined limits or established, time-averaged, statistically derived norms; 3) Performs commanded resets from the NMCS when instructed to do so; 4) Performs scheduled resets according to an internal clock/calendar or when so instructed by scheduled command resets from the NMCS; 5) Maintains a log that identifies, classifies and sorts malfunctions, while log-analysis software continuously analyzes and condenses log data; 6) Periodically measures Internet-connection performance, such as delay, jitter, upstream and downstream bit rates, dropped connections, packet error rates, retransmissions and similar data; 7) Periodically measures wireless statistics, such as packet error rate, client RSSI (received signal strength indication) and conducts periodic wireless site surveys to gather data on RF channel congestion and in-band, WiFi and non-WiFi interference, or obtains such data directly from the wireless router to which it is attached; 8) Monitors inter-modem (i.e. between a DSL modem and DSLAM, or between a DOCSIS modem and CMTS) signals to detect sync loss and other problems, or obtains this information via direct communication with the modem or complementary central-office equipment.

These tests confirm network and Internet connectivity and quality, and test results may be saved locally, in a central database (the Interactive Relational Database, or IRD) or both. If connectivity is lost or performance becomes marginal, autonomous reset of network elements located at the NPR site can occur, and reset of the NPR itself may occur. According to network status reports and the configuration settings and tables built into the database, the following may take place automatically whenever network faults are detected: 1) Sending an email to a one or more predetermined email addresses, and/or sending a text message to a predetermined sms address, i.e. to a PDA, mobile phone, sms-capable hardwired phone, sms-capable cordless or IP phone; 2) Informing the user via those same methods of deviations from established, time-averaged performance norms or user-established limits for parameters such as downstream bit rate via emails and/or text messages; 3) Resetting equipment, typically the modem, any time a critical performance characteristic, such as downstream data rate deviates below norms or preset limits; 4) Studying logged data for repetitive events, performing ongoing statistical analysis, and reporting trends and anomalies; and 5) Based on this long-term analysis, automatically generating and sending email advisories to users or network administrators and making recommendations that may improve network reliability and/or availability.

An embodiment of the Invention will aggregate data from multiple monitored systems and correlate findings in order to rapidly recognize outages on a specific trunk, hub or node, or within a given neighborhood or other geographic area. It may identify likely faults and suggest fixes or print a "trouble ticket" for the field technicians of a service provider; this embodiment of the invention can help identify specific makes and models of modems, routers, PCs or other monitored, customer-premise equipment that demonstrate low reliability or recurrent faults. It can identify software/firmware versions with reliability problems, together with the particular conditions or circumstances that may cause failure. In this way, this embodiment of the invention functions as an expert system and troubleshooting time is minimized, the level of technical expertise required of field technicians is reduced and network maintenance costs are contained.

NPR and RSI Configuration

Prior to activation, an NPR or RSI client must be configured for operation on the network it is to monitor. Connecting with the unit is the first step, and for this purpose an electrical connection may be used, such as Ethernet, USB, a serial port or connection may be made wirelessly via 802.11 WiFi. If the factory-default or hard-reset (the state entered by pressing and holding the reset button for five seconds or longer) wireless state in the NPR or RSI units is set to infrastructure/access point mode with network security turned off, connection with the unit is easily established via any WiFi-equipped personal computer via a web browser. Using the web interface, the unit is instructed which network it should join as a client, with the proper SSID and WEP or WPA encryption codes set in. If an NPR is to monitor a hardwired network, it may be sufficient to simply connect the NPR to the network, i.e. no configuration may be necessary.

Once connection is made from a PC to the NPR, there are a variety of means including web servers, SSH, telnet, SNMP and other CLI (command line interface) methods that can be used to configure the device onto a network. Initial configuration is shown in FIG. 9, NPR & RSI Client Configuration Communications Flow Diagram. Each Network Probe Reset unit and Remote Status Indicator unit has a globally unique MAC (medium access control) address that is permanently programmed in at the time of manufacture. This address is the unit's identity for use in registering the unit with the central server, the Network Monitor & Control Server.

After an NPR or RSI client is connected to its host network, it must be registered with the Network Monitor & Control Server before it can communicate with that unit. Registration is done via the web server of the NMCS, as shown in FIG. 10, NPR/RSI Client Registration with NMCS. When an NPR or RSI client attempts to contact the NMCS, the NMCS will look in the Interactive Relational Database to see if it is a registered client. If the NMCS does not find a matching MAC address or other identification and password, that client will be rejected by the server. In this way, clones, hackers and other Internet traffic is not mistaken for valid client traffic. Client registration with the NMCS may require a subscription, and subscription information can be entered via the web GUI at the same time, or a subscription obtained in another way can be validated.

Normal NPR Operation

Once configured, attached and operational, the Network Probe Reset unit constantly probes the network to which it is attached, employing tests which are tailored to the particulars of the physical medium employed. It performs these probing operations and, according to the test results and its settings and programming, may perform automatic or commanded reset of attached equipment or may reset itself. To confirm functionality with a wireless local area network and to check that network's connection to the Internet for example, a series of tests is performed according to the flowchart in FIG. 11, Probing Cycle Flowchart. The NPR may automatically and continuously perform the following tasks: 1) Pinging one or more reliable FQDNs (Fully Qualified Domain Names, such as www.google.com) on the public Internet to simultaneously test assigned DNS (Domain Name System) servers and Internet connectivity; 2) Pinging one or more reliable, numeric IP addresses, such as 64.105.4.130, to test Internet connectivity independently of DNS, thereby distinguishing DNS failure from Internet-connection failure; 3) Releasing then renewing its client IP address in order to exercise and evaluate the network's DHCP (Dynamic Host Configuration Protocol) server; and 4) Disconnecting and then reconnecting with the wired or wireless network in order to verify wired or wireless connectivity via flag settings or logic levels within the WiFi radio transceiver, Ethernet port, optical-fiber transceiver or other PHY, i.e. within the physical layer (Layer 1) or Data Link Layer (Layer 2). Additional tests may be performed from time to time, such as measuring upstream and downstream connection speed or as described in Additional Tests. It will be understood by a person having ordinary skill in the art that alternative or additional tests that are substantively equivalent to those specified here may be included or substituted, and that additional tests may be performed. It is also understood that not all of the tests specified must be done, that every test must be done at every test interval or that tests should or must be done in the sequence shown.

NPR Communications Flow

Normal operation of an embodiment of the invention is depicted in FIG. 12A, System Communications Flow Diagram. The Network Probe Restore (NPR) has, in the case of an 802.11 WiFi network, been configured with the proper SSID and encryption code and is registered with a Network Monitor & Control Server. Network probing operations then commence. Once each minute, the NPR releases its leased DHCP address. The WiFi radio transceiver is then turned off or disabled, forcing disconnection from the network. After a brief delay of 1 second or so, the WiFi transceiver is turned on again, and after a brief delay (10 seconds or so) its connection-status flag is checked. This confirms that the SSID is correct, that the encryption mode and key are correct, that the NPR is within radio range, and is in sync with the wireless router or access point. This confirms network function through Layers 1 and 2, the Physical Layer and the Data Link Layer (Ethernet).

Next, the NPR sends a DHCP renew request to the local router, which responds by issuing a private IP address to the NPR, typically in the 192.168.1.xxx or 10.0.0.xxx range. Proper issuance of a valid DHCP address is confirmed, after a short delay, by checking the DHCP status flag in the WiFi transceiver or chipset. Functional DHCP confirms network function through Layers 1, 2 and 3 (Network Layer). The wireless flag and DHCP flag together confirm that the NPR is able to connect with the local router and obtain a valid IP address. By inference, if the NPR can disconnect the reconnect with the network, any other client with the correct SSID and WEP, WPA or other encryption code should be able to connect with that network and obtain a leased DHCP address.

Next, the NPR transmits a series of pings, i.e. Internet Control Message Protocol (ICMP) echo requests, to a Fully Qualified Domain Name (FQDN) on the Internet. This is figuratively illustrated in FIG. 12B, Ping to an FQDN and FIG. 12F, Ping Echo. What really happens is shown in FIG. 12C, DNS Lookup. The DNS (domain name server) client thread in the NPR passes the FQDN to its assigned DNS servers for resolution into a routable, numeric IP address, either contacting an assigned DNS server directly, or passing the DNS request to the local gateway, generally 192.168.1.1, which proxies the request to its assigned DNS servers at the local ISP or on the Internet. Once the FQDN is resolved into a routable, numeric IP address, a ping is sent to that numeric IP address, as shown in red in FIG. 3C, Ping Echo Request Communications Flow. The NPR listens for an ICMP echo response from the pinged site, as shown in green in FIG. 3D, Ping Echo Response Communications Flow. If ping to an FQDN is successful, this demonstrates that the DNS servers currently in use by the NPR are functional. By inference, DNS is functional for other clients on the local network, because all clients on a given network use the same DNS servers. Upon receipt of the ping response from the numeric IP address mapped via DNS to the original FQDN, confirmation is made of DNS, local network/Internet connectivity and network functionality. This confirms operability of the Physical Layer 1, Data Link Layer 2, Network Layer 3, Transport Layer 4, and Session Layer 5, all of the layers essential for normal network function. Once every 5 minutes, an "all okay" status message is transmitted to the Network Monitor & Control Server as shown in FIG. 12G, NPR Status Delivery. TCP/IP is used to ensure status-message delivery.

Because the Internet is imperfect and a ping may occasionally go unanswered, the ping algorithm in the NPR is persistent; it is designed so a single missed ping echo will not trigger an alarm. Pings occur once every 20 seconds. After three pings, the DHCP address is released, the radio is shut down, the radio is turned on one second later, the DHCP address is renewed, and the cycle repeated at intervals of approximately 1 minute, 24 seconds. If response to one ping is not returned in a timely manner, the NPR's ping algorithm will next attempt five pings in succession, four of which must be successfully echoed (80 percent or more). If two or more of these five pings are missed, NPR assumes a fault and, in certain embodiments, sends a status message to the Status Server of the Network Monitor & Control Server, the NMCS during its next scheduled status-report session. It may also attempt, according to its programming, to autonomously reset the router, the modem, both router and modem, or itself. This algorithm is shown in part in FIG. 11, Probing Cycle Flowchart and in FIG. 14B, Relay & LED Driver Schematic Diagram and the accompanying theory of operation. In any event, in several embodiments, the NPR contacts the Status Server of the NMCS with a status report on a regular basis, such as every five minutes. This is illustrated in FIG. 3E, Status Report Communications Flow, red line.

If the NPR does not receive a response when it pings an FQDN, it will then try to ping a numeric IP address directly, effectively bypassing DNS. This is illustrated in FIG. 12D, Ping to a Numeric IP Address and in FIG. 12E, Ping Decision Tree. If ping to a numeric IP address is successful, but ping to an FQDN fails, local net/Internet connectivity is confirmed, and DNS failure is presumed. To resolve this, the NPR may attempt power-on reset of the router, the modem, both, or itself depending on its outlet "mapping" or programming. This DNS test is an essential one: A local network may be operational and connected to the Internet, but if DNS lookup is inoperative, web browsing to conventionally specified, alphanumeric domain names (e.g. http://www.google.com) will not function, nor will conventionally specified mail servers (e.g. mail.comcast.net) function correctly. Wired or wireless connectivity/status indicators do not generally include DNS checks, so these will generally indicate "good" when DNS is inoperative. An Internet connection that insists upon numeric IP addresses is of little value to most users. A person having ordinary skill in the art will recognize that the time intervals employed in the tests need not be exactly as specified, and the times, numbers of pings per cycle and other specific numbers are provided as a general guideline, not as a requirement and are not a limitation of the invention.

Figure 12H:
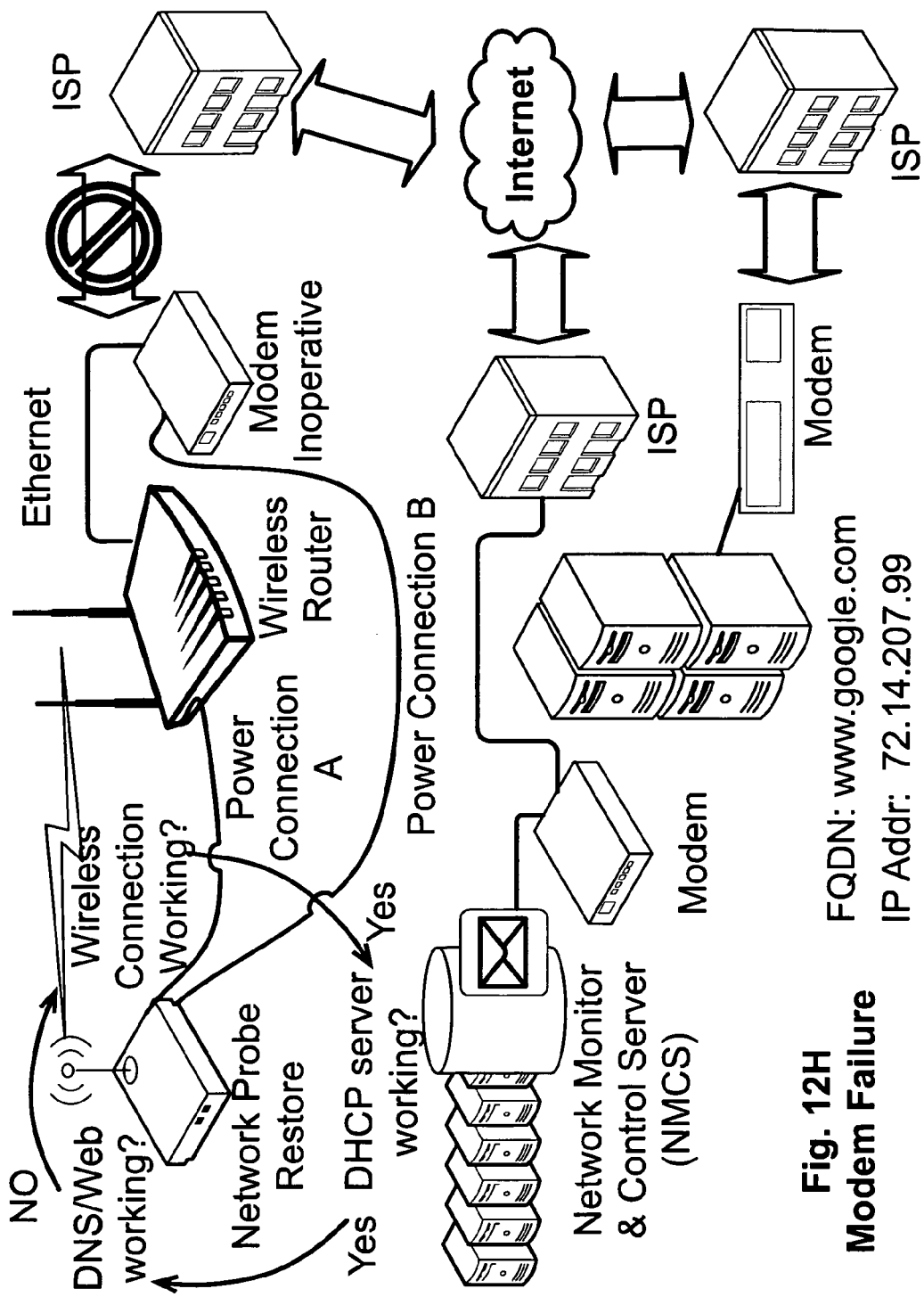
FIG. 12H shows a Modem Failure according to one embodiment of the invention.

FIG. 12H, Modem Failure illustrates system behavior when the modem is inoperative. For additional clarity, FIG. 3F, NPR Modem Outage Communications Flow is provided showing active lines in magenta. Modem failure might be indicated if the NPR determines that wireless connectivity is functional, DHCP is functional, but pings to an FQDN and pings to a numeric IP address go unanswered. The NPR momentarily interrupts power to the modem for 5 seconds or so, and then restores power, thus triggering a Power-On-Reset or POR in the modem. If normal function is restored within 60 seconds or so, the time generally required for a DSL, cable or other modem to boot up, synchronize, authenticate and begin communicating with locally attached network gear, the NPR will transmit a "System OK" status message to the Status Server of the NMCS, if employed, then transmit an action message to the Log Server of the NMCS stating, "Autonomous Outlet B POR." If the Network Monitor & Control Server does not receive a status message from a registered NPR within a reasonable period of time, typically two status-reporting intervals plus a 20-percent allowance, the NMCS marks that NPR as "Lost" in the IRD and generates and transmits, if so configured, a status-report email and/or text message to the user or designated administrator indicating network failure and the nature of the failure if known. This case illustrates the effectiveness of this embodiment, with synergistic, coordinated operation of the Network Probe Restore client and Network Monitor & Control Server: During a network outage, only a local, autonomous unit such as the Network Probe Restore client can perform a local reset. During a network outage, only a remote, independently connected "watchdog" unit such as the Network Monitor & Control Server can send out an email, sms or other message alerting the user or designated administrator of such failure. FIG. 12K, NPR Service Restore & Auto Email illustrates a return to normal operation, with the NPR transmitting an "System OK" status message to the Status Server of the Network Monitor & Control Server, the NPR transmitting an "Autonomous Outlet B POR" message to the Log Server of the NMCS, and the NMCS in turn generating a status-message email or sms to the user/administrator indicating that network function has been restored. At the same time, that NPR, previously marked as "Lost" is marked "Online" in the IRD of the NMCS.

FIG. 12L, NPR Command Mode illustrates a commanded modem reset. To initiate this process, Laptop 801, attached wirelessly to wireless router 802, modem 803 and via first Internet Service Provider 804 to the Internet 805, connects via second ISP 807 and modem 808 to the Network Monitor & Control Server, 809 and logs onto its web server using a conventional http web browser such as Microsoft Internet Explorer, Mozilla Firefox or Apple Safari. The web server would typically be set up listening on NMCS IP address Port 80 (http default), but could use a nonstandard port number or could use a different standard and port, such as https port 443. FIG. 13, Command Mode & Scheduled Reboot Web GUI is representative of what might be used for commanded resets. The user or designated administrator would select the appropriate NPR client from his list, and then check the "Reset A" or "Reset B" checkbox (or both) to the right. Pressing the "Send" button transmits the command via modem 808, second ISP 807 and Internet 806 though third ISP 810, then via modem 811 and router 812 wirelessly to NPR 813. The NPR then removes power on Outlet A or Outlet B, as commanded, for a reasonable POR interval such as 5 seconds.

If both Reset A and Reset B are checked and sent, the reset may be sequenced according to settings entered via the web GUI of the NPR, the web GUI of the NMCS, or the default settings of the NPR. Sequencing may be set so that Outlets A and B are turned off together at to, Outlet A is turned on 5 seconds later at $t_1$, and then Outlet B is turned on at $t_2$, 30 seconds after $t_0$. Sequence programming could be the reverse, with Outlet B turned on after 5 seconds, and Outlet B turned on after 30 seconds. Such sequencing is sometimes necessary to accommodate network hardware or firmware incompatibilities. It may be necessary, for example, for a cable modem to connect with the CMTS and fully reboot prior to restoring a locally attached router, which will immediately attempt to obtain in IP address from the modem. The NPR can also "learn" an effective sequencing strategy for the two outlets even if this information is not programmed into it. If an A-then-B sequence does not achieve normal function and connectivity, it might try a B-then-A sequence. When the NPR finds a sequence that restores connectivity and normal function, it can save that data and use the same sequence in the future.

Scheduled Reboot

The NPR can autonomously reboot devices attached to Outlets A and B according to programming entered via the NPR web GUI or other external-access means. The NPR may contain a timekeeping client that maintains accurate internal time and is periodically reset to the correct time via NTP, network time protocol. A time-zone selection, including daylight savings time start/end dates is made via the NPR's web GUI. A Scheduled Reboot screen similar to the bottom portion of FIG. 13, Command Mode & Scheduled Reboot Web GUI allows scheduled reboots at a predetermined, fixed interval in seconds; once a day at a designated time; or once a week on a designated day at a designated time. A person having ordinary skill in the art will recognize that other arrangements and setting methodologies are possible. FIG. 13 shows reset scheduled to take place at 4:44 AM every morning, a time when it is unlikely to disrupt network activity. With the NPR performing this reset automatically, it will take place whether or not the network and modem are functional. However, the automatic reboot can be commanded according to a schedule set into the Command Server of the Network Monitor & Control Server, with the caveat that an NMCS-commanded scheduled reset will not take place if the NPR's local network or the connection between the NPR and NMCS is down. Reboots can be performed individually on Outlet A, Outlet B or the NPR itself, on two of the three, or on all three, according to checkbox selections or other graphical or text-mode settings means. Reboots may also be sequenced, to that Outlet A is reset first followed by a delay, the Outlet B is reset. Sequencing is typically set using the NMCS Universal Web Server, the individual web pages within the NPR, or via a CLI.

GUI or CLI Pass-Through

Once a Network Probe Restore (NPR) or RSI client is linked up and communicating with the Network Monitor & Control Server (NMCS), it is then possible to change or adjust settings within that NPR or RSI from the web GUI or CLI (command line interface) of the NMCS. It is no longer necessary to connect locally or directly to the NPR or RSI in order to make any changes to their internal settings; all NPR or RSI internal settings may be accessed via the Universal Web server of the Network Monitor & Control Server. Alternatively a subset of NPR or RSI settings—those settings that could not cause an inadvertent disconnection between an NPR or RSI and the local network—may be permitted. Using such a subset, inadvertent disconnection or misconfiguration of the NPR or RSI that might require a site visit to correct is thus avoided.

Automatic Service Discovery

In many network installations, the modem is generally set up as a "bridge," a pipe to the ISP and to the Internet, and the wireless router is set up as the default gateway, DHCP server, DNS proxy and router. However, this is not always the case, as many modems also have these networking functions built in. Generally, one unit will be wholly responsible for the gateway function, routing, DHCP and DNS proxy or forwarder, PPPoE login (if employed), while the other will be responsible for nothing, i.e. functions as a pipe. On a two-outlet or two-pigtail NPR, one outlet or pigtail may be labeled "Modem" and the other "Router." The NPR's internal web server or the Universal Web Server of the NMCS to which an NPR is assigned could have web-GUI check boxes or entries that manually "map" the network-services function (gateway, DHCP, DNS proxy, et al.) to either the modem or the router. In this way, if the user attaches the modem and router correctly and selects the appropriate check blocks, the NPR should function well. It will take appropriate action when a fault is detected. However, the modem and router may not be correctly connected to the NPR, the appropriate check block may not be selected or may be left as factory default, and appropriate action may not be taken by the NPR during a fault. The probably of obtaining the correct configuration by sheer chance is 1 out of 4, or 25 percent if there are two switched outlets or pigtails. With three switched outlets or pigtails, odds of proper configuration are 12.5%.

However, the NPR can automatically map a modem and router to its outlets or pigtails, and it can automatically determine which of the two is performing the router/gateway/DHCP function. It can map outlets automatically when it boots up or it is rebooted, it can remap outlets according to a schedule, and/or it can remap the outlets whenever an unexpected result is encountered when going through it's a fault restoration. The algorithm for quickly and accurately mapping two outlets or pigtails is diagrammed in FIG. 15, NPR Outlet Autoconfigure Flowchart. This test is extensible to three or more outlets, and there is no practical limit to the number of outlets an NPR could include. The tests involve powering one outlet or the other or both, and then probing to see which tests pass, i.e. which network elements remain functional. By temporarily interrupting power to Outlet A, as illustrated in FIG. 4A, Network Probe Restore Functional Block Diagram, the NPR can then attempt to connect to the network wirelessly in the case of a wireless router, via Ethernet in the case of a hard-wired network. If it connects, it will have determined that Outlet A is powering a router, Ethernet switch or wireless access point. The NPR can then attempt to renew DHCP. If DHCP lease is successful, it may be assumed that gateway/DHCP/routing is being provided by the unit powered from Outlet A, i.e. the router, Ethernet switch or wireless access point. If the DHCP lease is unsuccessful, the NPR can restore power to the Outlet B and, after a reasonable boot time of 30 seconds or so, attempt once again to renew its DHCP lease. If this is successful, it may be assumed that the modem is attached to Outlet B, that the modem has responsibility for gateway/DHCP/routing, and that the "wireless router" attached to Outlet A is functioning as a wireless access point, a pipe.

By checking for wireless (or wired) network connectivity and then DHCP functionality at each outlet, the NPR can quickly determine which unit, modem or router, is plugged into which Switched Outlet, or if both (or a single, integrated modem router) are plugged into only one of the two outlets. This eliminates an opportunity for introduction of human error and improves the probability of correct outlet/function mapping, i.e. the probability that an NPR's internal, "mental map" is correct from 25% to 100%.

A person having ordinary skill in the art will recognize that while FIG. 4A and the text discuss "Outlets," referring to AC power outlets, the same automatic service-discovery methodology may be accomplished by means of switched DC power connections, as illustrated in FIG. 4C, NPR with Switched DC Power Functional Block Diagram. If a control interface such as a logic-level, RS-485, LVDS, serial port, or optical fiber reset is available on the modem and router, these may be used instead of switched AC or DC POR with the caveat that, in the event of a firmware fault in one or both of those units, such control interface may be inoperative, whereas a DC or AC POR is almost always effective. While the text discusses two outlets, an NPR may be configured with three or any greater number of outlets. An NPR designed for a more complex installation, such as a network installation consisting of a modem, a router and a television set-top converter or satellite receiver might include 3 sockets.

NPR Automatic Status Message Transmission

Once every 20 seconds, the NPR pings a reliable FQDN and/or numeric IP address to confirm network connectivity. Once every minute (every three pings), the NPR releases its DHCP address, disconnects from the network, reconnects with the network and renews its DHCP address—a process that requires approximately twenty-four seconds. Then, once every 5 minutes, the NPR "checks in" with the Status Server of the Network Monitor & Control Server, logging in and transmitting a brief status message. The status message conveys the results of the four tests mentioned previously: 1) Wireless (or wired) connection status, i.e. connectivity between NPR and the local network; 2) DCHP operability; 3) DNS function and registration; and 4) local network-to-Internet connectivity. Should the NPR find that it is temporarily unable to contact the Network Monitor & Control Server, it will retain status messages in a local, nonvolatile cache, transmitting them later to the NMCS when connectivity is restored. A person having ordinary skill in the art will recognize that the 20-second intervals, the three pings, and the 5-minute status intervals are somewhat arbitrary and may be amended to suit user requirements. These specific times and counts are provided for clarity but are not intended as limiting.

Ping

An embodiment of the invention employs fping, an open-source variant of Ping to confirm Internet connectivity and DNS (Domain Name System) operability. When a client first connects with a network it receives four essential pieces of information, not necessarily in this order: An IP address is generally issued by a DHCP (dynamic host configuration protocol) server. A subnet mask is sent, and this is used to determine whether a given message is for another client on that same network or must be routed outside. One or more DNS server addresses are provided to the client that the client will use to resolve FQDNs into routable numeric IP addresses. Lastly, the default gateway address is sent.

Ping is a reliable, low-level, widely used program that generates an ICMP (Internet Control Message Protocol) echo request. When a server or router receives an ICMP echo request, it responds with an ICMP echo response, assuming that it is set to respond to anonymous WAN (wide area network; the other side of the gateway) or Internet traffic. Anonymous WAN traffic response is sometimes blocked as an Internet security measure. A successful ping, i.e. transmitting an echo request and receiving a valid echo response is a reliable test of connectivity. By pinging resources resident on the public Internet, connectivity between client and local network and between local network and the Internet may be inferred. The NPR initially pings an alphanumeric FQDN. If ping to an FQDN is unsuccessful, the NPR will attempt to ping via a four-octet, numeric IP address, such as 64.238.125.124. If ping to an FQDN is unsuccessful, but ping to a numeric IP address is successful, this implies Internet connectivity is okay, but DNS has failed. Missing a single ping can occur in the course of normal operation, so whenever a ping is missed, five more are transmitted in succession, and at least four of those must be successful.

It will be understood by a person having ordinary skill in the art that many other mechanisms may be employed to confirm Internet connectivity or confirm DNS operability, including employing http to visit a specific web address and comparing the resulting page against a template. Web pages may be specified by FQDN or numerically, and DNS failure can be distinguished from Internet connection failure in this manner. It is also understood that numeric and FQDN pings may take place simultaneously, so that connectivity and DNS evaluations proceed more swiftly. Similar embodiments of the invention may be implemented using any of these or other methods of inferring Internet connectivity by testing access to one or more Internet sites, servers or resources.

Release/Renew and Disconnect/Connect

Dynamic Host Configuration Protocol, commonly used to manage and distribute private IP addresses to client PCs on home/small-office networks, is exercised by the NPR, a network client, via a process of releasing its DHCP address and disconnecting from the network by disabling, i.e. turning off the wireless transceiver or, in the case of an electrically connected network connection such as Ethernet, turning off the Ethernet transceiver. After a short interval of one second or so, the transceiver is turned on again, and, after a delay of several seconds, i.e. time to establish a wireless or other connection, that connection to the network is assessed by examining a connection-state flag. Then, the NPR renews its DHCP lease and, if all goes well, the radio or other transceiver and DHCP server functions may be presumed operational.

Releasing and renewing the DHCP address is not technically achieved by simply dropping a network connection, as happens when, for example, a networked PC is turned off. Most routers maintain a DHCP active-lease table of assigned clients, and a given client's lease entry is not cleared when a client simply disconnects. By affirmatively releasing its DHCP address, a client's lease is cleared. When the client subsequently requests DHCP address renewal, it is assigned a "fresh" address. The renewed address may be the same address it had previously. If an NPR unit can release its DHCP address, disconnect from the network, reconnect with the network and renew its DHCP address, it may be presumed that another, not-currently-connected client unit may do the same. This test confirms that the wireless, Ethernet, fiber or other transceiver and DHCP server in the router or access point/router combination are functioning properly.

Additional Tests

The tests outlined above are essentially qualitative and evaluate critical network functionality, things essential to basic network operation. However, there are circumstances other than total failure for which reset of the modem or router may be indicated. When reset is an ineffective remedy or when it is effective but triggered too frequently, user notification via NMCS auto-email may also be called for. For these circumstances, a series of quantitative tests are described, which is representative rather than exhaustive. It will be understood by a person having ordinary skill in the art that other tests may be performed and criteria established for those tests, with failure to achieve such criteria stimulating various network-element resets, generation of special email or text messages or both.

By measuring the time required to download a file of fixed size, downstream bit rate may be inferred. Likewise, by measuring the time required to upload a file of fixed or known size, upstream bit rate may be inferred. Such Internet "speed tests" as these are commonly called, are provided as a free service or as advertising by many service providers, and several reliable speed-test websites exist, such as www.speakeasy.net/speedtest. It is not uncommon for DSL or cable modem subscribers to experience "rate creep," a slow, downward negotiation of connection speed forced by anomalies in line condition, such as rainwater leaking into a buried telephone trunk in the case of DSL, or unusually high traffic volume through a given CMTS in the case of cable. Frequently, rate adaption mechanisms employed in modems or headend/central-office equipment force downward renegotiation of connection speed when a higher speed is not usable or unavailable, but are not programmed to renegotiate connection speed upward once causative circumstances are cleared. Though this "rate creep" mechanism a DSL modem that ordinarily connects downstream at 3552 kilobits per second, for example, may renegotiate its downstream connection speed to 768 kilobits per second on a rainy day when line loss goes up, or excessive noise or signal ingress is present. Unless the subscriber disconnects power to his DSL modem or otherwise resets it, the downstream connection rate may remain at this sub-par setting.

An acceptable downstream speed lower-limit value can be manually set into the NPR unit, or an acceptable range can be established through statistical analysis of speed measurements made over time. Any time downstream rate falls below the limit, however established, an NPR can reset a modem or other attached hardware, attempting to force renegotiation at top achievable speed. A reset-frequency limit, i.e. a limit on the number of times this process can be invoked in a day, week or other interval can be established so that the process does not become disruptive. If this value is exceeded, the Network Monitor & Control Server could automatically generate and transmit an email or other message to the user, service provider or other designated recipient. In this way, infrequent rate-slide events are corrected quickly, and user or service-provider intervention may be summoned for recurrent faults or long-term service quality deterioration.

This is but one example of a quantitative performance test that can be automatically performed by the NPR as a periodic, background test. Other quantitative tests may be included, such as: Internet-connection or modem performance, including upstream and downstream delay, jitter, bit rates, and packet error rates; wireless statistics, such as packet error rate, signal-to-noise ratio, and RSSI (received signal strength indication); conducting periodic wireless site surveys to gauge the number of networks within range, to gather data on channel congestion and in-band, WiFi interference, examining all available RF channels in order to determine which is the least occupied; and conducting periodic wireless site surveys to examine in-band, non-WiFi interference such as frequency-hopping cordless phones or microwave ovens, and classifying these by examining the RF-envelope signature.

The results of tests performed by the NPR are locally cached and then transmitted to the Log Server of the Network Monitor & Control Server, which stores them in the Interactive Relational Database. Review and analysis of test data can be beneficial to end users, network administrators and service providers. Here are some examples of the capabilities and benefits: The NPR may inform the user of deviations from established, time-averaged performance norms or user-established limits via emails and/or text messages. By studying logged data for repetitive events and performing statistical analysis, trends and anomalies can be made visible to service providers or network administrators. By aggregating data from NPRs within geographic regions, outages within specific trunks or remote hubs can be rapidly diagnosed. Any specific makes, models or firmware revs of modems, routers and central-office equipment that demonstrate unreliability can be more rapidly identified and replaced, upgraded or repaired.

An embodiment of the NPR can ascertain modem connection status by monitoring inter-modem signaling, i.e. the connection between the modem and service provider. By directly monitoring the transmitted amplitude envelope in the upstream portion of the spectrum, typically 25 kHz to 200 kHz in the case of DSL, it is possible to distinguish between the connected, synchronized state and the unsynchronized, disconnected state; a periodic or irregular "hunt" signal is present during acquisition, whereas a steady pseudonoise carrier is present when synchronized. For DSL, this inter-modem tap may be a high-impedance inductive or capacitive tap, and will not affect modem operation. This may be accomplished by including two RJ-11 connectors on the NPR, so that the incoming line is attached to one jack, the DSL modem to the other, and the tap circuitry and monitor attaches to the tip and ring pair, which is passed directly through. Similar "tap" arrangements can be adapted to the DOCSIS modem environment, using a standard directional coupler arranged so that the low-frequency, upstream carrier is available at the coupled port. A bent-fiber coupling loop and PIN photodiode and transimpedance amplifier provide a means of detecting optical modem sync in the case of a passive optical network connection. Monitoring circuitry is arranged so that the envelope of the strong, modem-originated upstream carrier is monitored, though the downstream carrier form the service provide may be monitored as well. Rather than tapping the inter-modem connection, or in addition to this, it may be possible to query the modem and/or router directly for status information over the (typically Ethernet 10/100/1000BaseT) network connection or via a serial port and CLI.

NPR for Home/Small-Office Networks

Such an arrangement of two AC outlets for external devices and one DC switch for the NPR itself is a suitable embodiment for many home/small-office networks. With this arrangement, temporary power interruption to the AC outlet designated "Outlet A" would cause the modem to reset, whereas temporary power interruption to the AC outlet designated "Outlet B" would cause the wireless router to reset, as diagrammed in FIG. 4A, NPR Functional Block Diagram.

Being largely under software control, the selection and timing of control signals to the relays or electronic switches may be established by algorithms or, less flexibly, by hardware or programmable logic whose inputs are the test data gathered by the NPR itself. For example, if an NPR were able to connect to a wireless router and subsequently obtain a DHCP address, but was unable to ping a public, numeric IP address, the NPR might suspect that the modem is inoperative. It might first apply a five-second reset pulse or other pulse generally sufficient to cause POR, power-on reset, to the relay or electronic switch controlling AC Outlet A, which supplies power to the modem. Under software control, it might wait 1 to 2 minutes before attempting additional resets, thereby providing sufficient time for the modem to reboot and reestablish connectivity with both the public network and the wireless router providing connectivity to local clients, including the NPR.

If this proved unsuccessful in reestablishing connection to the public network, as confirmed by continued inability to ping a public, numeric IP address, the NPR might then reset the wireless router by issuing a five-second or similar POR pulse to the relay or electronic switch controlling Outlet B. The NPR could then wait a further 1 to 2 minutes before taking additional action, thereby giving the wireless router time to reboot, reestablish connectivity with and through the modem to the Internet, and reestablish connectivity with the local network clients.

If these individual resets proved unsuccessful, the NPR could then perform a compound reset, turning off power at both Outlets A and B, restoring power to Outlet A 5 seconds thereafter and restoring power to Outlet B after a further delay of 30 seconds. This would cause the modem to reset first, establishing its connection to the public network before the wireless router is rebooted. This compound reset can be effective in circumstances were connectivity will never be reestablished when both units are simultaneously reset.

If, after a 1 to 2-minute connection-restoration interval, this proved unsuccessful, the NPR could attempt a reverse compound reset, turning off power at both Outlets A and B, restoring power to Outlet B after 5 seconds had elapsed and restoring power to Outlet A after a further delay of 30 seconds. This would cause the wireless router to reset first, allowing it to reset and connect with the local clients before the modem was reset. If none of these tests proved effective, the NPR could next reset itself, and then start anew at the top of the Functionality Test Tree.

Concatenated Watchdogs

In addition, an independent electronic "watchdog," generally a small 8-bit processor with internal clock, such as one from the Microchip PIC family, in the NPR can provide additional reliability, automatically resetting the NPR if it fails to provide a timely "heartbeat" signal to the watchdog processor. FIG. 14B, Relay & LED Driver Schematic Diagram illustrates this arrangement. Many of these processors contain internal hardware watchdogs, and with a few additional software instructions, these too can be put to use, resetting both the independent processor and the NPR in the event of that the internal watchdog times out. With such an arrangement, the NPR itself is a "watchdog" for the modem and router, the independent processor is a watchdog for the NPR, and in turn the watchdog processor's internal, hardware watchdog checks the independent processor, making in all three successive watchdogs, with each surveilling successively more complex software tasks and making for a highly reliable unit. Such a watchdog processor may include a communications with the NPR's main processor. Prior to performing a power-on reset of the NPR itself, the watchdog would inform the NPR main processor that it is preparing to reset the NPR. The NPR can note this in non-volatile memory so that, when the NPR is reset and restored, its Log Client can communicate with the Log Server in the NMCS that it has undergone an autonomous self-reset. Alternatively this information can be communicated by the watchdog processor to the main processor after the reset has taken place, as the watchdog processor may reset the main processor, but not itself. It may include a small amount of EEPROM memory, so that this information is retained if is powered down, and may then be communicated to the NPR's main processor, and the Log Client in the main processor can then pass it to the Log Server within the NMCS, which can place a permanent record of the reset in the IRD.

UPS

The home/small-office NPR may contain an internal uninterruptible power supply (UPS), thus providing clean, isolated, surge-protected, reliable backup power to its switched AC power outlets and, perhaps as DC, to itself as well. Alternatively, the NPR may be built into or attached to a UPS designed specifically for network applications, a NUPS (network UPS). The UPS may function in the conventional manner, with a low-voltage inverter driving a laminated-iron transformer to generate 120 VAC power. Or, by means of efficient switching-power-supply techniques and hard-switched, modified-sine-wave output with controlled rise and fall times for EMC (electromagnetic compatibility), AC power can be delivered to external, light-load, AC-powered devices such as wireless routers, DSL modems and cable (DOCSIS, Data over Cable Service Interface Specification) modems. Alternatively, full-bridge or, with bipolar DC supplies, half-bridge Class-D power amplifiers can be employed to provide low-distortion, 120-VAC sine-wave power at 60 Hz or another desired frequency. Spread-spectrum clocks can be utilized to minimize narrowband, discrete-frequency harmonics inherent in Class D designs, thus simplifying compliance with EMC directives of regulatory agencies such as the FCC and ETSI. By employing compact, lightweight, efficient circuitry, a number of advantages accrue: Heat dissipation is minimized. UPS backup runtime is maximized. A smaller, lighter-weight, rechargeable battery pack may be used, such as lithium-ion or lithium-polymer (LIPO). The unit can be built in an unobtrusive, low-profile enclosure with a small footprint, thus occupying no more space than a typical modem or router. This is important, because the modems and routers attached to the NPR are small and getting smaller. Also, a manufacturer may wish to integrate NPR and NUPS into a wireless router, or into a DSL modem or cable modem. Ultimately the NPR, NUPS, battery, modem and router may be combined into one single unit no larger than a deck of cards.

Power delivery efficiency can be further enhanced by either of two methods: Electronic power-factor correction circuitry can be added or can be included in the switching power supply design. Alternatively, DC power can be supplied directly from the UPS or NUPS to the modem and to the wireless router or other network gear. In this instance, the so-called wall transformers supplied with the modem and router are eliminated. These "wall transformers" are typically small DC power supplies, and provide unregulated, 12 volts DC via a barrel connector. By eliminating the wall transformer, transformer efficiency (typically 75%) and the relatively low power factors (PF typically 0.6) of inexpensive router or modem power supplies are no longer an issue. Such direct DC feeds, which would be switched off or on by low-voltage power FETs rather than heavier, larger, more-expensive electromechanical relays or high-voltage electronic switches, may need to accommodate the differing DC voltages, polarities and connectors required by most major brands of modems and routers, as well as providing current limiting, short-circuit protection and perhaps independent, floating grounds.

For such direct-DC configurations, the electronic design of the switching power supplies is straightforward and well known to persons having ordinary skill in the art; such switching technologies as SEPIC (single-ended primary inductance converter) or flyback can be employed to obtain multiple isolated outputs, different polarities and floating grounds if needed. The mechanical aspect, primarily multiple DC power connectors, can be addressed in a number of ways: "Pigtails," i.e. model-specific low-voltage DC power cords, with a modem- or router-specific connector on one end and an NPR-specific connector on the other can be provided. Programming resistors that establish voltage, current limiting and other pigtail "personality" characteristics can be included in a small, integral circuit board molded into either end. Such methods have been used for many years in universal power supply units for laptop PCs and mobile phones, and are well known to persons having ordinary skill in the art. A representative schematic diagram, FIG. 18, Regulated Pigtail Adapters is provided for reference. The same technique may be applied with switching regulators, and additional pins and additional pins, leads and components, including silicon devices, may be included in the pigtail to define voltage, current limiting, and other pigtail personality characteristics.

Alternatively, the NPR could interface to a small, purpose-designed, external uninterruptible power supply similar to or derived from the APC CS 500. This unit is designed to interface with a PC via a USB connector. Additional circuitry could be included in the UPS so that the two sets of outlets (currently one is backed up and the other has only surge protection) would both be backed up and could be independently switched or controlled by the NPR, or the UPS might be used "as is" for single-outlet control. The digital control interface would connect directly to the NPR or to a PC running an NPR software application, which would control the AC power outlets and monitor all of the things that are examined by the CS 500, such as line voltage, battery charge state, battery condition and so on. The NPR circuitry in this instance would function as a USB host, whereas the UPS is a USB client.

For Medium Office/Small Enterprise Settings

In many commercial settings, service is provided by a T1 or HDSL modem that draws power from the network—generally over the same wires providing data service—rather than from a local power supply at the customer location. This is sometimes called a "SmartJack," and is generally enclosed in a locked, secure metal enclosure. It is the "demarc" point separating the telephone network from the customer premise equipment. That modem is typically connected via Ethernet to a router which is AC powered or, more frequently to an AC-powered Integrated Access Device (IAD) that provides both a data connection, typically Ethernet 10/100BaseT, and multiple telephone connections (analog POTS, Ethernet VoIP, ISDN/BRI or another digital telephone standard). For such installations, a NPR might include an internal, 3-port Ethernet switch, one port for connection to the IAD, one for itself, and one for the customer's Ethernet switch or other equipment. This is illustrated in FIG. 4B, Network Probe Restore for IAD Functional Block Diagram.

This large-office/small-enterprise NPR might include a different arrangement for resetting resources. It might, for example, include two or four terminals, so that DC power provided by the service provider to the modem in the "Smart-Jack" traverses a dry-contact closure (relay) or optically isolated electronic switch within the NPR. In this way, the NPR can power-on reset the "SmartJack" by momentarily opening these contacts. The large-office/small-enterprise NPR might include a single AC power outlet for resetting and restoring the IAD. Or it could include the SmartJack dry contacts, Outlet A for the IAD, and Outlet B for a local voice switch. Connected to that local telephone switch, it could check periodically for local dial tone, dial a predetermined outside number and perform a short modem-to-modem exchange, thereby confirming connectivity between the client telephone network and the PSTN (public switched telephone network). If indicated, it could then reset the local telephone switch in the same way that NPR resets data equipment. The large-office/small-enterprise NPR would also perform those data-connectivity checks (DHCP, DNS, Internet connectivity, et al.) appropriate to the media involved, both on the customer (LAN) side and the service-provider (WAN) side.

Like the home/small-office NPR, the large-office/small-enterprise NPR may also include an internal uninterruptible power supply (UPS) or may provide a connection, typically host-side USB (universal serial bus) or serial port, so that it can interface directly to the client-side USB connector of a compatible external UPS that includes a digital interface for controlling outlets via relays or electronic switches, and circuitry for monitoring AC power, battery-charge state and battery condition. In the large-office/small-enterprise setting, a purpose-designed, switched-outlet version of a larger, more powerful and sophisticated UPS similar to or derived from the APC Smart-UPS series SUA750 might be appropriate.

For Passive Optical Network Installations

Power for the customer-premise passive optical network (PON) modem is generally provided by local AC power backed up by an internal rechargeable battery or local UPS (uninterruptible power supply). An NPR could be attached to or integrated with a fiber modem as well as a DSL or a Cable (DOCSIS) modem. It may be feasible to power the NPR from the power supply and backup power in the fiber modem, or it may be feasible to power the fiber modem from the power supply and backup power included in the NPR as described above.

NPR Reset Function

As a standalone device, the NPR can, with simple hardware such as a single electromagnetic relay or electronic switch such as a FET, bipolar transistor, Triac, SCR or similar device, control or reset any single device to which it is attached, including itself. With two such electromagnetic relays or electronic switches, the NPR can control or reset two attached devices. The NPR can control or switch DC power from its own power supply, via a number of independent electronic switches and regulators, to any number of attached devices or to itself as illustrated in FIG. 4C, Network Probe Restore with Switched DC Functional Block Diagram. By momentarily turning DC power off and then back on, either with fixed rise and fall times or, if need be, programmed, controlled rise and fall times that better emulate an attached device's own power supply, the NPR can perform a power-on reset or POR on multiple attached devices. The NPR may include one or more built-in AC power outlets, so that by operating electromagnetic relays or electronic switches, it could interrupt AC power to one or more attached AC-powered devices and perform power-on reset of the equipment plugged into such outlets, as is illustrated in FIG. 4A, Network Probe Restore Functional Block Diagram. The NPR could include combinations of switched-DC connections and switched-AC outlets, such as one DC switch or logic-level reset line for itself, and two AC outlets for external devices, or three switched DC outputs, one for itself, one for a modem, and one for a wireless router.

Critical to NPR usability is a built-in disablement function that disables the NPR's network-element and self-reset capabilities whenever the NPR is undergoing firmware upgrade, or to delay such resets so that they are non-interfering. Without this feature, an upgrade would almost certainly be interrupted, because the NPR has limited or no functionality during upgrade. Interrupting a flash-memory upgrade in an NPR would in all likelihood render it permanently inoperative, i.e. "bricked." When the "Firmware Upgrade" button in the NPR is pressed, the triggered upgrade routine would first disable all reset mechanisms, relays or FETs, leaving them in a suspended ON state for 3 minutes or so.

It is also important to include a manually selectable reset disablement mechanism so that autonomous reset of an attached router or modem does not occur during a firmware upgrade of either of those two units, as they also could be rendered permanently inoperable if a reset occurred during an upgrade. During an upgrade, a modem or router may be inoperative for as long as 2 or 3 minutes; an NPR would interpret this as a fault and would attempt a reset, interrupting power to the router, the modem or both and Functions The NPR may be a dedicated hardware device, or it may be implemented as software running on a general-purpose platform, or a special-purpose platform that has another principal function. When installed and running as software on a hardware platform that has another principal function, such as a PC, an NPR can reset that hardware platform's operating system (OS) with or without DC or AC switching hardware, i.e. reset can be performed by software instructions or function calls. Alternatively NPR could selectively reboot one or restart more errant software applications running under the OS. Reporting threads in each application would be continuously tested by the NPR thread, recognizing and reporting faults. It would do this entirely under software control. The NPR task can reset itself. With the addition of simple interface hardware, such a mostly-software NPR can also control or reset external devices. A single-port NPR would be capable of controlling or resetting a single external device and a double port NPR could control or reset two external devices. There is no practical limit to the number of reset/restore control ports an NPR could have.

Variants

In order to fully test the functionality of a wireless router and modem setup including its wireless-communications functionality, the NPR client must itself have an RF modem, i.e. wireless client circuitry and antenna. Alternatively, the NPR could attach to a router-and-modem setup via optical fiber, such as 100BaseFX, via Ethernet such as 10/100BaseT, via USB, via a serial port, another communications means or standard, or via any appropriate, public or proprietary communications connection and protocol, including LVDS, RS-485, CMOS logic levels and other on-board hardware interfaces. This would not fully exercise and verify wireless connectivity in a wireless network. However, attached directly to a non-wireless, i.e. hardwired network employing Ethernet cable, such as 10/100BaseT Cat 5 or 1000BaseT Cat 6 cable, 100BaseFX or 1000 BaseFX fiber, such a hard-wired NPR would fully test that network.

An NPR may connect to a local area network via any physical medium, including twisted pair, coax or fiber, or via any electromagnetic radiation means, including infrared including but not limited to IrDA, 802.11 (WiFi) wireless, UWB (ultra-wideband), ZigBee, geosynchronous or LEO satellite links, or any other wireless standard. An NPR may connect directly with a wireless-carrier network via but not limited to such standards as GSM, GPRS, EDGE, 3G, CDMA EV-DO, HSDPA, WiMax, WiFi or and others. A large number of NPRs could be deployed over a wireless-carrier network powered by batteries, network-supplied AC or DC power, a local power utility, or solar power and storage batteries. Such an NPR could continuously monitor and confirm connectivity in a data or voice network from a specific location. This would fully confirm the digital and RF (radio frequency) functionality and integrity of a monitored cell site or fiber-connected mini-hub, all of its frequencies of operation, its transmit power and receive sensitivity, check all of its antennas and sectors, evaluate electromagnetic propagation characteristics and link loss in different seasons and in various weather conditions that are known to affect propagation, and perform other RF checks. Such units might consist of little more than a standard mobile telephone and power supply and a custom software application running on that phone's single embedded processor.

The NPR may be built as a stand-alone unit. It may exist as software, i.e. as a background application or agent running under the operating system of a hardware platform that has another principal function, such as a PC; a PDA; a mobile or cordless phone; an IP phone; a laptop or tablet PC; a "thin client" such as the Sun Ray; a DSL, T1, cable (DOCSIS), fiber (PON, passive optical network or GPON gigabit passive optical network) or other modem; a router, a wireless router, or wireless access point; a server; a UPS; a PBX or IP voice switch, such as a Linux PC running Asterisk. That hardware platform may include NPR-specific hardware, such as a relay or I/O board together with appropriate software drivers. Since the NPR is controlling or switching power to a router and/or modem, it is reasonable to integrate a small UPS (uninterruptible power supply) capable of powering the NPR, the modem, and router for a period of time ranging from a few minutes to several hours. Adding UPS capability would minimize router/modem faults resulting from voltage surges, spikes, brownouts and outages. An integrated or independent UPS would also continue to power the modem and router during power outages, so that laptop users and others with local backup power could continue to use the network.

With some added complexity, a dual-mode NPR could function a majority of the time as a simple wireless client unit, and, in time of need, deliberately disable (power down) the wireless router and/or modem to which it is attached and assume the role of one or both of those units. An arrangement of one wireless router-and-modem and one such dual-mode NPR would provide full redundancy, but the concept is extensible from 1:1 to 1:n where n is any positive integer. In such a redundant-hardware arrangement and dual or multiple independent Internet connections (two DSL lines, or one DSL line plus DOCSIS Cable, for example) two dual-mode NPRs could function simultaneously, feeding all traffic arbitrarily to one, but constantly checking functionality in both. Should one Internet connection or NPR go down, all traffic would be routed to the remaining units. Such an arrangement would provide even greater reliability. All such partially or fully redundant arrangements are called RAMN, Redundant Arrays of Multiple NPRs.

It is conceivable, in an 802.11n, WiMax, or other system employing MIMO (multiple input/multiple output) RF technology, that one or more of the independent front ends or radio transceivers that is used most of the time as one of n MIMO wireless access point transceivers could, on a scheduled basis or on a time-available basis (during intervals of light network loading), do double duty by serving also as an NPR, the transmitter running perhaps at reduced power and the receiver with reduced sensitivity to prevent overloading.

Combined with Router and Modem

Modems are frequently provided or specified by service providers. Wireless routers and other home/small-office network gear are often purchased retail or on the web by the home or small-business end user. However, many service providers are now looking to provide the wireless router also, and combined DSL- or cable-modem wireless gateways are available. Auxiliary equipment such as the Network Probe Restore unit could conceivably be provided by a service provider or purchased retail. Combining a modem and router into one unit, or combining an NPR into a modem, or combining an NPR into a wireless router, or, ultimately, combining an NPR, a modem and a router all into one compact unit may be highly desirable. If combined into one unit, this has implications for the methods employed to reset the units when faults are detected, and the implementation of UPS backup power distribution.

For example, if the NPR is physically integrated with a modem and router, the NPR may reset either the modem or the router directly by means of logic-level reset inputs on those units. Likewise, there may be no need for a hardwired equivalent of the Automatic Service Discovery feature discussed earlier, because the manufacturer will have established whether the wireless element or modem is handle routing and other network services. However, there is an advantage to having the NPR physically separate from the router and modem, and that is: if the router or modem crashes, the NPR will detect the fault and may be able to restore normal operation. In a combined unit with a shared processor, a crash in one element may bring down the entire unit, including the NPR. Alternatively, the NPR could be integrated into the same physical package at the wireless element and modem, but with its own, independent processor, software crystal, memory and peripherals. In this instance, the integrated NPR would probably be as effective as a physically separate unit.

NPR Separation and Additional Modes

It will be obvious to those skilled in the arts that the two principal functions of Network Services Probe and the Network Reset need not be integrated into one unit or if two separate units, those two need not be collocated so long as they are in communication with one another. A multiplicity of Network Probe units may test, from a number of locations and in a number of ways, network functionality without any reset/restore capability. The Network Reset function is a simple relay control circuit, electronic power switch, or dry-contact reset arrangement. One or more Network Services Probe clients may be in communication with a Network Reset client, and the Network Reset client could act according to network-reset instructions issued by one or more Network Services Probe clients or the NMCS. Such operation assumes communication between the Network Services Probe clients and the Network Reset client is functional, which may be an invalid assumption when the network is inoperative, unless a separate communications channel is provided. Alternatively the Network Reset client could act by default, automatically resetting the network and possibly itself anytime its connection with one or more Network Services Probe clients or with the NMCS, if any, is lost.

It will be obvious to a person having ordinary skill in the art that the AC outlets or other power connections of an integrated NPR or a separate Network Reset Client need not be connected only to a router or modem; the NPR or Network Reset Client can be connected to any device or appliance that one may wish to control from the Network Monitor & Control Server. It is also obvious that an NPR, Network Reset or similar client could have other inputs or outputs such as: 0-20 mA current-loop or other analog sensing capability; Dry-contact sensing inputs; Dry-contact outputs; RS-485 or other digital inputs; Other digital or analog inputs or outputs.

With such capabilities, the NPR could: monitor the client network; turn off, turn on, reset or restore any equipment at that location; monitor environmental conditions at the client-network for such conditions as temperature too high or too low, flooding, audible noise above a preset threshold; lights on or lights off; pumps, valves and critical hydraulic or pneumatic pressures. If the NPR contains an integrated or connected UPS (uninterruptible power supply), the NPR can monitor critical UPS data, such as battery charge state, battery condition, UPS temperature, power flow, line voltage, load power factor, load current, and other critical analog parameters. It can also record critical transient data, such as the magnitude of voltage spikes, the duration of line voltage dropouts, the duration of and minimum sustained voltage of brownouts, and any sudden or unusual changes in load characteristics, such as current consumption. The NPR, NMCS and RSIs can be setup to provide alerts to different individuals based on predetermined settings, thresholds, and combinations of events or other logical associations programmed into the NMCS database.

An NPR or RSI may serve multiple simultaneous roles. In addition to its network-monitoring and status-reporting roles in, for example, a WiFi network, the NPR or RSI might also serve as a signal repeater, like the Cisco-Linksys WRE54G. Multiple NPRs and RSIs could be used in this way to form a mesh network, and the NMCS could administer the mesh or the user, via the web server of the NMCS, could do this himself. This dual-mode capability, NPR+repeater and RSI+repeater is illustrated in FIG. 19, NPR and RSI as Repeaters in Mesh. The NPR or RSI including the repeater function could operate as a wireless repeater, i.e. registered to a particular SSID and using the appropriate encryption method and code like the WRE54G, or it could function in WDS (wireless distribution system) mode like the Apple Airport Express, linked to a WDS-compatible wireless router or AP/network. In addition, an NPR or RSI may include one or more Ethernet ports, and may include an Ethernet switch. Such an NPR or RSI could perform its network-monitoring and status-reporting role, serve as a wireless repeater, and serve as a network access port for hardwired or fiber-connected client PCs.

An NPR or RSI may include GPS or trilateration location hardware and in this way gather and report network status together with its own position or track. A number of such devices configured for a wireless-carrier standard and located in vehicles such as buses or taxis could collectively measure, monitor and map out an entire wireless carrier network.

In a WiFi network that includes a GPS receiver located in or attached to the wireless router or AP, the wireless router or AP's transmit carrier (and receive LO) can be phase-locked to the extremely stable GPS carrier, and supplementary GPS data can be provided via the Internet from an assistance server, which may be included in the NMCS. In this way, A-GPS (assisted GPS) techniques could be utilized to increase the sensitivity of GPS receivers located in the NPRs or RSIs, enabling them to provide location data while indoors. Conversely but not simultaneously, WiFi coverage range can be increased, because, with all NPRs and RSIs phase locked to the GPS carrier, WiFi carrier phase GPS phase lock capability may be built into a WiFi or WiMax wireless access point, or into a wireless repeater on such network. This would facilitate rapid, accurate mapping of a mesh network, would facilitate field service, and could be used to deter AP or network-repeater theft.

Network Monitor & Control Server

The Network Monitor & Control Server (NMCS) consists of seven integrated functions: 1) an Interactive Relational Database, the single repository for all significant data from all six other elements; 2) the Universal Web Server; 3) the Status Server; 4) the Command Server; 5) the Remote Indicator Server; 6) the Log Server; and 7) the $3^{rd}$-party Service Monitor. The structure of the Network Monitor & Control Server is shown in FIG. 5, Network Monitor & Control Server Functional Block Diagram. All seven NMCS elements may be integrated in a single server chassis, or each may run on a separate server chassis, those chassis interconnected by fiber, Ethernet cable or another suitable interconnect medium. The NMCS may be a single server or server installation, multiple independent but interconnected servers, or it may consist of multiple redundant servers located in a single location, redundant servers located in widely separated geographic locations with one designated as primary and the other as hot-standby secondary or backup. The NMCS is the largest, most powerful in terms of processing power and flexibility, and the most expensive component of that embodiment of the invention of which it is part. The NMCS is typically a fast and capable unit with considerable RAM, RAID hard drives and other resources. The NMCS will typically run under the Linux, UNIX, Solaris or Windows operating system and can support multiple software applications running simultaneously. The principal functions of the seven elements are as follows:

1. Interactive Relational Database

The internal structure of an embodiment of the Interactive Relational Database is shown in FIG. 16, IRD Database Diagram. The diagram reflects how one database element is keyed or indexed to another. Individual Network Probe Restore client units and their parameters and state information are listed in the "Units" block, for example. The block "NetEyeMappings" is keyed to both the "Units" block and the "NetEyeUnits" block. This maps a given Remote Status Indicator (NetEyeUnits) to one or more Status Restore clients. A Remote Status Indicator may also be mapped to any $3^{rd}$-party Service Providers that it is assigned to monitor via the "NetEyeServiceMappings" link. By associating these records in this way and maintaining current indexes reflecting the locations of the various records stored there, rapid access to database information is assured, and the system does not grow sluggish and unresponsive as new client units are added and the volume of records grows. Another central architectural aspect is that all significant data, settings, commands and records are entries into one or more tables in the Interactive Relational Database; there is no hoarding or diversion of data by the five servers or the $3^{rd}$-party Service Monitor. There are many possible configurations for the Interactive Relational Database, and the servers could be made to function and to interact with one another without the Interactive Relational Database, but such server would be more interdependent and the software less reliable.

2. Status Server

The Status Server performs three functions that are central to the proper operation of embodiments of the invention that include an NMCS: 1) The Status Server receives status reports from one or a plurality of Network Probe Restore (NPR) client units regularly or according to a schedule known to NPR and Status Server and places the status reports in the IRD. 2) If one, two or another predetermined number of status reports are not received from each monitored NPR by the Status Server within a designated timeframe, the Status server will timeout and declare a non-reporting NPR as Lost. 3) Whenever the Status Server receives a status report from an NPR indicating a fault on a monitored network, or whenever the Status Server declares an NPR Lost due to missed reports, it may, according to its masks, filters and configuration settings in the IRD: a) Generate and transmit or cause to be generated and transmitted an smtp email or sms, or another notification of such fault; b) Operating via the IRD and the Command Server, cause an affected network element or elements to be reset; c) Operating via the IRD and the Remote Indicator Server trigger a remote indication of a network fault at any Remote Status Indicator whose monitor pool includes the affected NPR.

Status Server timeout occurs as follows: The Status Server collects status information from all registered NPR units and enters this into the IRD. The Status Server also calculates a separate, running time-since-last-status-report ($T_{SLR}$) for each registered NPR and stores this in the IRD. At the instant a status report is received from a given NPR, its $T_{SLR}$ is set to 0. Should $T_{SLR}$ for a particular NPR exceed the preset limit established in the IRD for that NPR, typically two reporting intervals plus 20 percent (a total of 12 minutes in one embodiment), that NPR is declared "Lost" by the Status Server and is marked Lost in the IRD. The SMTP client in the Status Server may then be triggered to generate and transmit email or sms messages to all addresses associated with the "Lost" NPR in the IRD, and to notify any Remote Status Indicators whose monitor pool includes that NPR.

The Status Server communicates only with the NPRs, each of which may be a discrete hardware unit, or may be a software application running on a platform that has another principal or additional function. NPRs communicate with the Status Server using TCP/IP, though a person having ordinary skill in the art will recognize that other protocols could be used, including UDP, so long as allowances are made for differences in delivery reliability. The Status Server listens for TCP/IP communications from NPR clients on an open port, such as port 2525. When an NPR first contacts the Network Monitor & Control Server's Status Server, the NMCS responds with an ASCII 220, meaning "ready." Status message transmission will then commence, with a format as shown in the example below. Status Server to Network Probe Restore (client) communications is shown as a bold, right-pointing arrow. Network Probe Restore to Status Server communications are shown as a left-pointing arrow. First, assume that the status report of a given Network Probe Restore unit is all-okay:

→ 220 Ready
← SUBJECT: 00:01:4A:60:77:16
→ 250 OK
← DHCP 1
→ 250 OK
← DNS 1
→ 250 OK
← WEB 1
→ 250 OK
← WIRELESS 1
→ 250 OK
← QUIT
→ 221

Here is how the message breaks down. First, the NPR with opens a software socket in the Status Server.

The 220 returned to the NPR is a code meaning "ready to receive." Following "Subject:" the unique ID is sent, 00:01:4A:60:77:16. The Unit ID, which is an NPR unit's Unit ID, is commonly its globally unique MAC address, but could be any other identifying number, name or challenge-response cipher such that the NPR is uniquely identified. The MAC address is a 12-character hexadecimal number, the left-most six characters of which are the OUI, the Organizationally Unique Identifier identifying the manufacturer. The last six characters are unique under that OUI, and together with the OUI form a globally unique ID or address. The 250 returned is a code meaning, "Your Unit ID has been received, and matches a valid NPR ID record in the IRD."

The NPR then sends "DHCP 1", meaning DHCP okay ("DHCP 0" being fail).

The 250 returned indicates "Understood."
The NPR then sends "DNS 1", where 1 means okay.
The 250 returned indicates "Understood."
The NPR then sends "Network Connection 1", meaning okay.
The 250 returned indicates "Understood."
The NPR then sends "Wireless 1", meaning okay.
The 250 returned indicates "Understood."
The NPR then issues a "Quit," meaning close the connection.
The 221 returned indicates "Connection Closing."

These particular ASCII-number codes are drawn from SMTP, Simple Mail Transfer Protocol as defined in RFCs 821, 1123 and 2821, but any codes or ciphers upon which there is agreement between the Network Probe Restore unit and the Status Server of the Network Monitor & Control Server could be used. A person having ordinary skill in the art will recognize that these specific codes are not critical to the process described, and that any numbers, phrases, encrypted responses and hash codes could be used as well so long as the NPR and Status Server are in agreement as to their meaning and format, and so long as they are easily distinguished from one another, and from other data traffic as may be present.

3. Command Server

The Command Server sends reset/restore commands primarily to a community of registered Network Probe Restore clients, but may also send automated or manually entered commands to a switched rack power distribution unit (PDU), such as the APC AP7902. Such commands may be manually entered via the Universal Web Server by checking a block and then clicking the "Send" button for example, as shown in FIG. 6B, Command Server Web GUI. Commands may be sent automatically according to a fixed schedule, as illustrated shown in the "Schedule Reboot" section of FIG. 6A. Commands may also be generated automatically based on settings, status reports and other data in the IRD. NPR commands to be sent are saved in a buffer, and sent out to the appropriate Network Probe Restore client the next time the target NPR connects with the Command Server. Like the Status Server, the Command server does not initiate connection with the NPR clients; it waits for them to contact it, and then sends along any commands it has waiting. Depending upon the nature and complexity of the particular Network Probe Restore client, these command messages could be simple, such as "Reset and restore Socket A," or they could be complex, such as sending a document to be printed to a Network Probe Restore client unit built with a printer port on it, or an NPR built into a printer. Commands to be transmitted to an SR PDU are sent immediately when manually entered, according to a schedule, or according to flags and configuration settings within the IRD, or whenever communication with an SR PRU is established.

Below is a hypothetical message structure for the Command Server. Right-pointing arrows are messages from the Command Server on the Network Monitor & Control Server to the Network Probe Restore client. In this example, an NPR has just connected with the Command Server's listener on the NMCS, Port 2526:

→ 220 Ready
← SUBJECT: 00:01:4A:60:77:16
→ 250 OK
← COMMANDS?
→ RELAY A (Note: Response may contain more than one RELAY command, or it may contain none. If no commands are to be sent, the server sends END immediately)
→ RELAY B
→ END
← QUIT
→ 221

The ASCII 220 is a standard SMTP ready response. When the Command Server has completed command transmission, it sends an "end." The Network Probe Restore client then sends a "Quit" command and the Command Server responds with an ASCII 221. At that point, the connection is terminated.

A person having ordinary skill in the art will recognize that the Command Server and Status Server functions may be combined in a single server chassis, or that the Command Server and Status Server functions could be combined into a single server application that, for example, received NPR status reports and also queries NPRs for pending commands. The functions of any of the servers within the Network Monitor & Control Server unit may be combined. A person having ordinary skill in the art will recognize that the particular commands utilized in this example are drawn from SMTP, simple mail transfer protocol, and that the use of SMTP is a convenience and not a necessity. Any code or cipher may be substituted so long as the NPRs and the NMCS are in agreement regarding the codes, their format and meaning. This discussion of this embodiment of the invention is illustrates what the Command Server does, but does not show specifically how it must function. The specific methods discussed should be construed as expository but not limiting. A variety of communication protocols may be used for Command Server communication with NPRs or SR PDUs, including but not limited to HTTP, HTTPS, FTP, SNMP, SSH, SCP, and PPP.

4. Remote Indicator Server

The Remote Indicator Server communicates only with the community of Remote Status Indicators, or RSIs. These units are remote, status-reporting clients on various networks, and each periodically "checks in" with the Remote Indicator Server. When connected, the Remote Indicator Server adjusts the settings of the various lights, beepers, buzzers and other indicators on the Remote Status Indicator, which will generally remain set after the Remote Indicator Server has disconnected.

The Remote Status Indicator is a failsafe device. It monitors a pool of NPRs and $3^{rd}$ party services, and indicates the aggregate status of all units and services in its monitor pool, as defined later in this section. A Remote Status Indicator's green "all okay" light is effectively the output of a logical AND operation performed on flags in the Interactive Relational Database (IRD) of the NMCS. The mechanics of this process are as follows: The Status Server accepts status messages from one or more NPRs, and enters the status information into the IRD. The $3^{rd}$-party Service Monitor checks the status of $3^{rd}$-party services identified in the IRD, and enters the current status data of each into the IRD. A table in the IRD associates a given RSI with one or more NPRs. Another table in the IRD further associates that RSI with one or more $3^{rd}$-party services. These NPRs and $3^{rd}$-party services are then said to be in that RSI's monitor pool. It is understood that an RSI may monitor only a single NPR, or an unlimited number. A practical limit is probably somewhere in the range of 20 to 100. An RSI may monitor only a single 3-rd party service, or it may monitor dozens. An NPR may include NPR functionality within itself, i.e. ping, release/renew, connect/disconnect, and may monitor only the network to which it is attached. Or it may monitor all of these things simultaneously. A green "good" status indication on a given RSI occurs only when all of the NPRs and all $3^{rd}$-party services referenced in those two tables (and the built-in NPR if included) are affirmatively reporting "okay." If any NPR or $3^{rd}$-party service referenced in an RSI's association tables is reporting "status: not okay" or reporting "lost," i.e. is out of communication with the NMCS, then the RSI will indicate an alarm condition.

The Remote Indicator Server also incorporates the concept of filters that adjust the sensitivity, schedule, persistence and other characteristics of a particular RSI. Filters are typically settings entered via the Universal Web Server web GUI, but could also be entered via CLI (command line interface). A filter setting could, for example, cause an RSI to trigger only after an NPR had been offline for 30 minutes, as an example, instead of responding immediately to the NPR outage. Another filter setting could cause the audio alert on a particular RSI to trigger only between the hours of 7 AM and 11 PM. Other filter settings would define which of an RSI's alternative alert devices, such is shakers or beepers, might trigger in response to a given NPR or $3^{rd}$-party service outage. Filtering is designed to allow an RSI's settings to be programmed so that the RSI provides useful information, but it not a nuisance. Different individuals at different levels in a business organization may have different thresholds, the trigger point at which a fault becomes critical to that individual. Filtering permits tailoring of each RSI to the needs and interests of the individual. If an RSI is being triggered too frequently, its behavior can be reprogrammed instantly by changing settings at the NMCS web GUI. While this does not actually change settings within the RSI, it alters the logic table that defines the times and circumstances under which the chosen RSI will be triggered. In certain embodiments of the invention, similar "filter" functions are available for each SMTP client, so that email or message transmission may be suppressed up to a certain level, or if it occurs too frequently and becomes a nuisance.

Filter settings will also allow a unit to affect an RSI for a certain period of time, an hour, for example. After that, the unit that caused the fault indication on the NPR might be removed from that RSI's monitor pool, and then reinstated in the monitor pool as soon as it comes online. The RSI could have a "clear" button on its front panel, and the button would work as follows: pressing the "clear" button would cue up a message to the Remote Indicator Server telling it to restore the green status light, and to ignore the fault flag from the NPR or $3^{rd}$-party service that caused it, until that fault is cleared, and the flag is reset. Upon receipt of this request, the Remote Status Server would send a signal to that particular RSI clearing its fault indication and restoring the steady green "All Okay" status.

Communication between the Remote Status Indicator client and the Remote Indicator Server in the NMCS is similar to communication between the NPRs and the Status Server. It begins when a Remote Status Indicator client contacts the Remote Indicator Server, which listens on port 2528. A person having ordinary skill in the art will recognize that this specific port number is somewhat arbitrary and not critical to this embodiment of the invention. When a Remote Status Indicator client first contacts the Network Monitor & Control Server's Remote Indicator Server, the NMCS responds with an ASCII 220, meaning "ready." Status message transmission will then commence, with a format as shown in the examples below. Remote Indicator Server to Remote Status Indicator (client) communications is shown as a bold, right-pointing arrow. Remote Status Indicator (client) to Remote Indicator Server communications are shown as a left-pointing arrow.

→ 220 Ready
← SUBJECT: 00:01:4A:60:77:16
→ 250 OK
→ OK
Wait 5 Seconds
→ OK
Wait 5 Seconds
→ OK
Wait 5 Seconds
→ OK
Wait 5 Seconds
→ OK
Wait 5 Seconds
And so on.

The Remote Status Indicator's aggregate network/service status indicator is thus kept current with a latency of 5 to 6 seconds, the reporting interval of the Remote Indicator Server. Should one or more members of an RSI's pool of NPR or $3^{rd}$-party service experience a fault or go lost, the Remote Indicator Server will send:

→ OK
Wait 5 Seconds
→ NOK
Wait 5 Seconds
→ NOK
Wait 5 Seconds
→ NOK
Wait 5 Seconds Until such time as the fault or faults in pooled NPRs and $3^{rd}$-party services is cleared, the Remote Indicator server will continue to send out NOK (not okay) messages, notwithstanding the RSI Filters function previously described. Because it is a failsafe device, if a Remote Status Indicator does not receive an affirmative OK from the Remote Indicator Server every 5 seconds, it waits one additional reporting interval plus 2 seconds (12 seconds total) and then goes to a "not connected" state. The "not connected" indication might be an alternating red/green flash, "okay" or good might be indicated by steady green, and "not okay" might be indicated by flashing red in a simple implementation of the RSI.

When the Remote Status Indicator does not receive an OK or NOK within the 12-second interval, it will disconnect from the Remote Indicator Server and then attempt to reconnect. A remote Status indicator may disconnect from the Remote Indicator Server at any time by transmitting a:

← QUIT
→ 221

When the Remote Indicator Server receives a QUIT, it responds with an ASCII 221 and the connection is terminated. The Remote Status Indicator may remain connected continuously with the Remote Indicator Server, or it may connect, check in, and then disconnect on a fixed or variable schedule. The RSI and the Remote Indicator Server need only be in agreement regarding the connection schedule.

Just like the Remote Status Indicator keeps track of its server, the Remote Indicator Server keeps track of its Remote Status Indicators. Should a Remote Status Indicator's connection drop and not reconnect within 5 minutes for example, the Remote Indicator Server will enter that unit as "lost" in the IRD. Depending upon configuration settings, the Remote Indicator Server may also generate and transmit an email or sms message to the user or designated representative indicating that contact has been lost with an RSI, or that an RSI affirmatively disconnected and has not reconnected since time xx:xx, the time in hours and minutes.

As noted in the Remote Status Indicator detail section, the RSI communicates with the Remote Indicator Server of the NMCS in one embodiment of the invention. The NMCS, in turn, communicates with the pool of monitored NPRs via its Status Server and $3^{rd}$-party services via its $3^{rd}$-party Service Monitor. However, the RSI may in some circumstances communicate directly with the NPRs or may communicate with them via a router or similar network appliance. The RSI may have the capability of evaluating $3^{rd}$-party services itself rather than having the $3^{rd}$-party Service Monitor of the NMCS perform this function and then relay the results to the RSI. An embodiment of the Remote Indicator Server has the capability of delivering more extensive messages than simple OK/NOK to the Remote Status Indicators if they are properly configured to receive such input. For example, a more sophisticated version of the RSI with an integrated, character-based LCD screen, a pixel-based graphical panel or similar display could directly display the names, ID, location, and nature of an NPR fault. Likewise, user-entered text inputted via the Universal Web Server's web GUI could be transmitted to a specific RSI or to a pool of them, to be displayed for a specified period of time and then deleted, for example.

5. Log Server

A Network Probe Restore client will occasionally lose contact with the public Internet and, as a result, may lose contact with the Network Monitor & Control Server unit. During that time that it is out of communication, it may perform automated, autonomous router or modem resets, or it may attempt to reset and restore itself. When an NPR or a network element though which it is connected, i.e. a modem or router, undergoes reset/restore, it will become inoperative for 30 seconds to one minute while its firmware reboots, sometimes longer. During this time, no NPR-to-NMCS communications can take place. It is critical that autonomous reset/restore operations or other critical events and occurrences are eventually transmitted to the Network Monitor & Control Server and logged into the Interactive Relational Database. For this reason, the NPR includes a resident Network Log Client, a small software application that creates a limited, time-stamped event cache in local nonvolatile flash or EEPROM memory.

A typical event-log cache entry might contain the following information: time and date of a reset event; whether the event was autonomous or commanded; if autonomous, the reason for the event; if commanded, the ID, IP address and/or MAC address of the originating NMCS; the result of the event if known, i.e. whether the reset event cleared the fault; any other data that may be of interest in diagnosing the root causes of faults, and understanding when and why a reset took place. This local event log is a FIFO (first in, first out) circular structure, and when communication with the Network Monitor & Control Server is restored, the earliest event in the log is transmitted first, the succeeding event become the first, it is transmitted, and so on until the entire log is sent. The local event cache is maintained and successive entries will continue to backfill it until: 1) communications is restored or 2) the local cache is filled. If the local cache becomes filled, no further entries are made so that the initial time/date associated with a given fault is maintained. When communication with the Network Monitor & Control Server is restored, the local cache is sent to the NMCS. When the NPR receives receipt of the log record from the Log Server in the NMCS, the NPR's local Network Log Client log is quickly emptied, generally within less that one minute. Under normal circumstances, i.e. no malfunctions, no reset/restores taking place, the local cache will remain empty, and no communications with the Log Server will take place other than the NPR transmitting an occasional local-cache-empty message, confirming to the NMCS that it has no log data to transmit. Like the Status Server and the Remote Indicator Server, the Log Server and the Network Log Client in the NPR have an agreed-upon reporting schedule, and if the Log Server does not obtain a report from each registered Network Log Client, it may generate alerts that affect RSI status or generate and transmit email or sms text messages.

6. Universal Web Server

The Universal Web Server is a graphical user interface (GUI) for human operator interaction with the Network Monitor & Control Server. It is a standard web server employing http port 80 or https port 443, serving up pages of html, text, graphics and JavaScript. A user connects with the Universal Web Server using a PC or similar platform, including smart phones or PDAs, using a standard web browser such as Microsoft Internet Explorer, Mozilla Firefox, of Apple Safari. Three representative screens are shown in FIG. 6A, Network Monitor & Control Server Web GUI. The topmost screen shows the login page where username and password are entered prior to accessing the individual, secure, private web pages. A user logging onto the site for the first time will see only the login page. He will have obtained in advance a valid username and password by purchasing an affiliated product, purchasing a subscription, or both. Entering his username and password, the user is taken to his private web pages, into which he will register his Network Probe Restore units, his Remote Status Indicators, the $3^{rd}$-party Service Providers upon whom he depends, and all of the configurations, filter settings, and association table that will define how his NPRs will be pooled with RSIs, what email addresses or sms addresses will be contacted in the event of an outage, and such other information as is necessary to personalize his personal universe of NPRs and RSIs. Note that all data entered via the Universal Web Server goes directly into the Interactive Relational Database, into private files that are grouped according to username or account name. Each individual user or subscriber has his own, secure, customized web pages. There may be thousands or millions of such individual account records and associated web pages located on a single server or a small group of servers. Each custom web page is generally a generic web page filled in with custom user data pulled from the Interactive Relational Database.

Two such private-account web pages are presented in FIG. 6A, Network Monitor & Control Server Web GUI, in the center (Units) and bottom (Command Sending and Schedule Reboot). The "Units" web page in its far left column shows the Unit ID (MAC address) of all the Network Probe Restore units registered under that particular username or account. The next column, Name, is a block in which the user may enter a memorable name for a particular NPR device, such as its location. The State column indicates whether a particular unit is "Online," i.e. active, or hasn't reported in on schedule "Lost." Next, a block for entering an email address or addresses that are to be notified of faults on the network monitored by that particular NPR. For convenience, a check block adjacent to the email address may be checked or unchecked; if checked, email alerts are sent to the address at left. The next two columns, SMS Number and SMS provider, permit the user to enter his sms (short message service) number and service provider, so that text messages are generated and transmitted whenever the right-adjacent block "Send SMS Alert" is checked. On the far right are an Edit hyperlink, which is selected when the user wishes to amend any of the information on the page, and the Select hyperlink. Clicking the Select hyperlink for a particular unit will cause that unit's Last Ten Sessions (lower portion of center page) to be displayed.

In the Last Ten Sessions page, the far left column shows the date and time of a status record. The next four columns, WEB, DHCP, DNS and Wireless indicate the status of Internet access, DHCP, DNS and the wireless connection respectively. The particular NPR selected in this example (Unit 00:18:39:EC:D2:D8) is showing all okay. The column at far right shows the public IP address of the network to which that particular NPR is attached and is monitoring.

The bottom-most screen shows a log of recent commands issued by the Command Server of the NMCS to the selected NPR along with the date, time and status, which is either Processed (already sent), Pending (waiting for the NPR to contact the NMCS and its Command Server so that the pending commands can be sent), Timeout (NPR is presumed offline or has been missing for 30 minutes or so) and Cancelled. The Cancel hyperlink to right can be selected to cancel transmission of a command that has been entered but hasn't been sent and hasn't timed out already. Once a command is sent, it is executed immediately and may no longer be cancelled. The rectangle on the far right of this screen, "Send Command to Unit," contains two check blocks. Selecting one or both of these check blocks and pressing the Send button causes the selected commands to be sent to the unit selected.

At the bottom of the screen is a section for Schedule Reboot. This establishes a fixed schedule for automatically resetting the selected NPR according to a fixed schedule. Reset may be applied to one or both outlets and/or the NPR itself, according to the selections made in the check blocks to right. Next, the time interval is set. Shown in FIG. 6A are settings for automatic, commanded reboot at 4:44 AM every day, which network utilization is generally light.

A person having ordinary skill in the art will recognize that any information entered into a form or check block on a web page served up by the Network Monitor & Control Server's Universal Web Server could be entered by other methods as well. The web graphical user interface, or Web GUI, is used in this example because of its ease of use, familiarity, and flexibility. The web pages presented in FIG. 6A and elsewhere should be considered representative and expository rather than limiting. The pages presented illustrate how the functions described could be implemented. A commercial site performing these functions may be considerably more complex. Also note that user interaction with the NMCS may be accomplished by means other than a web browser, such as a CLI (command line interface, i.e. text-only entry such as SSH, SNMP or telnet).

7. $3^{rd}$-Party Service Monitor

The $3^{rd}$-party Service Monitor automates the testing of various $3^{rd}$-party service providers, such as: mail servers; IM (instant messaging) servers; Skype; Anti-virus servers; VoIP servers; Bank or other Internet financial-transaction servers; VPN servers using PPTP, IPSec, L2TP or other tunneling protocols; Other web-based, hosted or remote services upon which a home or business user may depend. The purpose of the 3SM is to provide timely status information to customers, subscribers, network administrators and other clients or clients' representatives regarding the $3^{rd}$-party services upon which they are reliant. The $3^{rd}$-party Service Monitor does this by inference. That is: client connection to the Internet is inferred by communication between the Status Server and one or more NPRs and RSIs on that client network. The $3^{rd}$-party Service Monitor confirms connection between itself—via the Internet—and a given $3^{rd}$-party Service Provider and that the $3^{rd}$-party service is available and operational. From this, the Network Monitor & Control Server can infer that the client currently has access to that $3^{rd}$-party service. Should the $3^{rd}$-party Service Monitor determine that a monitored service is experiencing an outage, it can immediately inform the customer/subscriber via text messages, email and RSI alerts.

Here are some examples of the services that the $3^{rd}$-party Service Monitor might check:

Mail servers;
IM (instant messaging) servers;
Skype;
Anti-virus servers;
VoIP servers;
Bank or other Internet financial-transaction servers;
VPN using PPTP, IPSec, L2TP or other tunneling protocols.
Other web-based, hosted or remote services upon which a home or business user depends.

The 3SM may perform evaluations of $3^{rd}$-party servers by fully exercising those services utilizing current, valid subscriptions with those $3^{rd}$ parties. For example, the 3SM could test the mail server at mail.att.net by sending a coded email message to itself via that mail server and waiting a reasonable time to receive the email, which could be checked for accuracy. The organization operating the 3SM would do this via its own registered, paid account. Alternatively, an NPR customer or client using the 3SM service could enter his own mail-server login particulars via the Universal Web Server, and the 3SM could use that individual client's login with the $3^{rd}$-party service provider, testing, for example, an email server by sending an email to itself using that particular client/customer's own email login. This would test the server and confirm not only that the mail server is working, but that that particular account is active and valid. Alternatively, the 3SM could perform a less thorough but generally effective test of a $3^{rd}$-party service by sending a connect request to a given server. When sending a TCP/IP connection request to a mail server on port 25, for example, receiving a "220" in response would signal that the server has accepted a connection. This would imply that the server is in good order.

The 3SM could also use a combination of these methods to diagnose $3^{rd}$-party server faults. It could, for example, send a connect request to mail.att.net using a private, client-entered login username/password. If that were unsuccessful, it could reattempt connection with mail.att.net using its own registered username/password. If this latter were successful, the 3SM could retest with the private-client login. If this again failed, the 3SM could make an entry into the Interactive Relational Database (IRD) indicating $3^{rd}$-party service failure/specific account, and then trigger the SMTP client in the 3SM to generate and send an email to that particular client/customer with a message such as, "Mail Server fault at mail.att.net. Server operational, your account login invalid. Please contact your service representative at 1-866-596-8455."

Likewise, for VoIP service providers, the 3SM could place a VoIP phone call using either generic, 3SM-registered login parameters to itself, checking in the receiving end for transmission of a coded, low-speed modem data pattern, for example. It could connect using private login information entered by the customer via the Universal Web Server interface. It could send a connection request to port 5060 (SIP) to the $3^{rd}$-party service provider in question, listening for a response. As in the mail-server test described above a VoIP server test could utilize a known-good login when a customer-supplied login failed, and if successful, inform the customer of a subscription-related login fault at that VoIP provider.

Using the Universal Web Server interface or, as described above, a CLI, information-technology staff at a corporate entity or institution subscribing to the Network Monitor & Control Server/Network Probe Restore service could enter login information for internal VPN connections or hosted servers operated by or critical to that corporate entity or institution. Sensitive data such as this would be entered encrypted in to the Interactive relational Database, protected by username and password, and in a write-only format. Upon detection of an outage at a specific client-hosted server, the 3SM, using its SMTP client, could automatically generate and send email or sms text messages to all affected employees, to the local IT manager and, if applicable, to the host of the affected server or network. Recognizing that a network outage may prevent some users from receiving such an email, the server could also place automated calls and playback prerecorded messages or synthetic speech regarding the outage. At the same time, any Remote Status Indicator units mapped in the IRD onto those servers could be triggered to alarm condition.

A person having ordinary skill in the art will recognize that the specific method of delivering a critical message from the NMCS, regardless of its origin, is not in and of itself significant, and may include: email to any number of addresses simultaneously or in a pre-established sequence; text messaging to one or more mobile phones or PDAs (programmable digital assistants); an autodialing IVR (interactive voice response) system or device that automatically places calls to an administrator and/or other personnel via the PSTN and or mobile carriers, delivering an automated voice message outlining the details of the failure and responding, if requested, with whatever details it has in its database; automatic fax generation and transmission; via screen prompts, audible or visual alerts delivered locally or presented on the operator's console of the NMCS. These same methods may be used by any server within the NMCS to deliver critical messages.

Other Activities

While in steady communications with a large number of NPRs, a server can also check performance benchmarks in conjunction with those NPRs. It can manage automatic firmware upgrades for NPRs and associated PCs, routers, modems and other equipment. The NMCS is in regular communication, generally every 5 minutes, with every registered NPR, and it maintains a table of the remote IP addresses of all NPRs with which the NMCS is associated, and the remote IP addresses of all RSIs with which the NMCS is associated. Many homes and small offices do not have static IP addresses, instead having temporary leased addresses, which may change from time to time. A "go-to" link on a particular user's private web pages within the NMCS web GUI could redirect the user's web browser directly to web resources hosted on his local network, whether on port 80 or another non-standard port. A home user named Joe, for example, could set up a personal redirect via his private web pages on the NMCS Universal Web Server, such as http://joesnetwork.netdefib.com. Anyone entering this address into his web browser would be redirected to the web server on Joe's home network. In this way, the NMCS is functioning like a DDNS (dynamic domain name system) server.

A user could also choose to receive notification anytime the IP address of his home or small-office network changes. This would be accomplished by checking an appropriate block on the user's private web pages within the NMCS.

RSI

The Remote Status Indicator (RSI) is another embodiment of invention. The RSI is a remote indicator that reports the real-time status of one or more Network Probe Restore clients, $3^{rd}$-party servers and other monitored items and conditions. FIG. 3A, System Functional Block Diagram shows how the Remote Status Indicator connects via standard network connections and the Internet to the Network Monitor & Control Server to monitor the Network Probe Restore client units. In FIG. 3A, the NMCS, NPR and RSI are attached to three different networks. This configuration is expository rather than limiting, and it will be obvious to a person having ordinary skill in the art that these three units may reside on the same network, on two networks, on three networks, or that there may be hundreds of NPRs and dozens of RSIs on multiple networks attached to a given NMCS. The NMCS may be a single unit or may be a dual setup, with one unit mirroring the other from another geographic location.

The Remote Status Indicator will generally be remote from the NPRs and the NMCS with which it is associated. The Network Probe Restore unit will typically be located near the modem and router that it is monitoring; their power connections are routed through it so that it can control and reset them. The modem, router and NPR will often be located in a closet, a closed cabinet or other out-of-the-way or inconspicuous location. The Remote Status Indicator can be placed anywhere in a home or office, ideally in a conspicuous location where it will be easily seen or heard. Any number of Remote Status Indicators can be configured so that they are all monitoring the same networks and $3^{rd}$-party services. Because the RSI is an Ethernet or WiFi network client, it need not be located on the same network as the NPR clients with which it is associated. For example, a network administrator with a Remote Status Indicator located in an office in Los Angeles could monitor a network in Tokyo with a Network Probe Restore unit attached to that network and linked to a Network Monitor & Control Server located in New York. The Remote Status Indicator is a networked client, and so long as it is properly configured for the local network, properly configured for its NMCS and attached to its local network, it will "find" the NMCS, which is on a fixed IP address.

In one embodiment, the RSI communicates with the directly with the NMCS rather than directly with NPRs. The RSI-NMCS connection could be made via the Internet, a wired or wireless local area network (LAN or WLAN), a direct hardwired or wireless connection, via a wireless service provider, via a telephone modem, another digital or analog signaling or communications means and/or media, or any combination or concatenation of these. With attachment to the NMCS, the Remote Status Indicator can report the status of a single NPR, it can report the aggregate status of two or more NPRs, and it can report the status of $3^{rd}$-party servers. Because the RSI is in constant communication with the NMCS, the RSI will indicate a loss of communication with the NMCS well. In this way, the RSI is a failsafe indicator: if any of the monitored equipment, services or connections should go down, including the connection to the indicator itself, this is indicated immediately. If the RSI indicates that all monitored equipment is good, all monitored services are good and all monitored connections are good, then, barring a failure of the RSI itself, all those things are indeed good.

This arrangement has a number of objectives: First, if the RSI indicates that all monitored networks are operating normally (steady green, for example), there is a high level of confidence that this is accurate. Second, if connection is lost between any NPR and the NMCS or if an NPR is reporting failure of its local, monitored network, this is immediately indicated (flashing red, for example) on the RSI. A network administrator or other personnel can then log onto the Universal Web Server of the NMCS to determine which network is affected, and collect details from the displayed NMCS logs regarding the failure. Third, if connection between the RSI and NMCS is lost, this distinct condition can be clearly indicated by a separate indication (alternate red/green flashing, for example). In this way, a loss of connection between RSI and NMCS is easily distinguished from failure of an NPR-monitored network. It will be obvious to a person having ordinary skill in the art that the RSI may connect directly with one or more NPRs or may connect with them via a local network or router. The RSI could also directly communicate with and test a variety of $3^{rd}$-party servers, though it may not have the power, versatility and programming ease of use of the NMCS.

FIG. 7, Remote Status Indicator Communications Flow Diagram—Monitoring Network Probe Restore Client shows communications flows associated with the Remote Status Indicator reporting the status of a Network Probe Restore (NPR) client unit. The Network Probe Restore unit 701 performs its series of network and connectivity tests in a continuous, circular fashion. Once every five minutes, it sends a "Network Status: Good" status message wirelessly in this instance to Wireless Router 702 in Step 751. The router is attached to Modem 703, which is connected to Internet Service Provider 704. ISP 704 transmits this message over its backbone connection to the Internet in Step 752, and in Step 753 the message is relayed to the Status Server 503 (FIG. 5, Network Monitor & Control Server), which is listening on Port 2525 of the Network Monitor & Control Server 708 via ISP 706 and Modem 707. A TCP/IP connection between NPR 701 and the Status Server 503 within the NMCS 708 is established, and the Status Server records the "Network Status: Good" message into the common Interactive Relational Database 507 of the NMCS 708. The Remote Indicator Server 505 within NMCS 708, on an independent schedule, periodically generates and transmits a TCP/IP "Monitored Functions OK" (MFO) message which is sent via Modem 707 and ISP 706 to the Internet 705 in Step 754, which relays it to ISP 709 in Step 755. ISP 709 routes the signal to Modem 710 and Wireless Router 711, which passes the message wirelessly in this instance to Remote Status Indicator 712.

The Status Server 503 in the NMCS 708 expects to receive a TCP/IP "Network Good" message every five minutes from the NPR 701, and has a countdown timer tracking this. If a "Network Good" message is not received five minutes after the previous message, the Status Server 503 in the NMCS 708 waits a further five minutes. After the second "Network Good" message is missed (12 minutes in one embodiment), the Status Server 503 in NMCS 708 assumes a fault at that monitored network. The Status Server 503 sets a flag in the Interactive Relational Database (IRD) 507 of reflecting this condition, which is read by the Remote Indicator Server (RIS) 505. The RIS 505 then generates and transmits a "Monitored Functions Fault" message via Modem 707 to ISP 706 into the Internet 705, which routes the message to ISP 709 to Modem 701 and Wireless Router 711 to Remote Status Indicator 712, which goes from steady green to flashing red, or some similar alarm condition. The Status Server 503, via its internal smtp client, also send an email or sms to its designated recipients notifying them of the failure, as illustrated in FIG. 12J, Modem Reset & NMCS Auto Email.

That is an example of timeout-based, fault-status message generation within the NMCS 708. In most instances, fault-status messages result from timeout default, because there is no connection with the NPR. However, an NPR can actively report a disruptive but non-terminal fault such as DNS failure to the Status Server 503 of the NMCS 805, and this can be reported immediately to the Remote Status Indicator 809 and designated to email or sms addresses as illustrated in FIG. 12M, DNS Fail, Router Reset & NMCS Auto Email. Following transmission of the report and acknowledgement from the NMCS 708, the NPR 701 would reset the Wireless Router 702.

FIG. 8, Remote Status Indicator—$3^{rd}$-party Service Monitor illustrates the Remote Status Indicator triggered by a failure at a $3^{rd}$-party service provider. The NMCS 805 generates test messages, which are sent via modem 804 and ISP 803 via Path 850 to the Internet 802, then relayed via Path 852 to $3^{rd}$-party Service Provider 801. In this instance, assume that this $3^{rd}$-party provider hosts a standard SMTP mail server, and that the NMCS is sending it a connection request. So long as the connection is successful, followed by an ASCII 220 (server ready) via Paths 853 and 854, it is probably connected and operational. Should two or more of these ASCII 220 responses not be received in a timely manner, the $3^{rd}$-party Service Monitor will set a flag in the IRD 507 indicating a fault at a monitored $3^{rd}$-party service provider. The Remote Indicator Server 505 in the NMCS 805 sees the flag, and generates a TCP/IP "Monitored Functions Fault" (MFF) message, which is transmitted via Modem 804, ISP 803 via Path 855 to the Internet 803, routed via Path 856 to ISP 806, into Modem 807 and Wireless Router 808, via wireless Path 857 to Remote Status Indicator 809, which changes from steady green (good) to flashing red (alarm) or triggers some other visible, audible or tangible alarm indication.

The RSI may be implemented as a stand-alone unit much like a small router or modem. It may employ a variety of indicators or annunciators to attract attention, such as high-power, high-brightness LEDs (light emitting diodes); piezo-electric beepers, loudspeakers and other audible alerts; shaker motors, rotary vibrators or other tactile alerts; a transducer producing output appropriate to any other human sensory input, such as heat, cold, pressure, vibration or motion, electric shock or other direct or indirect neural stimulation, light or other visual stimuli, any form of audible alert including but not limited to beeps, buzzes, rings, programmed-vocabulary synthesized speech, text-to-speech conversion synthesized speech, musical alerts or ringtones, including playback of .mp3, .wav and other audio formats, MIDI or .mid synthesized music playback, and/or local release of scents or other smells including alterations in local air ion density. The RSI may have simple, attention-getting visual or audible alarms augmented by a local message display, such as a small, four-line LCD display or a small color graphics display. With the addition of a text-based or graphical display, the Remote Status Indicator could provide a prominent alarm indication and also a message display indicating the location and nature of a detected fault. A speech synthesizer, particularly one with text-to-speech capability, could fulfill this function.

The RSI may be an independent hardware unit. However, it may also be implemented as a background software task running on hardware that has another principal function including but not limited to a personal computer, a thin client such as the Sun Ray 2, a mobile telephone, a cordless or hardwired telephone, a pager, a PDA or PDA phone, a tablet PC, a radio receiver, a media player such as an ipod, a television or home entertainment system. As such, the RSI could create alerts appropriate to the platform of which if is part, such as pop-up windows or other alerts on a PC, unique ringtone generation on a mobile phone or PDA, or shaker activation on a pager or phone. The RSI could be built into a wireless router, into a modem, or built into a combined wireless router/modem. It could be built into a hardwired router, or into a combination wired router/modem. It could be built into an IAD (integrated access device), a PBX or VoIP switch, or it could be built into a wired or wireless desk telephone, a wired or wireless IP phone or into any sort of wireless handset. The only limitation is that the RSI host platform must be in communication with the monitored NPRs or in communication with a NMCS that is in turn in communication with one or more NPRs, or capable of such communication. Such communication may take many forms, including but not limited to the Internet, another private or public network, a wired or wireless local area network (LAN or WLAN), a direct hardwired or wireless connection, connection via a wireless carrier, via a telephone modem, LEO or geosynchronous satellite, another digital or analog signaling or communications means and/or media, or any combination or concatenation of these.

As software running on another platform, the function of the RSI is much like the indication provided by email or by text messaging (sms), except that the connection between the NMCS and RSI is supervised, i.e. constantly monitored so that an alarm is raised any time the RSI-to-NMCS network connection is lost or becomes unreliable. The advantage of having the RSI as an independent unit running a small, very reliable operating system such as a small Linux kernel is reliability. As software running under an OS such as Windows XP, Vista or OSX, platform reliability may adversely affect RSI reliability. Also, the PC or other platform must be turned on and networked for the RSI element to function properly.

It will be understood by a person having ordinary skill in the art that the function of the Network Probe Restore unit, i.e. exercising network services such as DHCP and evaluating network function and Internet connectivity via ping may be included in the RSI so that the RSI serves a dual role: it fully tests and continuously exercises the network to which it is attached; and it provides a convenient, remote status indication of one or more remote networks. The reverse, including the monitor-aggregation function associated with the RSI, i.e. monitoring multiple NPRs and multiple $3^{rd}$-party services and providing an aggregate indication of status, may be included in an NPR without affecting its two primary functions of 1) reporting local network status and 2) autonomous network reset/restore.

Additionally, the RSI may include a local RF packet repeater capability such as the Cisco-Linksys WRE54G, in the case of WiFi. In this way, the RSI monitors the network to which is attached, it could monitor one or more remote networks it could monitor one or more $3^{rd}$-party service providers, and it locally repeats any RF packets that it receives, i.e. packets with a matching SSID (service set identification) and encryption code (WEP, WPA, TKIP, AES, et al.), in the case of WiFi. Within a WiFi network, the RSI may function in WDS (Wireless Distribution System) mode, like the Apple Airport Express, in addition to serving its remote-indicator function. The RSI may serve this repeater function or as a node in a mesh network on a WiFi network including such variants as 802.11b,g,a, n and others, but it may serve this function on a variety of other wireless network structures, such as ZigBee, private radio networks, IrDA networks, or the networks compliant with various wireless carrier standards such as GSM, GPRS, HSDPA, CDMA EV-DO, 3G and succeeding standards. The RSI may include one or more 10/100BaseT Ethernet jacks (RJ45), one or more Ethernet fiber connectors (duplex SC or ST) and an internal Ethernet switch, such as the Micrel KS8993 or KS8997. In this way, it would serve as a connect point for local hardwired computers, thin clients, networked printers and other resources, in addition to its fundamental remote status indication function and perhaps wireless repeater or WDS functionality also.

TCP/IP Background and Methodology

The process of initiating, maintaining and closing a TCP/IP connection is well documented, but is outlined here. It is understood by a person having ordinary skill in the art that UDP, SNA or other suitable protocols could be utilized for the purposes described herein, with adjustments made to accommodate procedural differences and to ensure equivalent packet-delivery reliability. This section explains the low-level methods used for communications between Network Probe Restore (NPR) client units and Network Monitor & Control Servers (NMCSs), and between Remote Status Indicators (RSIs) and NMCSs. It describes the protocols and methods used to establish, maintain, and terminate communication channels, i.e. software sockets, between the NMCS and its associated NPR and RSI clients.

Whenever an NPR or RSI client needs to communicate with an NMCS, it can use the methods described here to setup the connection. When an NPR or RSI is finished communicating with an NMCS, it may disconnect using the methods described here or remain connected. All communications between and among NPRs, RSIs and NMCSs use TCP/IP, Transmission Control Protocol over Internet Protocol as described in RFC793 et al. The fine-grain detail of TCP/IP is well documented and is not discussed here. A TCP/IP connection is generally established between a client and a server. The server typically has a fixed IP address, though DDNS and a leased address could also be used.

Client-server connections are initiated by a client. There are a number of reasons for this, but mainly: 1) A server is generally on a known, fixed IP address; 2) Many home/small-office networks have leased IP addresses and may not be found at the same IP address from one day to the next; 3) Many routers contain firewalls that block anonymous traffic from the WAN or wide area network port, the Internet connection. So if a connection is not originated on the client side, a connection cannot reliably be established without entering customized routing or port-forwarding configuration settings into the router. This is generally impractical in home/small-office networks, which often lack extensive IT expertise. This client-initiates-connection principle is widely exploited and routinely used to deliver reliable VoIP service, antivirus updates, web pages, email and most other Internet content.

A client NPR or RSI wishing to connect with a NMCS server must know the server's IP address or addresses and the appropriate listening port number or numbers. The IP address may be a numeric, four-octet (32-bit) IP address (e.g. 64.105.4.130), or it may be specified as a Fully Qualified Domain Name (FQDN) such as www.google.com. An FQDN will be resolved into a routable, numeric IP address by a DNS (Domain Name System) server. A person having ordinary skill in the art will understood that a six-octet, IPv6 address would be used in networks utilizing the IPv6 standard. IP port numbers are designated by 16-bit numbers and are typically expressed as a decimal integer between 0 and 65,535. A port number is essentially a demux key for the server's IP address, routing incoming traffic to the appropriate socket and software thread.

The five servers in the NMCS listen for connection requests on five different sockets with different port numbers but the same public IP address. A person having ordinary skill in the art will recognize that a discrete IP address could be used for each server or other combinations of IP addresses and port numbers so that each server has a unique IP address and port number. The servers need not be collocated so long as they are in communication with one another through the Interactive Relational Database (IRD). Any ports not already assigned either by convention (such as http port 80, for example) or by prior assignment to other functions may be used. Reference is made to the IANA (Internet Assigned Numbers Authority) list of Well Known Port Numbers at http://vww.iana.org/assignments/port-numbers. In this example, the chosen ports are: 2525 for the Status Server; 2526 for the Command Server; 2527 for the Log Server; 2528 for the Remote Indicator Server; and the standard port 80 for the Universal Web Server. The NMCS will allow multiple NPRs and RSIs to connect simultaneously, so multiple unique sockets must be created, one for each simultaneously connected client.

The two primary states for a server socket are Listening and Connected. A server may have only one listening socket on one port at a given time. When a listening socket receives a connection request from a client, it blocks further connection requests until it has completed the initial connection or rejected the request. Each listening socket has an assigned limit for the number of pending connection requests that can be queued. As additional connection requests come in, requesting clients are queued in the order received until the limit value is reached. All subsequent clients receive an immediate rejection and must retry at a later time. As part of the connection request, the initiating client specifies a randomly selected, 16-bit port number, generally above 1,023 and below 65,536 as the client-side listening port. The NMCS server uses this client port for its data return path to the initiating NPR or RSI. Once the listening socket has processed a connection request, it "forks," i.e. spawns a new connected socket that is sent to a new thread within the application and two-way communication with that client can begin. The listening socket on that port is now free to process additional connection requests.

In the server, a connected socket is identified by the client-side IP address and the client-selected listening port number. Two clients on the same network and thus having the same public IP address must therefore choose different port numbers. Otherwise, the second will be rejected by the server (duplicate address/duplicate port number). In this instance, the second client would have to retry, specifying a different client-side port number. Most routers use network address translation (NAT) and maintain a table of valid connections through the firewall mapped in the same way: IP address and port number. In most cases, the client-side NAT router will block a duplicate port request before it is sent out.

Once a socket is connected, it is monitored for incoming data by its own dedicated thread. The socket remains connected until the connection is lost due to an error condition or the connection is affirmatively closed, either by the client or by the server. During the connected state, TCP/IP automatically sends packets back and forth to maintain the connected state. This activity is transparent to the application, and the application is signaled by the socket only if the connection is lost due to an error condition. If the connection is dropped unexpectedly, the socket moves to the "closed" state, the causative error condition, if known, is flagged and made available to the application that was using the connection. The normal method of closing a connection is for the client to notify the server that it intends to close the socket. The server then acknowledges the close-connection request by replying with a closing notification. Upon receipt of that closing notification by the client, the socket is considered closed. Note that while the client most commonly initiates a disconnect, the server may do this as well.

When the NMCS needs to send data to a particular NPR or RSI, it must necessarily wait for that NPR or RSI to contact the server and open a connection. Then, the NMCS refers to a table in memory that pairs NPR IDs and connected sockets, and sends any pending messages. The ID is generally the NPR's MAC address. The MAC address is transmitted when the connection is first opened. When a connection is no longer required, it will be closed. Once a socket has been closed, the server will clean up any resources that were being used by the (now closed) socket, including removing entries from the client-ID/socket table just described. When a client reconnects at a later time it establishes a new socket, and a new client-ID/socket entry is made in the table.

A client must connect with the NMCS server to send status information, listen for commanded resets, or to upload logged transactions. Depending on a client unit's function, it may connect to one server or it may connect to multiple servers. Each NPR or RSI client will send a predetermined sequence of data, including the client ID. The message data is formatted as "SUBJECT: nn:nn:nn:nn:nn:nn." The character n may be any hexadecimal number. The number nn:nn:nn:nn:nn:nn is the client's globally unique MAC (Media Access Control) address. When a connection is opened, the client table in the NMCS is checked to ensure that connecting unit has a valid MAC address. If the MAC address does not match any table entry, the connection is dropped. If a match is made, the client is ready to make full use of the connection to perform its intended function. Its function may be to remain connected, awaiting a specific, coded instruction from the server triggering the opening or closing a relay, for example. Alternatively, a connected client may experience a condition that triggers immediate notification of the server. In the connected state, the message is transmitted immediately. If not connected, the client will initiate connection, and then transmit the message.

All data sent to or from the server is formatted as ASCII text and terminated with an end-of-line (EOL) character. When data is sent to the server, the server acknowledges each line received either with a 250 "smtp OK", or with an "UNKNOWN COMMAND RECEIVED". Once a client is finished using a connection, it will send a "QUIT" command. The server will reply with "CLOSING COMMUNICATION CHANNEL". Once this closing response is received, the client closes the socket by invoking the disconnect procedures of TCP. Once a client has closed a socket, the socket is discarded. The client creates a new socket the next time it needs to connect with the server. A person having ordinary skill in the art will recognize that the specific codes used in this document, such as ASCII 250 and 220 are arbitrary, and that any binary codes may be used so long as client and server agree on format, meaning and content.

Prototype Detailed Description

An embodiment of the invention has been reduced to practice. This is a general description of the prototype, its elements and construction.

A prototype Network Probe Restore unit was built using an off-the-shelf Linksys WRT54GL wireless router, a version of the WRT54G that uses the Linux operating system and an off-the-shelf APC CS500 UPS. A copy of DD-WRT v23_sp2 open-source wireless-router firmware was downloaded from www.dd-wrt.com. The firmware was modified and recompiled, several shell scripts were added, and this modified firmware was "flashed," i.e. reprogrammed into the WRT54GL in place of the original Linksys firmware.

An optically isolated electrical interface into the modified WRT54GL, hereafter referred to as the WRT54GLX, was designed and installed in the WRT54GLX. The Isolation Interface is connected via a short, 8-conductor cable to a Relay & LED Driver built into an APC CS 500 UPS (uninterruptible power supply). The Relay & LED Driver controls two relays that switch power to two sets of 120 VAC electrical outlets. The Relay and LED Driver also has two small microcontrollers, one serving primarily as a watchdog for the WRT54GLX and the other driving high-power red and green LEDs as status indicators.

A prototype Remote Status Indicator was built using an identical platform, but with different shell scripts. An Intel Xeon-based, Windows Server 2000 platform was used to prototype the Network Monitor & Control Server, and custom server and software applications were written in C-Sharp and the Microsoft Windows .NET Development Environment.

NPR Prototype Theory of Operation

Prototype power flow is illustrated in FIG. 17, Prototype Power Distribution. Backed up power from the CS 500 UPS powers Outlets A and B via the Relay Driver (power switching) and an added 12 VDC supply that powers the Relay & LED Driver, the NPR client radio unit, and the Isolation Interface built into it.

The Isolation Interface taps three LED driver outputs from the BCM5352 Router/Processor chip U500 in the WRT54GLX, as shown in FIG. 14A, Isolation Interface. Outputs to LED10 (yellow), LED11 (white), and LED 7 (DMZ) are tapped and fed to optoisolators U3, U2 and U1 respectively. These optoisolators in turn drive the Relay & LED Drivers, with U6 controlling Outlet A, U5 controlling Outlet B and U7 controlling the network-status indicator LEDs. The Isolation Interface drives a short, 8-conductor cable, illustrated in FIG. 14C, Interface Cable Schematic Diagram that connects between the WRT54GLX and the modified CS500X, hereafter called the CS500X.

FIG. 14B, Relay & LED Driver Interface includes relay drivers for two relays, two microcontrollers, a 12V regulated power supply, a 5V subregulator and a pair of high-power LEDs and drivers. Signal ISO A on J10 pin 3 brings in the Outlet A control signal from U6 on the Isolation Interface. This line is monitored by microcontroller U10 and can be overridden by if necessary. ISO A is normally low. To perform a POR on Outlet A, ISO A goes high (+5V), turning on FET Q3 and pulling in relay K1, opening its normally closed contacts. If ISO B goes high and remains high for more than one minute, this represents an anomalous condition. U10 recognizes this and will force a power-on reset of the WRT54GLX by bringing the normally high pin 3 low, turning off Q11, which allows R19 to pull Q10's gate high, turning it off. After a 5-second reset, U10 pin 3 goes high again, and power is restored to the WRT54GLX. During this time, U10 ignores all inputs until a 3-minute settling time has passed.

Signal ISO B on J10 pin 4 brings in the Outlet B control signal from U5 of the Isolation Interface. Signal ISO B fulfills two functions: it provides a "keep alive" signal to microcontroller U10, and, through U10, it drives the relay controlling power to Outlet B. Signal ISO B is low most of the time, but once per minute, it will pulse high for 3 seconds and then return low. This is a keep-alive signal. If U10 does not see a high pulse of less than 4 seconds on pin 8 once every two minutes, ten seconds, it will force a reset of the WRT54GLX as described in the previous paragraph.

If Signal ISO B goes high for more than 4 seconds, this represents a commanded Outlet B POR, and Outlet B is powered down when U10 pin 4 goes high, turning on FET Q4 and pulling in relay K2, opening its normally closed contacts and removing power from Outlet A.

Signal ISO GoodLink is a status indicator signal. It is fed to microcontroller U1. U1 alternately flashes green high-power LED D3 and red high-power LED D4 when the unit is first powered up. Thereafter, a low on ISO GoodLink will cause green LED D3 to glow steadily. U1 produces a steady high on pin 5 and a steady low in pin 4 whenever ISO GoodLink is low. Through Q1 and Q2, this turns on D3 and turns off D4. When GoodLink goes high, U1 brings pin 5 low, turning off Q1, which turns off D3, and flashes D4 by bringing U1 pin 4 high and pulsing it low.

AC power is provided by the UPS-backed-up 120 VAC output of the CS500X UPS, which feeds J3. This powers an added internal, +12V switching power supply PS1, which through 5V subregulator U4 powers U1 and U10. PS1 powers relays K1 and K2, the LEDs, and the WRT54GLX. The control programs for microcontrollers U1 and U10 were written in C.

RSI Prototype Theory of Operation

The Remote Status Indicator is built of a Linksys WRTGL router reprogrammed with custom firmware and an added microcontroller light flasher. The Golden-Gate Bridge logo lights green when Status or monitored NPRs is OK. If it shows and alternate double-red, double-white flash, this indicates lost contact or that the NPR is reporting Status NOK, i.e. not okay.

System Operation

The prototype NMCS resides on a public IP address on the Internet. That IP address is set into the NPR and RSI clients so that they will automatically "call home," i.e. contact this specific NMCS server when powered up. The Network Probe Restore client then begins sending regular network status reports to the Status Server of the NMCS and will perform autonomous resets, commanded resets, server-connection supervision and its other functions as described herein. The Remote Server Indicator prototype clients will connect with the NMCS, and will report the aggregate status of any NPRs assigned to its monitor pool (one NPR in the present prototype), as well as monitored $3^{rd}$-party servers (none currently). The system-level operation of the prototype clients and server and the activity within the NMCS is as described herein.

What is claimed is:

1. An autonomous, automatic-reset/restore network client configured to connect as a client to a wired or wireless network, the wired or wireless network comprising a first monitored equipment and a second monitored equipment, the automatic-reset/restore network client including:
    a network-connectivity confirmation element comprising a test-message generating element and a response-message receiving element, the network-connectivity confirmation element capable of sensing if operation of first monitored equipment and second monitored equipment is suspect in at least one of the following respects: connectivity, performance or reliability;
      a first switched power outlet coupled to one of the first monitored equipment and the second monitored equipment;
    a second switched power outlet coupled to the other of the first monitored equipment and the second monitored equipment; and
      wherein the network connectivity confirmation element includes a controller configured to perform at least these four primary connectivity tests:
        (1) periodically ping at least one Fully Qualified Domain Name (FQDN);
        (2) periodically ping at least one numeric IP address;
        (3) cause periodic release and then renewal of a Dynamic Host Configuration Protocol (DHCP) address of the network client in order to obtain from a DHCP server of the wired or wireless network a renewed DHCP address;
        (4) periodically disconnect then reconnect with the wired or wireless network in order to test physical layer and data link layer connectivity; and
    an autonomous, automatic reset/restore device that is configured to restore operation of the first monitored equipment or the second monitored equipment, if the network-connectivity confirmation element senses that operation of the first monitored equipment or the second monitored equipment is suspect in at least one of the following respects: connectivity, performance or reliability, by:
        (1) interrupting power to effect a power-on reset (POR) of the first monitored equipment or the second monitored equipment or both; or
        (2) resetting or rebooting by direct hardware-to-hardware or hardware/software communication to the first monitored equipment or the second monitored equipment or both.

2. The autonomous, automatic-reset/restore network client of claim 1, including an automatic service discovery element capable of:
    (1) interrupting power to the first switched power outlet;
    (2) determining by individual tests which of the following functions remain active: wireless access point, router, Internet gateway, and DHCP server;
    (3) storing the results of these tests in volatile or nonvolatile memory;
    (4) interrupting power to the second switched power outlet;
    (5) determining by additional individual tests which of the following functions remain active: wireless access point, router, Internet gateway, and DHCP server;
    (6) storing the results of these additional tests in volatile or nonvolatile memory;
whereby the autonomous, automatic-reset/restore network client is configured to develop an internal mapping between the first and second power outlets and the functions of modem, wireless access point, router, Internet gateway, and DHCP server performed by the first monitored equipment and the second monitored equipment attached thereto.

3. The autonomous, automatic-reset/restore network client of claim 1, connected as a client to a wired or wireless local area network, the wired or wireless local area network comprising a first and second monitored equipment and capable of being in communication through said first monitored equipment and said second monitored equipment with at least one network-attached control and monitoring server whose network connection is external to and independent of said wired or wireless local area network, the autonomous, automatic reset/restore client including one or more of:
    (1) at least one client communications element capable of initiating and establishing communications with the at least one control and monitoring server to deliver a status message including at least the results of the four primary connectivity tests;
    (2) a client log element capable of storing in a volatile or a nonvolatile memory the results of at least the four primary connectivity tests and any actions taken by the autonomous, automatic reset/restore client including either of resetting or rebooting the first monitored equipment or the second monitored equipment, with or without an associated timestamp, the client-log element capable of using the at least one client communications element to upload to the at least one control and monitoring server any of stored test results, actions-taken, and associated timestamps immediately or, should communications between the at least one client communications element and the at least one control and monitoring server be disrupted, as soon as communications between the at least one client communications element and the at least one control and monitoring server is reestablished; and (3) a client command element, capable of receiving or downloading commands from the at least one control and monitoring server, including any of server-commanded reboots or resets of the first monitored equipment or the second monitored equipment, once communications with the at least one control and monitoring server is initiated and established by the at least one client communications element;

(4) a quantitative-performance measurement element, capable of communicating with the control and monitoring server or with resources external to and independent of said wired or wireless local area network, the quantitative-performance measurement element capable of interactively measuring and recording at least one of the following network-connection performance parameters: upstream bit rate, downstream bit rate, jitter, latency and packet error rate;

(5) an RF-performance measurement element, wherein the wireless transceiver of the autonomous, automatic-reset/restore network client is capable of periodically recording RF packet error rate; and (6) an RF-environment evaluation element, wherein the wireless transceiver of the autonomous, automatic-reset/restore network client is capable of surveying the levels of RF interference and noise across frequencies of operation.

4. The autonomous, automatic-reset/restore network client of claim 3, wherein the at least one control and monitoring server with which the automatic reset-restore network client is capable of communicating includes a third-party service monitoring element, capable of testing and evaluating the operability, availability and reliability of any of mail servers, VoIP servers, VPN connections, and search engines, and storing the results of such tests in a database.

5. The autonomous, automatic-reset/restore network client of claim 3, wherein the at least one control and monitoring server with which the automatic reset-restore network client is capable of communicating includes at least one status-inference timer, configured to operate so that if one or a predetermined plurality of regular, periodic status reports from an autonomous, automatic-reset/restore network clients is missed and the status inference timer expires, a flag is set in the at least one control and monitoring server.

6. The autonomous, automatic-reset/restore network client of claim 3, wherein the control and monitoring server with which the automatic reset-restore network client is capable of communicating includes at least one messaging element capable of generating any of text messages, sms messages, email messages or smtp messages, in communication with appropriate smtp and sms gateways, in order to generate and transmit messages relating to:

(1) changes in the reported status of the autonomous, automatic-reset/restore network client;

(2) client log events;

(3) failure of or changes in the operability, availability or reliability of any of monitored mail servers, VoIP servers, VPN connections, and search engines as may be noted by the third-party service monitoring element of the control and monitoring server; and (4) setting of a status-inference timer flag in the control and monitoring server due to one or more missing status reports from the autonomous, automatic-reset/restore network client; and (5) performance degradation as measured by any of the following exceeding predetermined threshold levels: the quantitative performance measurement element, the RF performance measurement and the RF environment evaluation element.

7. The autonomous, automatic-reset/restore network client of claim 1 wherein the autonomous, automatic-reset/restore network client is able to reboot or reset itself in the event that rebooting or resetting the first monitored equipment and rebooting or resetting the second monitored equipment is unsuccessful in reestablishing normal operation of the first monitored equipment and the second monitored equipment so that normal operation of the autonomous, automatic-reset/restore network client itself is called into question.

8. The autonomous, automatic-reset/restore network client of claim 1 wherein the autonomous, automatic-reset/restore network client includes an independent hardware watchdog timer or processor that is periodically reset by an watchdog-timer-reset process running concurrently within the controller of the autonomous, automatic-reset/restore network client, connected so that the hardware watchdog timer is configured to reset the autonomous, automatic-reset/restore network client should the reliability or normal functioning of the autonomous, automatic-reset/restore network client be called into question by its failure to reset said hardware watchdog timer or processor.

9. The autonomous, automatic-reset/restore network client of claim 8 including means to disable the watchdog-timer self-reboot of the autonomous, automatic-reset/restore network client.

10. The autonomous, automatic-reset/restore network client of claim 1 wherein the autonomous, automatic-reset/restore network client includes means of disabling the rebooting or resetting of either the first monitored equipment, the second monitored equipment or both.

11. The autonomous, automatic-reset/restore network client of claim 10 including means to temporarily disable the self-reboot of the autonomous, automatic-reset/restore network client.

12. The autonomous, automatic-reset/restore network client of claim 1 wherein controller includes at least one scheduled reboot process for the periodic, automatic rebooting or resetting of the first monitored equipment, the second monitored equipment, the autonomous, automatic-reset/restore network client itself or any combination of these according to at least one fixed schedule.

13. The autonomous, automatic-reset/restore network client of claim 3, wherein the autonomous, automatic-reset/restore network client is capable of communicating with at least one network-attached control and monitoring server, and the at least one network-attached control and monitoring server is capable of communicating with a Remote Status Indicator, the Remote Status Indicator configured to indicate:

(1) individual status of the autonomous, automatic-reset/restore network client that is capable of communication with the at least one network-attached control and monitoring server; or (2) aggregate status of a plurality of autonomous, automatic-reset/restore network clients that are capable of communication with the at least one network-attached control and monitoring server; or (3) aggregate status of a plurality of autonomous, automatic-reset/restore network clients that are capable of communication with the at least one network-attached control and monitoring server, and aggregate status of at least one of the following 3rd-party services that are monitored by the at least one network-attached control and monitoring server: mail servers, VoIP servers, VPN connections, and search engines.

* * * * *